US012732409B2

(12) United States Patent
Shi et al.

(10) Patent No.: US 12,732,409 B2
(45) Date of Patent: Sep. 8, 2026

(54) COMMUNICATION METHOD AND APPARATUS IN HIGH-FREQUENCY SCENARIO

(71) Applicant: HUAWEI TECHNOLOGIES CO., LTD., Shenzhen (CN)

(72) Inventors: Meng Shi, Shanghai (CN); Rongkuan Liu, Shanghai (CN); Jiayin Zhang, Shanghai (CN); Peng Zou, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 35 days.

(21) Appl. No.: 18/760,790

(22) Filed: Jul. 1, 2024

(65) Prior Publication Data

US 2024/0372772 A1 Nov. 7, 2024

Related U.S. Application Data

(63) Continuation of application No. PCT/CN2022/138899, filed on Dec. 14, 2022.

(30) Foreign Application Priority Data

Dec. 31, 2021 (CN) ......................... 202111671948.6

(51) Int. Cl.
*H04L 27/36* (2006.01)
*H04L 25/02* (2006.01)
*H04L 27/38* (2006.01)

(52) U.S. Cl.
CPC ........ *H04L 27/366* (2013.01); *H04L 25/0224* (2013.01); *H04L 27/38* (2013.01)

(58) Field of Classification Search
CPC .......... H04B 7/08; H04B 7/12; H04B 10/556; H04J 1/00; H04L 1/00; H04L 5/12;
(Continued)

(56) References Cited

U.S. PATENT DOCUMENTS

| | | | | |
|---|---|---|---|---|
| 10,547,487 B1 * | 1/2020 | Zhang | ................. | H04L 27/3411 |
| 2007/0195907 A1 * | 8/2007 | Wang | .................... | H04L 1/0068<br>375/267 |

(Continued)

FOREIGN PATENT DOCUMENTS

| | | | |
|---|---|---|---|
| CN | 101409696 A | 4/2009 | |
| WO | WO-2020207182 A1 * | 10/2020 | ......... H04L 27/2636 |

OTHER PUBLICATIONS

Meng at al., "A Distributed Layered Modulation for Relay Downlink Cooperative Transmission," Published in 21st International Symposium on Personal Indoor and Mobile Radio Communications, XP031837866, total 5 pages, Institute of Electrical and Electronics Engineers, New York, New York (Sep. 26, 2010).

*Primary Examiner* — Shawkat M Ali
(74) *Attorney, Agent, or Firm* — Leydig, Voit & Mayer, Ltd.

(57) ABSTRACT

A communication method and apparatus in a high-frequency scenario are provided. The method includes: a transmit-end device may modulate S bitstreams according to a mapping rule corresponding to a first modulation scheme for a higher-order modulation signal to be received by a receive-end device, to generate M lower-order modulation signals, wherein S is equal to 1 or M, and M is an integer greater than or equal to 2; and then send the M lower-order modulation signals through a line of sight (LOS) channel, so that a modulation order of a signal transmitted by a transmit end can be reduced.

20 Claims, 22 Drawing Sheets

(58) Field of Classification Search
CPC ..... H04L 25/03; H04L 25/0224; H04L 27/18; H04L 27/20; H04L 27/26; H04L 27/34; H04L 27/38; H04L 27/366; H04W 72/12
USPC ....... 375/219, 260, 261, 267, 281, 295, 308, 375/316
See application file for complete search history.

(56) References Cited

U.S. PATENT DOCUMENTS

2018/0254814 A1 9/2018 Park et al.
2018/0262381 A1* 9/2018 Wu ........................ H04L 27/34
2019/0182095 A1 6/2019 Suh et al.

* cited by examiner

A QPSK signal and an 8QAM signal are superposed based on an amplitude ratio of 3:1 to generate a 32QAM signal that meets Gray mapping: 3×Tx1 (QPSK)+Tx2 (8QAM)=Rx (32QAM)

A QPSK signal and a 16QAM signal are superposed based on an amplitude ratio of 4:1 to generate a 64QAM signal that meets Gray mapping: 4×Tx1 (QPSK)+Tx2 (16QAM)=Rx (64QAM)

Symbol splitting scheme 2 in which two lower-order signals whose amplitudes match are superposed to generate a 64QAM signal Symbol splitting scheme 3 in which three lower-order signals are superposed to generate a 64QAM signal in a case in which a transmit-end power difference is reduced Symbol splitting scheme 4 in which three lower-order signals are superposed to generate a 64QAM signal in a case in which a transmit-end power difference is reduced Rx (64QAM)

Sending scheme 1

Sending scheme 2

COMMUNICATION METHOD AND APPARATUS IN HIGH-FREQUENCY SCENARIO

CROSS-REFERENCE TO RELATED APPLICATIONS

This application is a continuation of International Application No. PCT/CN2022/138899, filed on Dec. 14, 2022, which claims priority to Chinese Patent Application No. 202111671948.6, filed on Dec. 31, 2021. The disclosures of the aforementioned applications are hereby incorporated by reference in their entireties.

TECHNICAL FIELD

Embodiments of this application relate to the field of wireless communication technologies, and in particular, to a communication method and apparatus in a high-frequency scenario.

BACKGROUND

A high frequency or a millimeter wave (mmW) has abundant frequency band resources, and therefore has become a hot topic of research and development in the industry. A high-frequency or millimeter-wave frequency band has high bandwidth and can improve a large-capacity service, and therefore may be used in future wireless communication and space communication to meet an increasing communication requirement. However, a high-frequency or millimeter-wave signal is transmitted in a line of sight (LOS) mode. The high-frequency or millimeter-wave signal has a quite high frequency and is subject to a quite large loss during transmission in free space. This seriously affects a transmission distance of the high-frequency or millimeter-wave signal. Therefore, coverage needs to be improved. A system capacity may be increased through higher-order modulation. However, a higher-order modulation signal has a high peak-to-average power ratio (PAPR), a small coverage area, and low transmission performance.

FIG. 1 shows an example of PAPRs at different modulation orders. As shown in FIG. 1, a higher modulation order of a high-frequency modulation signal indicates a higher PAPR of the signal.

SUMMARY

Embodiments of this application provide a communication method and apparatus in a high-frequency scenario, to resolve a problem that a signal coverage area is small and transmission efficiency is low due to a high PAPR when a higher-order modulation signal is used for communication in a high-frequency scenario.

According to a first aspect, an embodiment of this application provides a communication method in a high-frequency scenario. The method may be used in a plurality of high-frequency-based or millimeter-wave-based communication scenarios such as backhaul, multi-station transmission, wireless to the x WTTx, enhanced mobile broadband eMBB, and device to device D2D. A transmit-end device may be a network device (for example, a base station, an access point, or a transmission point) or a terminal device. A receive-end device may also be a network device (for example, a base station, an access point, or a transmission point) or a terminal device. Specifically, the method may be performed by the transmit-end device or a component (for example, a chip or a circuit) configured in the transmit-end device.

The method includes: the transmit-end device modulates S bitstreams according to a mapping rule corresponding to a first modulation scheme for a higher-order modulation signal to be received by the receive-end device, to generate M lower-order modulation signals, where M is an integer greater than or equal to 2, and S is equal to 1 or M. The transmit-end device sends the M lower-order modulation signals through a line of sight LOS channel, where the mapping rule is used to superpose the M lower-order modulation signals to obtain the higher-order modulation signal to be received by the receive-end device.

In this embodiment of this application, the mapping rule corresponding to the first modulation scheme for the higher-order modulation signal to be received by the receive-end device is designed, to reduce a modulation order of a signal transmitted by a transmit end. The transmit-end device may modulate and map the to-be-sent S bitstreams into the M lower-order modulation signals according to the mapping rule, and then send the M lower-order modulation signals to the receive-end device. In addition, the mapping rule may enable the M lower-order modulation signals sent by the transmit-end device to be superposed in space domain or power domain (energy domain) to form the higher-order modulation signal. In other words, the receive-end device actually receives the higher-order modulation signal obtained by superposing the M lower-order modulation signals sent by the transmit-end device. In the method, a PAPR of a signal transmitted by the transmit end can be effectively reduced without compromising spectral efficiency, and the receive-end device may directly detect a higher-order constellation point obtained through superposition to decode a higher-order modulation signal, to ensure system performance.

In a possible design, the S bitstreams are one independent bitstream, and S=1 in this case; or the S bitstreams are M sub-bitstreams obtained by performing bit decomposition on one independent bitstream, and S=M in this case; or the S bitstreams are M independent bitstreams, and S=M in this case.

For example, when the S bitstreams are one independent bitstream, the transmit-end device may directly perform multidimensional modulation on the independent bitstream according to the mapping rule corresponding to the first modulation scheme, to generate the M lower-order modulation signals. In this way, bit-to-complex symbol mapping is directly completed without an intermediate bit decomposition process.

When the S bitstreams are M sub-bitstreams obtained by performing bit decomposition on one independent bitstream or are M independent bitstreams, the transmit-end device may separately modulate the M bitstreams according to the mapping rule corresponding to the first modulation scheme, to generate the M lower-order modulation signals.

The technical solution in this embodiment of this application is applicable to a transceiver system structure based on a single-point transmit end or a multi-point transmit end. The single-point transmit end means that the transmit end needs to send one independent bitstream. The multi-point transmit end means that the transmit end needs to send a plurality of independent bitstreams. This indicates a difference between a single-stream mode and a multi-stream mode.

In a possible design, the transmit-end device precodes a transmit signal matrix including the M lower-order modulation signals, and then sends precoded M lower-order modulation signals to the receive-end device. A precoding matrix that meets the following relationship is used during precoding: H*W=Λ, where W is the precoding matrix, H is a rank-deficient channel matrix, and Λ is a diagonal matrix. The channel matrix may be obtained by the transmit-end device through channel state information CSI feedback.

In this embodiment of this application, because the M lower-order modulation signals may actually pass through different channels, in the foregoing precoding method, the precoding matrix is multiplied by the channel matrix to obtain the diagonal matrix, so that impact of the channels can be compensated for at the transmit end, to reduce impact of a channel difference on a higher-order constellation obtained through superposition at a receive end, and improve signal transmission performance.

In a possible design, the S bitstreams are M bitstreams, and the mapping rule indicates a bit-to-complex symbol modulation mapping relationship corresponding to each of the M bitstreams at the transmit end. M complex symbols obtained by mapping bits in the M bitstreams based on modulation mapping relationships respectively corresponding to the bits are superposed based on a preset amplitude ratio to obtain complex symbols in the higher-order modulation signal to be received by the receive-end device.

A possible implementation solution of the mapping rule provided in this embodiment of this application is: performing joint coding and modulation on the M bitstreams at the transmit end. Specifically, in this solution, the mapping rule may specifically indicate a modulation mapping relationship corresponding to each bitstream. In this solution, the M bitstreams may be respectively modulated into the M lower-order modulation signals, and then the M lower-order modulation signals are superposed based on a preset amplitude ratio to obtain the higher-order modulation signal. A constellation of the higher-order modulation signal may be a uniformly modulated higher-order constellation.

In a possible design, the first modulation scheme is N-order modulation, and N is an integer greater than or equal to 4. When M is 2, the M bitstreams include a first bitstream and a second bitstream, and the M lower-order modulation signals include a first lower-order modulation signal and a second lower-order modulation signal. In this scenario, the mapping rule includes: $2^2$ values of two bits in the first bitstream are respectively mapped to $2^2$ first complex symbols. $2^{N-2}$ values of N−2 bits in the second bitstream are respectively mapped to $2^N-2$ second complex symbols based on different values of the two bits in the first bitstream, and when values of the two bits in the first bitstream vary, same values of the N−2 bits in the second bitstream are mapped to different second complex symbols among the $2^N-2$ second complex symbols. First complex symbols to which the two bits in the first bitstream are mapped and second complex symbols to which the N−2 bits in the second bitstream are mapped are superposed based on a preset amplitude ratio to obtain third complex symbols in the higher-order modulation signal to be received by the receive-end device.

In a possible design, the modulating two bitstreams according to a mapping rule corresponding to a first modulation scheme for a higher-order modulation signal to be received by the receive-end device, to generate two lower-order modulation signals may include: sequentially mapping, according to the mapping rule, every two bits in the first bitstream to a first complex symbol among the $2^2$ first complex symbols, to form the first lower-order modulation signal; and sequentially mapping every N−2 bits in the second bitstream to a second complex symbol among the $2^N-2$ second complex symbols, to form the second lower-order modulation signal.

This embodiment of this application provides a solution specifically used to perform joint coding and modulation on two bitstreams. In this solution, two lower-order modulation signals obtained through modulation can be superposed to obtain a higher-order modulation signal, and a constellation diagram of the higher-order modulation signal obtained through superposition can meet a Gray mapping rule, to effectively improve encoding and decoding accuracy.

In a possible design, the method further includes: determining a power ratio of the M lower-order modulation signals based on an amplitude ratio of the M lower-order modulation signals; and controlling, based on the power ratio of the M lower-order modulation signals, the M lower-order modulation signals to undergo power amplification in a power amplifier.

In this embodiment of this application, when the solution in which joint coding and modulation are performed on the M bitstreams at the transmit end is used, to enable the higher-order modulation signal obtained through superposition to meet the Gray mapping rule, the M lower-order modulation signals may need to meet a specific amplitude ratio during superposition. Correspondingly, when power amplification is performed on the M lower-order modulation signals in a power amplifier PA module, a specific power ratio also needs to be met, to be specific, a corresponding power constraint needs to be performed.

In a possible design, the method further includes: The transmit-end device sends first indication information to the receive-end device, where the first indication information includes one or more of the following information: a modulation and coding scheme MCS for the higher-order modulation signal, an MCS for the M lower-order modulation signals, sign bit indication information, an amplitude ratio of the M lower-order modulation signals, and a power ratio of the M lower-order modulation signals, where the sign bit indication information indicates a lower-order modulation signal serving as a sign bit among the M lower-order modulation signals.

This embodiment of this application provides a corresponding signaling design solution for the solution in which joint coding and modulation are performed on the M bitstreams at the transmit end, to ensure normal sending and receiving of a signal. For example, before sending the M lower-order modulation signals to the receive-end device, the transmit-end device may send the first indication information to the receive-end device, where the first indication information includes one or more of the foregoing information.

In a possible design, the mapping rule indicates a correspondence between bits in an original bitstream including the S bitstreams and a complex symbol in the higher-order modulation signal, and a correspondence between a complex symbol in the higher-order modulation signal and complex symbols in the M lower-order modulation signals. The original bitstream includes bits respectively corresponding to the M lower-order modulation signals, and S is equal to 1 or M. Complex symbols in the M lower-order modulation signals may be obtained by splitting a complex symbol in the higher-order modulation signal based on an equi-amplitude ratio.

Another possible implementation solution of the mapping rule provided in this embodiment of this application is: performing symbol-level modulation mapping on one or more bitstreams at the transmit end. Specifically, in this solution, the mapping rule may specifically indicate a symbol splitting relationship between each complex symbol in the higher-order modulation signal to be received by the receive-end device and complex symbols in the M lower-order modulation signals. Based on the symbol splitting relationship, the transmit end may directly modulate, into the M lower-order modulation signals, an original bitstream including one or M bitstreams, and then send the M lower-order modulation signals based on an equi-amplitude ratio. The M lower-order modulation signals are superposed in space domain or energy domain to obtain a higher-order modulation signal corresponding to the original bitstream. A constellation of the higher-order modulation signal may be a non-uniformly modulated higher-order constellation, so that a capability of the receive end to resist high-frequency phase noise can be improved.

In a possible design, the first modulation scheme is N-order modulation, and N is an integer greater than or equal to 4. When M is 2, the mapping rule includes: $2^N$ values of N bits in the original bitstream are in a one-to-one correspondence with $2^N$ third complex symbols in the higher-order modulation signal, and every N bits in the original bitstream include N/2 bits corresponding to a first lower-order modulation signal and N/2 bits corresponding to a second lower-order modulation signal. In the first modulation scheme, a group of $2^{N/2}$ fourth complex symbols corresponds to the first lower-order modulation signal, a group of $2^{N/2}$ fifth complex symbols corresponds to the second lower-order modulation signal, and results obtained by superposing each of the $2^{N/2}$ fourth complex symbols and each of the $2^{N/2}$ fifth complex symbols based on an equi-amplitude ratio are in a one-to-one correspondence with the $2^N$ third complex symbols.

In a possible design, the modulating one or two bitstreams based on a mapping relationship corresponding to the first modulation scheme for the higher-order modulation signal to be received by the receive-end device, to generate two lower-order modulation signals includes: sequentially mapping, according to the mapping rule, every N bits in the original bitstream to one fourth complex symbol among the $2^{N/2}$ fourth complex symbols and one fifth complex symbol among the $2^{N/2}$ fifth complex symbols, to form the first lower-order modulation signal and the second lower-order modulation signal.

This embodiment of this application provides a solution specifically applicable to symbol-level modulation mapping for one or two bitstreams. In this solution, two lower-order modulation signals obtained through modulation can be superposed to obtain a higher-order modulation signal, where a constellation diagram of the higher-order modulation signal meets a Gray mapping rule. In addition, power ratios of the two lower-order modulation signals are the same, so that a transmit power at the transmit end can be fully utilized.

In a possible design, when the first modulation scheme is 16 quadrature amplitude modulation QAM and M is equal to 2, a modulation order N is 4, and the mapping rule includes: a correspondence between bits in the original bitstream and a complex symbol in the 16QAM, and a correspondence between a complex symbol in the 16QAM and a fourth complex symbol in the first lower-order modulation signal and a fifth complex symbol in the second lower-order modulation signal, where the original bitstream includes a bit corresponding to the first lower-order modulation signal and a bit corresponding to the second lower-order modulation signal, the first lower-order modulation signal corresponds to $2^{N/2}$ fourth complex symbols, the second lower-order modulation signal corresponds to $2^{N/2}$ fifth complex symbols, and results obtained by superposing each of the $2^{N/2}$ fourth complex symbols and each of the $2^{N/2}$ fifth complex symbols based on an equi-amplitude ratio are in a one-to-one correspondence with complex symbols in the 16QAM. Further, optionally, the $2^{N/2}$ fourth complex symbols are $K\{1+2j, 1-2j, -1+2j, -1-2j\}$, the $2^{N/2}$ fifth complex symbols are $L\{2+1j, 2-1j, -2+1j, -2-1j\}$, and K and L are scale factors.

In a possible design, when the first modulation scheme is non-uniform constellation NUC-16QAM and M is equal to 2, a modulation order N is 4, and the mapping rule includes: a correspondence between bits in the original bitstream and a complex symbol in the NUC-16QAM, and a correspondence between a complex symbol in the NUC-16QAM and a fourth complex symbol in the first lower-order modulation signal and a fifth complex symbol in the second lower-order modulation signal, where the original bitstream includes a bit corresponding to the first lower-order modulation signal and a bit corresponding to the second lower-order modulation signal, the first lower-order modulation signal corresponds to $2^{N/2}$ fourth complex symbols, the second lower-order modulation signal corresponds to $2^{N/2}$ fifth complex symbols, and results obtained by superposing each of the $2^{N/2}$ fourth complex symbols and each of the $2^{N/2}$ fifth complex symbols based on an equi-amplitude ratio are in a one-to-one correspondence with complex symbols in the NUC-16QAM. Further, optionally, the $2^{N/2}$ fourth complex symbols are $K\{\sqrt{2}j, \sqrt{2}, -\sqrt{2}j, -\sqrt{2}\}$, the $2^{N/2}$ fifth complex symbols are $L\{1+1j, 1-1j, -1+1j, -1-1j\}$, and K and L are scale factors.

In a possible design, when the first modulation scheme is 64QAM and M is equal to 2, a modulation order N is 6, and the mapping rule includes: a correspondence between bits in the original bitstream and a complex symbol in the 64QAM, and a correspondence between a complex symbol in the 64QAM and a fourth complex symbol in the first lower-order modulation signal and a fifth complex symbol in the second lower-order modulation signal, where the original bitstream includes a bit corresponding to the first lower-order modulation signal and a bit corresponding to the second lower-order modulation signal, the first lower-order modulation signal corresponds to $2^{N/2}$ fourth complex symbols, the second lower-order modulation signal corresponds to $2^{N/2}$ fifth complex symbols, and results obtained by superposing each of the $2^{N/2}$ fourth complex symbols and each of the $2^{N/2}$ fifth complex symbols based on an equi-amplitude ratio are in a one-to-one correspondence with complex symbols in the 64QAM. Further, optionally, the $2^{N/2}$ fourth complex symbols are $P\{1+6j, 1+2j, 1-2j, 1-6j, -1-6j, -1-2j, -1+2j, -1+6j\}$, and the $2^{N/2}$ fifth complex symbols are $Q\{6+1j, 2+1j, -2+1j, -6+1j, -6-1j, -2-1j, 2-1j, 6-1j\}$; or the $2^{N/2}$ fourth complex symbols are $P\{4+3j, 4+1j, 4-1j, 4-3j, -4-3j, -4-1j, -4+1j, -4+3j\}$, and the $2^{N/2}$ fifth complex symbols are $Q\{3+4j, 1+4j, -1+4j, -3+4j, -3-4j, -1-4j, 1-4j, 3-4j\}$. P and Q are scale factors.

In a possible design, when the first modulation scheme is NUC-64QAM and M is equal to 2, a modulation order N is 6, and the mapping rule includes: a correspondence between bits in the original bitstream and a complex symbol in the NUC-64QAM, and a correspondence between a complex symbol in the NUC-64QAM and a fourth complex symbol in the first lower-order modulation signal and a fifth complex symbol in the second lower-order modulation signal, where the original bitstream includes a bit corresponding to the first lower-order modulation signal and a bit corresponding to the second lower-order modulation signal, the first lower-order modulation signal corresponds to $2^{N/2}$ fourth complex symbols, the second lower-order modulation signal corresponds to $2^{N/2}$ fifth complex symbols, and results obtained by superposing each of the $2^{N/2}$ fourth complex symbols and each of the $2^{N/2}$ fifth complex symbols are in a one-to-one correspondence with complex symbols in the NUC-64QAM. Further, optionally, the $2^{N/2}$ fourth complex symbols are P{1, 1+1j, 1j, −1+1j, −1, −1−1j, −1j, 1−1j}, the $2^{N/2}$ fifth complex symbols are $$Q\left\{\sqrt{2},\ \frac{\sqrt{2}}{2}(1+1j),\ \sqrt{2}\,j,\ \frac{\sqrt{2}}{2}(-1+1j),\ -\sqrt{2},\ \frac{\sqrt{2}}{2}(-1-1j),\ -\sqrt{2}\,j,\ \frac{\sqrt{2}}{2}(1-1j)\right\},$$

and P and Q are scale factors.

In this embodiment of this application, a plurality of possible mapping rules are provided for various possible modulation schemes for the higher-order modulation signal to be received by the receive end. In these mapping rules, a plurality of non-standard complex symbol sets of lower-order modulation signals and a solution of combining the complex symbol sets are designed, so that two lower-order modulation signals at the transmit end can be superposed based on an equi-amplitude ratio to obtain a higher-order modulation signal for the receive end.

In a possible design, the method further includes: The transmit-end device alternately changes, based on a specified periodicity, an antenna for sending the M lower-order modulation signals.

In this embodiment of this application, when the M lower-order modulation signals at the transmit end are superposed based on an equi-amplitude ratio, a constellation diagram of the higher-order modulation signal obtained through superposition at the receive end may have an I/O imbalance problem. In view of this problem, a technical solution in which an antenna for sending the M lower-order modulation signals is alternately changed per periodicity based on a specified periodicity is designed in this application. This solution may also be understood as alternately using a modulation scheme or a modulation pattern for a to-be-sent lower-order modulation signal on different transmit antennas, to reduce impact of I/Q imbalance on system performance.

In a possible design, the method further includes: The transmit-end device sends second indication information to the receive-end device, where the second indication information includes one or more of the following information: a modulation and coding scheme MCS for the higher-order modulation signal, an MCS for the M lower-order modulation signals, information indicating that the higher-order modulation signal is non-uniformly modulated or uniformly modulated, and information indicating that the M lower-order modulation signals are non-uniformly modulated or uniformly modulated.

This embodiment of this application provides a corresponding signaling design solution for the solution in which symbol-level modulation mapping is performed on one or M bitstreams at the transmit end, to ensure normal sending and receiving of a signal. For example, before sending the M lower-order modulation signals to the receive-end device, the transmit-end device may send the second indication information to the receive-end device, where the second indication information includes one or more of the foregoing information.

According to a second aspect, an embodiment of this application provides a communication method in a high-frequency scenario. The method may be used in a plurality of possible scenarios in which data is transmitted by using a high-frequency millimeter wave, such as backhaul, multi-station transmission, wireless to the x WTTx, enhanced mobile broadband eMBB, and device to device D2D. A transmit-end device may be a network device (for example, a base station, an access point, or a transmission point) or a terminal device. A receive-end device may also be a network device (for example, a base station, an access point, or a transmission point) or a terminal device. Specifically, the method may be performed by the receive-end device or a component (for example, a chip or a circuit) configured in the receive-end device.

The method includes: The receive-end device receives a higher-order modulation signal from the transmit-end device, where the higher-order modulation signal is obtained by superposing M lower-order modulation signals, and M is an integer greater than or equal to 2. The receive-end device performs channel estimation by using a demodulation reference signal DMRS port, and performs post-equalization on the higher-order modulation signal based on a channel matrix obtained through estimation.

In a possible design, after performing post-equalization on the higher-order modulation signal, the receive-end device may further demodulate the higher-order modulation signal to obtain a corresponding bitstream. Optionally, if a transmit end sends M independent signals, the receive-end device may further split, into M bitstreams, the bitstream obtained by demodulating the higher-order modulation signal.

In this embodiment of this application, when the transmit end sends the M independent signals, the receive-end device performs post-equalization on the received higher-order modulation signal by using the foregoing post-equalization method, to reduce consumption of DMRS resources at a receive end.

According to a third aspect, an embodiment of this application provides a communication apparatus. The communication apparatus may implement a function of the transmit-end device or the receive-end device in the foregoing aspects. The communication apparatus may be a network device or a terminal device, or may be a chip included in a network device or a terminal device.

A function of the communication apparatus may be implemented by hardware, or may be implemented by hardware executing corresponding software. The hardware or the software includes one or more modules, units, or means corresponding to the function.

In a possible design, a structure of the communication apparatus includes a processing module and a transceiver module. The processing module is configured to support the communication apparatus in performing a corresponding function of the transmit-end device in the foregoing aspects, or performing a corresponding function of the receive-end device in the foregoing aspects. The transceiver module is configured to support communication between the communication apparatus and another communication device. For example, when the communication apparatus is a transmit-end device, the communication apparatus may send M lower-order modulation signals to a receive-end device, and the M lower-order modulation signals are superposed on the receive-end device to obtain a higher-order modulation signal. The communication apparatus may further include a storage module. The storage module is coupled to the processing module, and stores program instructions and data that are necessary for the communication apparatus. In an example, the processing module may be a processor, the communication module may be a transceiver, and the storage module may be a memory. The memory may be integrated with the processor, or may be disposed separately from the processor.

In another possible design, a structure of the communication apparatus includes a processor, and may further include a memory. The processor is coupled to the memory, and may be configured to execute computer program instructions stored in the memory, to enable the communication apparatus to perform the methods in the foregoing aspects. Optionally, the communication apparatus further includes a communication interface, and the processor is coupled to the communication interface. When the communication apparatus is a network device or a terminal device, the communication interface may be a transceiver or an input/output interface. When the communication apparatus is a chip included in a network device or a terminal device, the communication interface may be an input/output interface of the chip. Optionally, the transceiver may be a transceiver circuit, and the input/output interface may be an input/output circuit.

According to a fourth aspect, an embodiment of this application provides a chip system, including a processor. The processor is coupled to a memory. The memory is configured to store a program or instructions. When the program or the instructions are executed by the processor, the chip system is enabled to implement the methods in the foregoing aspects.

Optionally, the chip system further includes an interface circuit, and the interface circuit is configured to transmit code instructions to the processor.

Optionally, the chip system may include one or more processors, and the processor may be implemented by using hardware or software. When the processor is implemented by using hardware, the processor may be a logic circuit, an integrated circuit, or the like. When the processor is implemented by using software, the processor may be a general-purpose processor, and is implemented by reading software code stored in the memory.

Optionally, the chip system may also include one or more memories. The memory may be integrated with the processor, or may be disposed separately from the processor. For example, the memory may be a non-transitory processor, for example, a read-only memory ROM. The memory and the processor may be integrated into one chip, or may be separately disposed on different chips.

According to a fifth aspect, an embodiment of this application provides a computer-readable storage medium. The computer-readable storage medium stores a computer program or instructions. When the computer program or the instructions are executed, the method in any one of the foregoing aspects or the possible designs of the foregoing aspects is performed.

According to a sixth aspect, an embodiment of this application provides a computer program product. When a communication apparatus runs the computer program product, the method in any one of the foregoing aspects or the possible designs of the foregoing aspects is performed.

According to a seventh aspect, an embodiment of this application provides a communication system. The communication system includes a transmit-end device and a receive-end device.

DESCRIPTION OF EMBODIMENTS

To make objectives, technical solutions, and advantages of embodiments of this application clearer, the following further describes embodiments of this application in detail with reference to accompanying drawings.

Figure 1:
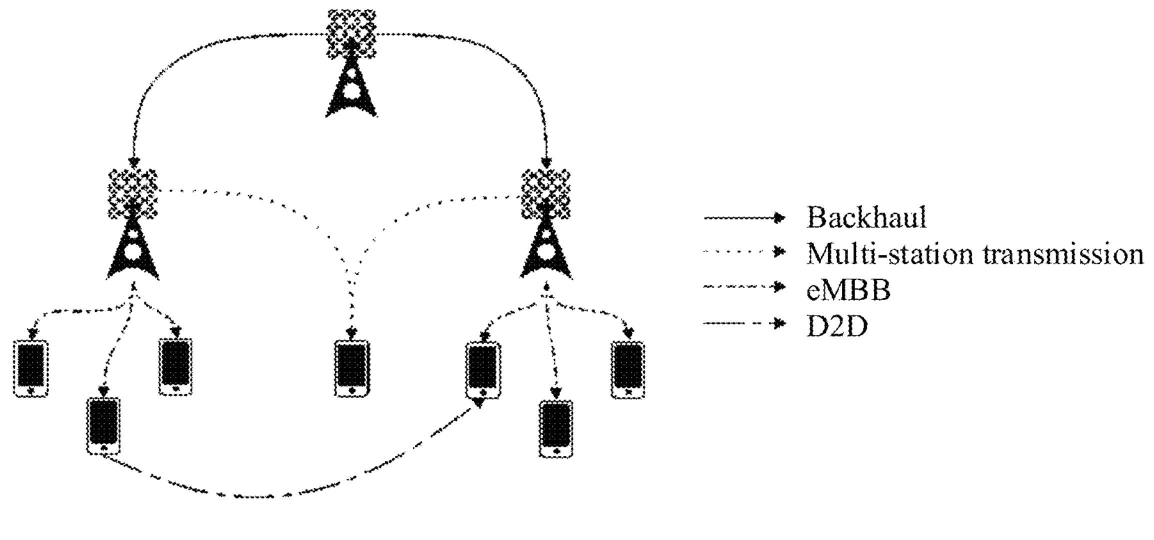
FIG. 1 is a diagram of a network architecture of a communication system to which this application is applicable.

FIG. 1 shows an example network architecture of a communication system to which this application is applicable. As shown in FIG. 1, the network architecture may include at least one network device and at least one terminal device.

The network device is a node in a radio access network, and can communicate with the terminal device and connect the terminal device to a wireless network. The network device may also be referred to as a radio access network device or an access network device. Specifically, the network device may be a base station, a relay station, or an access point. The network device may be a base transceiver station (BTS) in a global system for mobile communications (GSM) or code division multiple access (CDMA) network, or may be a NodeB (NB) in wideband code division multiple access (WCDMA), or may be an eNB or an eNodeB (evolved NodeB) in long term evolution (LTE). Alternatively, the network device may be a radio controller in a cloud radio access network (CRAN) scenario, or may be a base station device in a 5G network, or a network device in a next-generation communication system (for example, 6G) or a future evolved public land mobile network (PLMN) network. Alternatively, the network device may be a wearable device or a vehicle-mounted device.

The terminal device is a device with a wireless transceiver function. The terminal device is wirelessly connected to the network device, so that the terminal device can access the communication system. Specifically, the terminal device may be user equipment (UE), an access terminal, a terminal unit, a terminal station, a mobile station, a mobile console, a remote station, a remote terminal, a mobile device, a terminal, a wireless communication device, a terminal agent, a terminal apparatus, or the like. For example, the terminal device may be a cellular phone, a cordless phone, a session initiation protocol (SIP) phone, a wireless local loop (WLL) station, a personal digital assistant (PDA), a handheld device with a wireless communication function, a computing device or another processing device connected to a wireless modem, a vehicle-mounted device, a wearable device, a terminal device in a 5G network, or a terminal device in a next-generation communication system (for example, 6G) or a future evolved PLMN network.

Technical solutions provided in this application may be applied to a plurality of high-frequency-based or millimeter-wave-based communication scenarios, such as backhaul, multi-station transmission, wireless to the x (WTTx), enhanced mobile broadband (eMBB), and device to device (D2D), in the foregoing network architecture. In addition, both a transmit-end device and a receive-end device may be network devices or terminal devices. This is not specifically limited in this application.

It should be noted that the terms "system" and "network" in embodiments of this application may be used interchangeably. "A plurality of" means two or more. In view of this, "a plurality of" may also be understood as "at least two" in embodiments of this application. "At least one" may be understood as one or more, for example, understood as one, two, or more. For example, including at least one means including one, two, or more, without limiting specific items that are included. For example, if at least one of A, B, and C is included, A, B, C, A and B, A and C, B and C, or A, B, and C may be included. Similarly, understanding of descriptions such as "at least one type" is also similar. "And/or" describes an association relationship between associated objects and indicates that three relationships may exist. For example, A and/or B may indicate the following three cases: Only A exists, both A and B exist, and only B exists. In addition, the character "/" usually indicates an "or" relationship between the associated objects, unless otherwise specified.

In this application, for same or similar parts in embodiments, mutual reference may be made between the embodiments, unless otherwise specified. In embodiments of this application and implementations/implementation methods of the embodiments, unless otherwise specified or a logical conflict occurs, terms and/or descriptions in different embodiments and implementations/implementation methods of the embodiments are consistent and may be mutually referenced. Technical features in different embodiments and implementations/implementation methods of the embodiments may be combined to form a new embodiment, implementation, or implementation method based on an internal logical relationship thereof. The following implementations of this application do not constitute a limitation on the protection scope of this application.

Unless otherwise specified, ordinal numbers such as "first" and "second" mentioned in embodiments of this application are intended to distinguish between a plurality of objects, but not to limit an order, a time sequence, a priority, or a degree of importance of the plurality of objects. In addition, descriptions of "first" and "second" do not mean that objects are definitely different.

This application provides a communication method in a high-frequency scenario, to resolve a problem that a signal coverage area is small and transmission performance is affected due to a high PAPR when a higher-order modulation signal is used for communication in a high-frequency scenario. In the method, a coding and modulation scheme and a precoding scheme at a transmit end are designed in a multidimensional manner. In this way, a transmit-end device may send M lower-order modulation signals to a receive-end device, where M is an integer greater than or equal to 2, for example, may be 2 or 3. After being transmitted through a channel, the M lower-order modulation signals may be superposed at a receive end in space domain or power domain (that is, an energy domain) to obtain a higher-order modulation signal. In the method, a PAPR of a transmit-end signal can be effectively reduced without compromising spectral efficiency, and the receive-end device may directly detect a higher-order constellation point obtained through superposition to decode a higher-order modulation signal, to ensure system performance. In addition, the higher-order modulation signal obtained through superposition at the receive end may be uniformly modulated or non-uniformly modulated, to effectively improve a capability of resisting phase noise.

The following first describes a transceiver system architecture to which technical solutions of this application are applied.

This application provides two transceiver system structures: a transceiver system architecture based on a single-point transmit end and a transceiver system architecture based on a multi-point transmit end. The single-point transmit end and the multi-point transmit end indicate whether an original bitstream at the transmit end is one independent bitstream or a plurality of independent bitstreams.

(1) In the transceiver system architecture based on a single-point transmit end, one independent bitstream at the transmit end undergoes low density parity check (LDPC) coding and then undergoes bit decomposition to obtain M sub-bitstreams, where M is a positive integer greater than or equal to 2. To be specific, one original bitstream may be decomposed into two, three, or more sub-bitstreams according to an actual requirement. The M sub-bitstreams are modulated based on modulation mapping relationships respectively corresponding to the M sub-bitstreams, to generate M lower-order modulation signals. A specific modulation mapping relationship is described in detail below in this application. Alternatively, one independent bitstream at the transmit end undergoes LDPC encoding, and then directly undergoes multidimensional modulation based on a correspondence between bits in an original bitstream and a symbol in each lower-order modulation signal, to generate M lower-order modulation signals. Then the M lower-order modulation signals are precoded at the transmit end to generate baseband signals, to compensate for impact of a channel, and reduce impact of a channel difference on a higher-order signal obtained through superposition at a receive end. The baseband signals pass through an up-conversion module, a power amplifier (PA), and other modules to generate M lower-order radio frequency signals to be sent on different antennas. The M lower-order modulation signals transmitted through a channel are superposed in space domain or power domain (namely, energy domain). Based on different designs of a superposed signal, a plurality of lower-order modulation signals may need to meet a specific amplitude ratio requirement (namely, a power ratio requirement) during superposition. A specific requirement is described below. The receive end receives, in a single-point mode, a higher-order modulation signal obtained by superposing the M lower-order modulation signals, and restores one bitstream through channel estimation, receive-end post-equalization, demodulation, and LDPC decoding.

Figure 2:
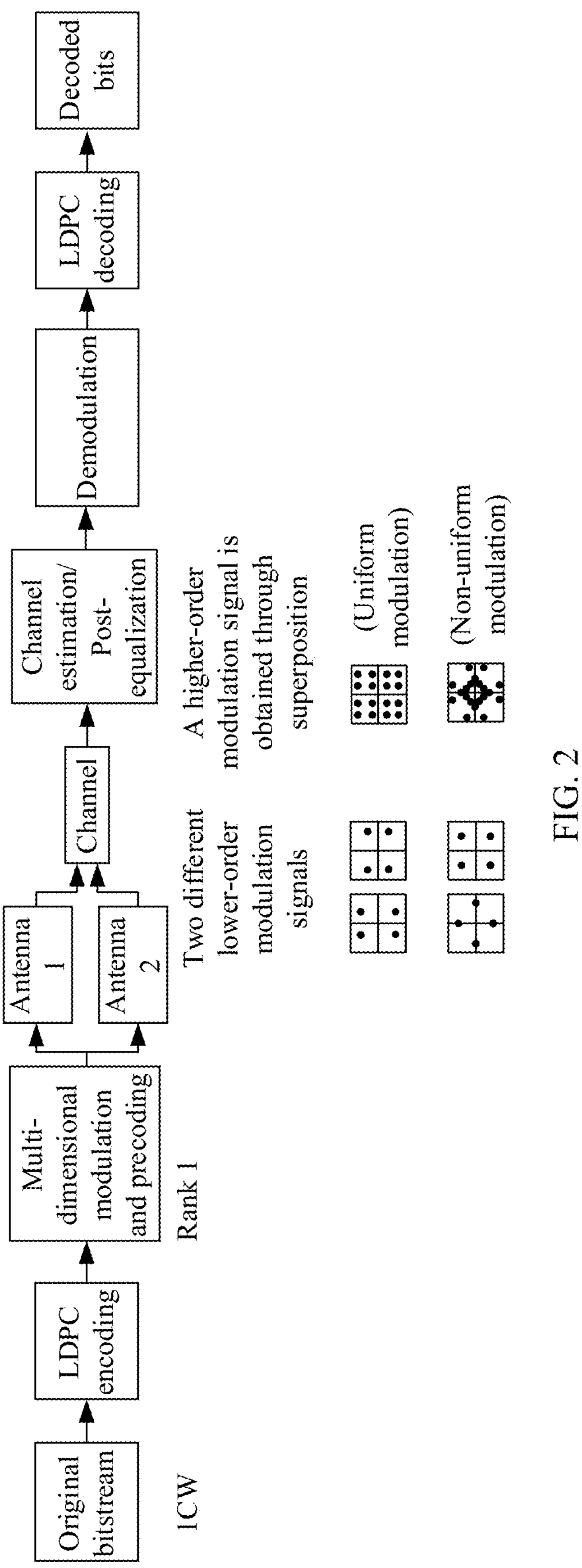
FIG. 2 is a diagram of a transceiver system architecture based on a single transmit end according to an embodiment of this application.

FIG. 2 shows an example transceiver system architecture based on a single-point transmit end in a case in which M=2 (to be specific, a transmit end sends two lower-order modulation signals). As shown in FIG. 2, one original bitstream at a transmit end undergoes LDPC encoding and then undergoes modulation, precoding, and power amplification to generate two different lower-order modulation signals. The two lower-order modulation signals are respectively sent through two different antennas, and the two lower-order modulation signals have different constellation patterns. After transmission is performed through a channel, a receive end receives a higher-order modulation signal, where the higher-order modulation signal is obtained by superposing the two lower-order modulation signals, a constellation pattern of the higher-order modulation signal is a combination of the constellation patterns of the two lower-order modulation signals, and the higher-order modulation signal may be uniformly modulated or non-uniformly modulated. The higher-order modulation signal sequentially undergoes channel estimation, post-equalization, demodulation, and LDPC decoding to obtain one bitstream.

In a high-frequency or millimeter-wave line of sight LOS scenario, the transceiver system architecture based on a single-point transmit end is designed in this application. In this way, when a rank-deficient channel matrix (rank=1) is used, a transmit-end device may send a plurality of lower-order modulation signals, where the plurality of lower-order modulation signals may be superposed at a receive end to obtain a higher-order modulation signal, to effectively reduce a PAPR of a transmit-end signal without affecting spectral efficiency. This effectively resolves a problem in the conventional technology that, when a rank-deficient channel matrix (rank=1) is used, a transmit end directly sends a higher-order modulation signal, and consequently, a PAPR of a transmit-end signal is high, leading to a small coverage area and low transmission efficiency.

(2) In the transceiver system structure based on a multi-point transmit end, M independent bitstreams at the transmit end separately undergo LDPC encoding, where LDPC encoding bit rates are the same. Then M bitstreams are modulated based on modulation mapping relationships respectively corresponding to the M bitstreams, to generate M lower-order modulation signals. Then the M lower-order modulation signals are precoded at the transmit end to generate baseband signals, to compensate for impact of a channel, and reduce impact of a channel difference on a higher-order signal obtained through superposition at a receive end. Then the baseband signals pass through an up-conversion module, a power amplifier PA, and other modules to generate M lower-order radio frequency signals to be sent on different antennas. The M lower-order modulation signals transmitted through a channel are superposed in space domain or power domain (namely, energy domain). Based on different designs of a superposed signal, a plurality of lower-order modulation signals may need to meet a specific amplitude ratio requirement (namely, a power ratio requirement) during superposition. A specific requirement is described below. The receive end receives, in a single-point mode, a higher-order modulation signal obtained by superposing the M lower-order modulation signals, and performs M-channel splitting after channel estimation, receive-end post-equalization, and demodulation are completed, where a splitting manner matches a superposition manner designed at the transmit end. Each signal obtained through splitting undergoes LDPC decoding to restore M bitstreams.

Figure 3:
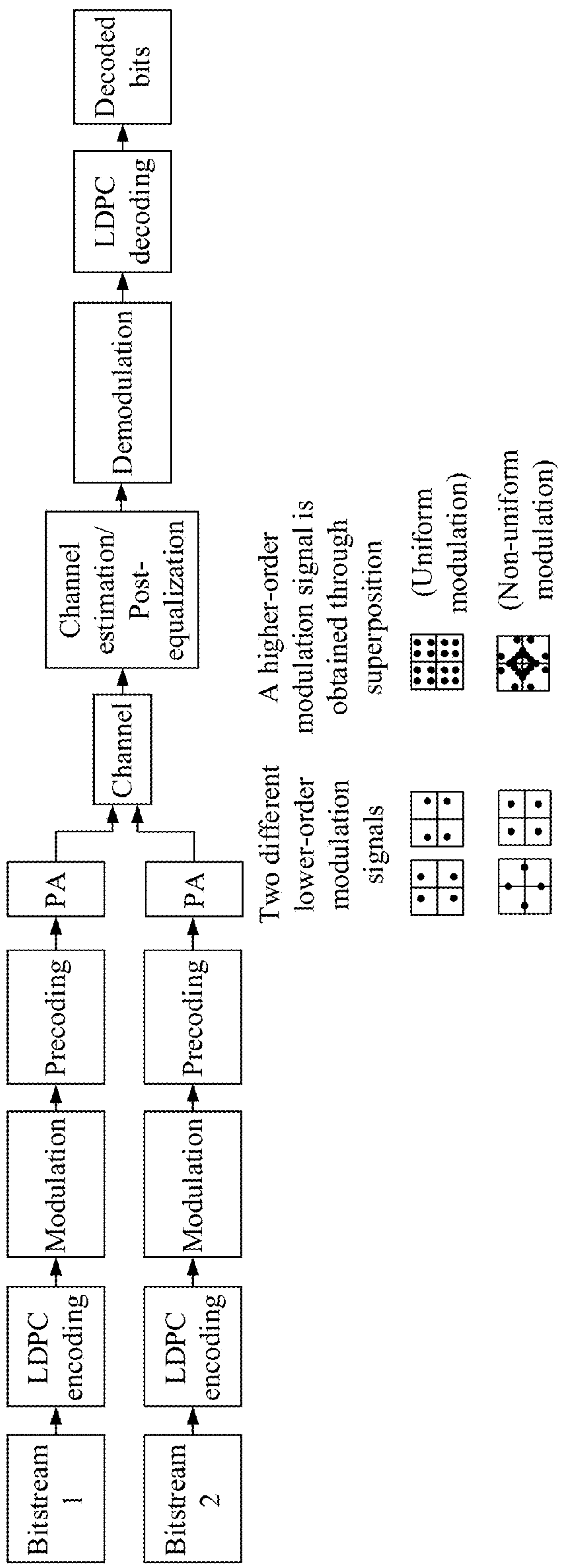
FIG. 3 is a diagram of a transceiver system architecture based on a multi-transmit end according to an embodiment of this application.

FIG. 3 shows an example transceiver system structure based on a multi-point transmit end in a case in which M=2 (to be specific, a transmit end sends two lower-order modulation signals). As shown in FIG. 3, two original bitstreams at a transmit end separately undergo LDPC encoding and then undergo modulation, precoding, and power amplification to generate two different lower-order modulation signals to be respectively sent through two different antennas. The two lower-order modulation signals have different constellation patterns. After transmission is performed through a channel, a receive end directly receives a higher-order modulation signal, where the higher-order modulation signal is obtained by superposing the two lower-order modulation signals, and a constellation pattern of the higher-order modulation signal is a combination of the constellation patterns of the two lower-order modulation signals. Then the higher-order modulation signal sequentially undergoes channel estimation, post-equalization, and demodulation, and then is split into two signals. Then each signal undergoes LDPC decoding to obtain two bitstreams.

In a high-frequency or millimeter-wave line of sight LOS scenario, the transceiver system architecture based on a multi-point transmit end is designed in this application. In this way, two codewords can be transmitted in a high-frequency channel with a rank of 1. In addition, the transmit end generates a plurality of lower-order modulation signals through lower-order modulation, so that the transmit end can have a low PAPR. In addition, impact of interlayer interference does not need to be considered in a design of a superposed signal, so that utilization of a transmit-end power can be improved. This effectively resolves the following problems in the conventional technology: When a rank-deficient channel matrix (rank=1) is used, two-codeword (codeword, CW) transmission cannot be supported; when a non-rank-deficient channel matrix (rank=2) is used, in two-codeword transmission, due to existence of inter-stream interference, a requirement is imposed on a signal-to-noise ratio, and a transmit-end power cannot be effectively utilized; and so on.

The following describes in detail technical solutions provided in this application.

Figure 4:
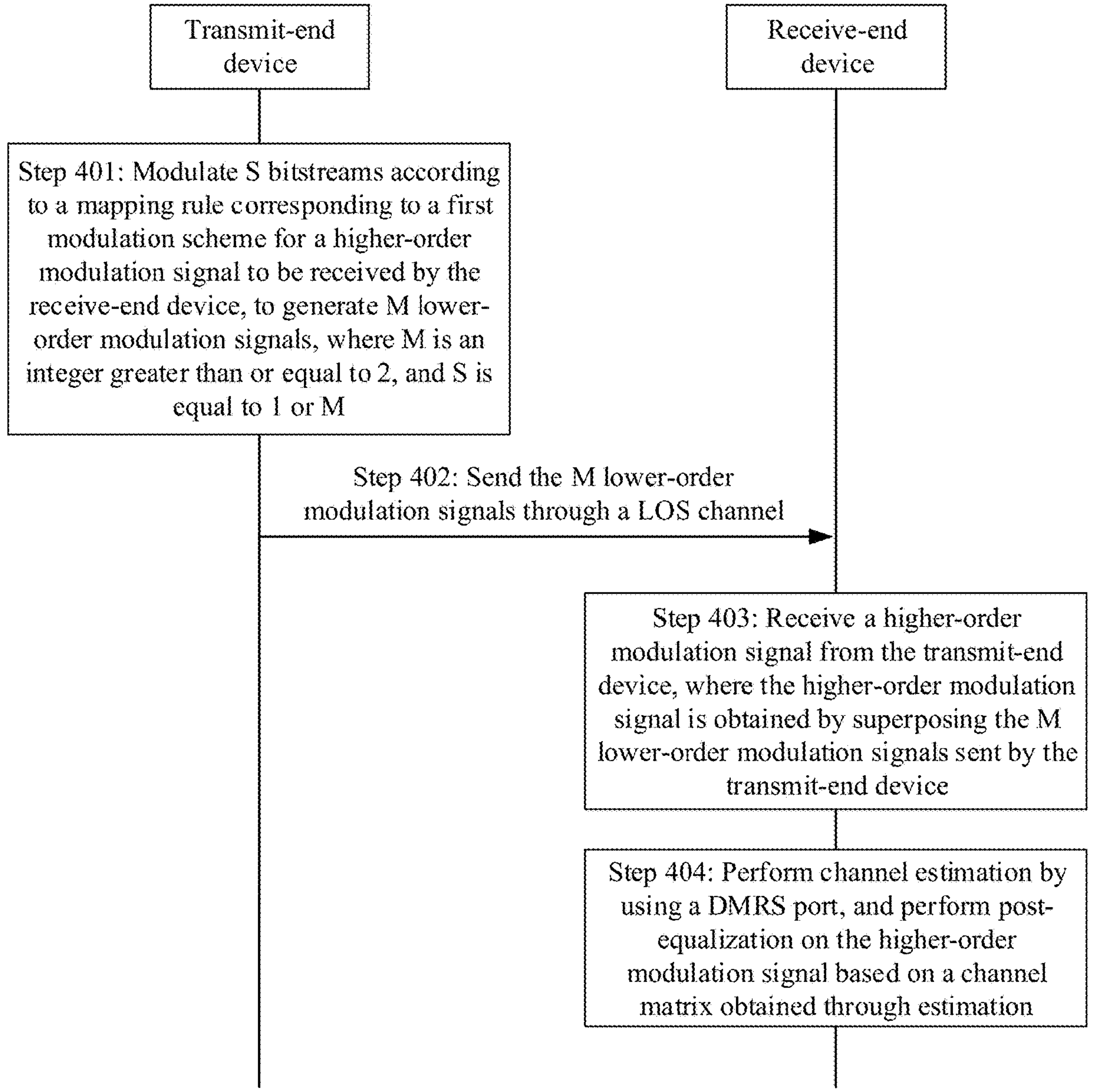
FIG. 4 is a schematic flowchart of a communication method in a high-frequency scenario according to an embodiment of this application.

FIG. 4 is an example diagram of a communication method in a high-frequency scenario according to an embodiment of this application. As shown in FIG. 4, the method includes the following steps.

Step 401: A transmit-end device modulates S bitstreams according to a mapping rule corresponding to a first modulation scheme for a higher-order modulation signal to be received by a receive-end device, to generate M lower-order modulation signals, where M is an integer greater than or equal to 2, and S is equal to 1 or M.

In this application, the higher-order modulation signal to be received by the receive-end device is a higher-order modulation signal indirectly sent by the transmit-end device to a receive end. Actually, the higher-order modulation signal is obtained by superposing the M lower-order modulation signals actually sent by the transmit-end device. In other words, the higher-order modulation signal is a higher-order modulation signal that a transmit end expects the receive end to receive.

The first modulation scheme used for the higher-order modulation signal is N-order modulation, namely, higher-order modulation, where N is an integer greater than or equal to 4. For example, the first modulation scheme may be 16 quadrature amplitude modulation (QAM), 32QAM, 64QAM, or another higher-order modulation scheme.

The first modulation scheme may be uniform modulation or non-uniform modulation. This is not specifically limited in this application. The uniform modulation means that geometric distribution of QAM is regular (square QAM) according to an existing standard and all constellation points appear at equal probabilities. The non-uniform modulation means that a shape of constellation point distribution of a modulation signal is irregular (in geometric shaping modulation, which may be circular QAM or QAM in another shape), or probability distributions of constellation points are different (in probability shaping modulation).

The S bitstreams may be one independent bitstream, and S is equal to 1 in this case. Alternatively, the S bitstreams may be M sub-bitstreams obtained by performing bit decomposition on one independent bitstream, and S is equal to M in this case. Alternatively, the S bitstreams may be M independent bitstreams, and S is equal to M in this case. For example, in a transceiver system architecture based on a single-point transmit end, the S bitstreams are one independent original bitstream, or M sub-bitstreams obtained by performing bit decomposition on one independent original bitstream; and in a transceiver system architecture based on a multi-point transmit end, the S bitstreams are M independent bitstreams.

For example, when the S bitstreams are one independent bitstream, the transmit-end device may directly perform multidimensional modulation on the independent bitstream according to the mapping rule corresponding to the first modulation scheme, to generate the M lower-order modulation signals. In this way, bit-to-complex symbol mapping is directly completed without an intermediate bit decomposition process. A specific modulation process is described in detail below in this application.

When the S bitstreams are M sub-bitstreams obtained by performing bit decomposition on one independent bitstream or are M independent bitstreams, the transmit-end device may separately modulate the M bitstreams according to the mapping rule corresponding to the first modulation scheme, to generate the M lower-order modulation signals. In the mapping rule, modulation mapping relationships respectively corresponding to the M bitstreams need to be jointly designed. A specific modulation process is described in detail below in this application.

The mapping rule is used to superpose the M lower-order modulation signals to obtain the higher-order modulation signal to be received by the receive-end device. The higher-order modulation signal may also be referred to as a superposed signal.

During specific implementation, the mapping rule may be represented by a mapping code table, a formula, or a constellation diagram. For example, in a possible design, when the first modulation scheme is 16 quadrature amplitude modulation QAM and M is equal to 2, a modulation order N is 4, and the mapping rule includes: a correspondence between bits in an original bitstream and a complex symbol in the 16QAM, and a correspondence between a complex symbol in the 16QAM and a fourth complex symbol in a first lower-order modulation signal and a fifth complex symbol in a second lower-order modulation signal. The original bitstream includes a bit corresponding to the first lower-order modulation signal and a bit corresponding to the second lower-order modulation signal. The first lower-order modulation signal corresponds to $2^{N/2}$ fourth complex symbols, and the second lower-order modulation signal corresponds to $2^{N/2}$ fifth complex symbols. Results obtained by superposing, based on an equi-amplitude ratio, each of the $2^{N/2}$ fourth complex symbols corresponding to the first lower-order modulation signal and each of the $2^{N/2}$ fifth complex symbols corresponding to the second lower-order modulation signal are in a one-to-one correspondence with complex symbols in the 16QAM. In the 16QAM, the $2^{N/2}$ fourth complex symbols are $K\{1+2j, 1-2j, -1+2j, -1-2j\}$, the $2^{N/2}$ fifth complex symbols are $L\{2+1j, 2-1j, -2+1j, -2-1j\}$, and K and L are scale factors. For example, the mapping rule may be shown in Table 6 below.

In another possible design, when the first modulation scheme is non-uniform constellation (NUC)-16QAM and M is equal to 2, a modulation order N is 4, and the mapping rule includes: a correspondence between bits in an original bitstream and a complex symbol in the NUC-16QAM, and a correspondence between a complex symbol in the NUC-16QAM and a fourth complex symbol in a first lower-order modulation signal and a fifth complex symbol in a second lower-order modulation signal. The original bitstream includes a bit corresponding to the first lower-order modulation signal and a bit corresponding to the second lower-order modulation signal. The first lower-order modulation signal corresponds to $2^{N/2}$ fourth complex symbols, and the second lower-order modulation signal corresponds to $2^{N/2}$ fifth complex symbols. Results obtained by superposing, based on an equi-amplitude ratio, each of the $2^{N/2}$ fourth complex symbols corresponding to the first lower-order modulation signal and each of the $2^{N/2}$ fifth complex symbols corresponding to the second lower-order modulation signal are in a one-to-one correspondence with complex symbols in the NUC-16QAM. The $2^{N/2}$ fourth complex symbols are $K\{\sqrt{2}j, \sqrt{2}, -\sqrt{2}j, -\sqrt{2}\}$, the $2^{N/2}$ fifth complex symbols are L{1+1j, 1−1j, −1+1j, −1−1j}, and K and L are scale factors. For example, a symbol correspondence in the mapping rule may be shown in Table 11 below.

In still another possible design, when the first modulation scheme is 64QAM and M is equal to 2, a modulation order N is 6, and the mapping rule includes: a correspondence between bits in an original bitstream and a complex symbol in the 64QAM, and a correspondence between a complex symbol in the 64QAM and a fourth complex symbol in a first lower-order modulation signal and a fifth complex symbol in a second lower-order modulation signal. The original bitstream includes a bit corresponding to the first lower-order modulation signal and a bit corresponding to the second lower-order modulation signal. The first lower-order modulation signal corresponds to $2^{N/2}$ fourth complex symbols, and the second lower-order modulation signal corresponds to $2^{N/2}$ fifth complex symbols. Results obtained by superposing, based on an equi-amplitude ratio, each of the $2^{N/2}$ fourth complex symbols corresponding to the first lower-order modulation signal and each of the $2^{N/2}$ fifth complex symbols corresponding to the second lower-order modulation signal are in a one-to-one correspondence with complex symbols in the 64QAM. The $2^{N/2}$ fourth complex symbols are P{1+6j, 1+2j, 1−2j, 1−6j, −1−6j, −1−2j, −1+2j, −1+6j}, and the $2^{N/2}$ fifth complex symbols are Q{6+1j, 2+1j, −2+1j, −6+1j, −6−1j, −2−1j, 2−1j, 6−1j}. In this design, a symbol correspondence in the mapping rule may be shown in Table 7 below. Alternatively, the $2^{N/2}$ fourth complex symbols are P{4+3j, 4+1j, 4−1j, 4−3j, −4−3j, −4−1j, −4+1j, −4+3j}, and the $2^{N/2}$ fifth complex symbols are Q{3+4j, 1+4j, −1+4j, −3+4j, −3−4j, −1−4j, 1−4j, 3−4j}. P and Q are scale factors. For example, a symbol correspondence in the mapping rule may be shown in Table 8 below.

In still another possible design, when the first modulation scheme is NUC-64QAM and M is equal to 2, a modulation order N is 6, and the mapping rule includes: a correspondence between bits in an original bitstream and a complex symbol in the NUC-64QAM, and a correspondence between a complex symbol in the NUC-64QAM and a fourth complex symbol in a first lower-order modulation signal and a fifth complex symbol in a second lower-order modulation signal. The original bitstream includes a bit corresponding to the first lower-order modulation signal and a bit corresponding to the second lower-order modulation signal. The first lower-order modulation signal corresponds to $2^{N/2}$ fourth complex symbols, and the second lower-order modulation signal corresponds to $2^{N/2}$ fifth complex symbols. Results obtained by superposing, based on an equi-amplitude ratio, each of the $2^{N/2}$ fourth complex symbols corresponding to the first lower-order modulation signal and each of the $2^{N/2}$ fifth complex symbols corresponding to the second lower-order modulation signal are in a one-to-one correspondence with complex symbols in the NUC-64QAM. The $2^{N/2}$ fourth complex symbols are P{1, 1+1j, 1j, −1+1j, −1, −1−1j, −1j, 1−1j}, the $2^{N/2}$ fifth complex symbols are $$Q\left\{\sqrt{2},\ \frac{\sqrt{2}}{2}(1+1j),\ \sqrt{2}\,j,\ \frac{\sqrt{2}}{2}(-1+1j),\ -\sqrt{2},\ \frac{\sqrt{2}}{2}(-1-1j),\ -\sqrt{2}\,j,\ \frac{\sqrt{2}}{2}(1-1j)\right\},$$

and P and Q are scale factors. For example, a symbol correspondence in the mapping rule may be shown in Table 12 below.

The foregoing implementations are merely examples for description. To be specific, the mapping rule may be specifically represented by any code mapping table, formula, or schematic table of a symbol correspondence in the following examples of this application. For brevity, details are not described herein in this application. A specific value in any code mapping table or schematic table of a symbol correspondence below may be proportionally increased or decreased. This is not limited in this application. For example, in Table 8, the $2^{N/2}$ fourth complex symbols may be P{4+3j, 4+1j, 4−1j, 4−3j, −4−3j, −4−1j, −4+1j, −4+3j}, the $2^{N/2}$ fifth complex symbols are Q{3+4j, 1+4j, −1+4j, −3+4j, −3−4j, −1−4j, 1−4j, 3−4j}, and P and Q are scale factors. Similarly, this form of proportional scaling is also applicable to other tables. For brevity, details are not described herein. Specifically, the mapping rule may include one or more of information in a code mapping table or a schematic table of a symbol correspondence in the following examples, for example, include information in only some columns, or include information in all columns. For example, a schematic table of a symbol correspondence in a superposed-signal splitting scheme below shows a correspondence between an Rx symbol, a Tx1 symbol, and a Tx2 symbol. For a mapping relationship between Rx coding and the Rx symbol, refer to an existing standard. Certainly, in a possible implementation, a correspondence between the Rx symbol, the Tx1 symbol, the Tx2 symbol, and the Rx coding may alternatively be directly shown in one table. This is not limited in this application. In addition, the code mapping table and the schematic table of a symbol correspondence may be preconfigured at the transmit end and the receive end. This is not limited in this application.

It should be noted that, in this embodiment of this application, the "lower-order" is defined relative to the "higher-order" obtained through superposition at the receive end. To be specific, the M lower-order modulation signals are lower-order signals relative to the higher-order modulation signal obtained through superposition at the receive end. Currently, modulation with a modulation order greater than 4 is usually considered as higher-order modulation, and modulation with a modulation order less than or equal to 4 is lower-order modulation. Therefore, in this application, the M lower-order modulation signals may not all be actual "lower-order" modulation signals. For example, in the following examples of this application, a QPSK signal and a 16QAM signal may be superposed to generate a 64QAM signal. The QPSK signal and the 16QAM signal may be considered as "lower-order" modulation signals relative to the 64QAM signal.

Based on the foregoing several possible designs, the transmit-end device may send a plurality of lower-order modulation signals, where the plurality of lower-order modulation signals may be superposed at the receive end to obtain a higher-order modulation signal, to effectively reduce a PAPR of a transmit-end signal without affecting spectral efficiency. In addition, the plurality of lower-order modulation signals may be superposed based on an equi-amplitude ratio (namely, an equi-power ratio), to fully utilize a transmit power at the transmit end.

It can be learned from the foregoing descriptions that the transmit end modulates the S bitstreams according to the mapping rule to generate the M lower-order modulation signals, and the higher-order modulation signal may be obtained by superposing the M lower-order modulation signals.

Specifically, the mapping rule may include two possible implementations: a joint coding and modulation scheme, and a superposed-signal splitting scheme. This may be understood as two modulation schemes. A specific modulation process is described below in this application with reference to the two specific implementations of the mapping rule. It should be noted that names of the two implementations are merely examples for ease of description, but do not constitute a limitation on solutions of this application.

1. Joint Coding and Modulation Scheme

Specifically, the transmit end performs joint coding and modulation on the S bitstreams to obtain the M lower-order modulation signals. It should be noted that, in this solution, S is equal to M, and the S bitstreams are M bitstreams. This may be understood as that there are M bitstreams at the transmit end, and the M bitstreams may be M sub-bitstreams obtained by performing bit decomposition on one independent bitstream, or may be M independent bitstreams. This is not limited.

In this solution, the mapping rule indicates a bit-to-complex symbol modulation mapping relationship corresponding to each of the M bitstreams at the transmit end. Modulation mapping relationships respectively corresponding to the M bitstreams meet the following: M complex symbols obtained by mapping bits in the M bitstreams based on modulation mapping relationships respectively corresponding to the bits are superposed based on a preset amplitude ratio to obtain complex symbols in the higher-order modulation signal to be received by the receive-end device. In this application, the modulation mapping relationship is bit-to-symbol mapping, and may also be referred to as a code mapping rule. To be specific, the transmit end may map the bits in the M bitstreams to complex symbols through joint coding and modulation, to generate the M lower-order modulation signals.

For example, when the transmit end sends two lower-order modulation signals (in other words, M=2) and N-order modulation is used for the higher-order modulation signal to be received by the receive end (in this case, N is greater than or equal to 4), to enable a constellation diagram of the higher-order modulation signal to be received by the receive end to meet Gray mapping and improve demodulation performance, the mapping rule may include the following content.

(1) $2^2$ values of two bits in a first bitstream are respectively mapped to $2^2$ first complex symbols.

(2) $2^{N-2}$ values of N−2 bits in a second bitstream are respectively mapped to $2^{N-2}$ second complex symbols based on different values of the two bits in the first bitstream, and when values of the two bits in the first bitstream vary, same values of the N−2 bits in the second bitstream are mapped to different second complex symbols among the $2^{N-2}$ second complex symbols.

(3) The first complex symbols to which the two bits in the first bitstream are mapped and the second complex symbols to which the N−2 bits in the second bitstream are mapped are superposed based on a predefined amplitude ratio to obtain third complex symbols in the higher-order modulation signal to be received by the receive-end device.

Therefore, in this modulation scheme, that the transmit-end device modulates two bitstreams based on the joint coding and modulation scheme to generate two lower-order modulation signals may be: sequentially mapping, according to the mapping rule, every two bits in the first bitstream to a first complex symbol among the $2^2$ first complex symbols, to form the first lower-order modulation signal; and sequentially mapping every N−2 bits in the second bitstream to a second complex symbol among the $2^{N-2}$ second complex symbols, to form the second lower-order modulation signal.

It can be learned from the foregoing content that, when the transmit end sends two lower-order modulation signals and N-order modulation is used for the higher-order modulation signal to be received by the receive end, the joint coding and modulation scheme indicated by the mapping rule is equivalent to: splitting a constellation diagram for N-order modulation into a constellation diagram for 2-order modulation and a constellation diagram for (N−2)-order modulation, to reduce a modulation order of a transmit-end signal, so that the two lower-order modulation signals sent by the transmit end can be superposed at the receive end to obtain the higher-order modulation signal; and then jointly designing a modulation mapping relationship between two constellation diagrams for lower-order modulation, so that a constellation diagram for higher-order modulation that is generated by superposing the two constellation diagrams for lower-order modulation based on a specific amplitude ratio meets Gray mapping.

It can be understood that, when N-order modulation is used for the higher-order modulation signal to be received by the receive end, the transmit end may alternatively send more lower-order modulation signals. In this case, N is greater than or equal to 6, and the mapping rule may be understood as follows: A constellation diagram for N-order modulation is split into more constellation diagrams for lower-order modulation, to reduce a modulation order of a transmit-end signal. For example, when the transmit end sends three lower-order modulation signals, a constellation diagram for N-order modulation may be split into two constellation diagrams for 2-order modulation and one constellation diagram for (N−4)-order modulation. In addition, a modulation mapping relationship between a plurality of constellation diagrams for lower-order modulation is jointly designed, so that a constellation diagram for N-order modulation that is generated by superposing the plurality of constellation diagrams for lower-order modulation based on a specific amplitude ratio meets Gray mapping.

To be specific, the mapping rule may be designed based on the following considerations:

(a) A higher-order constellation diagram is split, so that a plurality of lower-order signals can be superposed to obtain a higher-order signal.

(b) A specific modulation mapping relationship is designed, so that a higher order obtained through superposition can meet Gray mapping.

A case in which Gray mapping is met facilitates encoding and decoding at the transmit end and the receive end. Based on the foregoing considerations, different specific modulation mapping relationships may be designed based on actual cases. This application provides several specific modulation mapping relationships in different cases as examples, but is not limited to the modulation mapping relationships.

It should be noted that, in this application, after generating a plurality of lower-order modulation signals through modulation, the transmit end further needs to perform power amplification by using a power amplifier PA module to generate a plurality of radio frequency signals, and then can send the plurality of radio frequency signals through an antenna. Therefore, when the plurality of lower-order modulation signals at the transmit end need to meet a specific amplitude ratio, the plurality of radio frequency signals obtained through power amplification also need to meet a specific power ratio. Specifically, the power ratio is a square of the amplitude ratio.

The following specifically describes the joint coding and modulation scheme in this application by using several examples.

In this application, the joint coding and modulation scheme means that a group of associated modulation mapping relationships are designed for a plurality of lower-order signals at the transmit end. In the following several examples, the group of associated modulation mapping relationships may be specifically represented by a code mapping table, or a constellation diagram or a formula that corresponds to the code mapping table. Joint coding and modulation are performed on a plurality of bitstreams at the transmit end in a manner indicated by the following coding mapping table, to generate a plurality of lower-order signals, so that the plurality of lower-order signals can be superposed at the receive end to generate a higher-order signal, and Gray mapping is met, to improve demodulation performance at the receive end. A modulation mapping relationship specified in a protocol may be used for a higher-order signal to be received by the receive end. In this application, a code mapping table for a higher-order signal obtained through superposition at the receive end is not modified, to reduce design complexity.

In the following several examples, corresponding joint coding and modulation schemes for a transmit-end signal are respectively provided for several higher-order signal modulation schemes such as 16QAM, 32QAM, and 64QAM. The joint coding and modulation schemes specifically include: Example 1: Two QPSK signals are superposed based on a specific amplitude ratio to generate a 16QAM signal that meets Gray mapping. Example 2: A QPSK signal and an 8QAM signal are superposed based on a specific amplitude ratio to generate a 32QAM signal that meets Gray mapping. Example 3: A QPSK signal and a 16QAM signal are superposed based on a specific amplitude ratio to generate a 64QAM signal that meets Gray mapping. Example 4: Three QPSK signals are superposed based on a specific amplitude ratio to generate a 64QAM signal that meets Gray mapping.

In the following examples, Tx1, Tx2, and Tx3 represent a plurality of lower-order signals at the transmit end, and Rx represents a higher-order signal to be received by the receive end, where the higher-order signal is obtained by superposing the plurality of lower-order signals at the transmit end. For example, Tx1 coding represents bit coding in a first bitstream at the transmit end; a Tx1 symbol represents a complex symbol in a first lower-order modulation signal generated by the transmit end by modulating the first bitstream; Tx2 coding represents bit coding in a second bitstream at the transmit end; a Tx2 symbol represents a complex symbol in a second lower-order modulation signal generated by the transmit end by modulating the second bitstream; Tx3 coding represents bit coding in a third bitstream at the transmit end; a Tx3 symbol represents a complex symbol in a third lower-order modulation signal generated by the transmit end by modulating the third bitstream; Rx coding represents bit coding in a bitstream at the receive end, where the bitstream corresponds to a higher-order modulation signal at the receive end, and may be obtained by decoding the higher-order modulation signal at the receive end; and an Rx symbol represents a complex symbol in the higher-order modulation signal at the receive end.

Example 1: Two QPSK Signals are Superposed Based on a Specific Amplitude Ratio to Generate a 16QAM Signal that Meets Gray Mapping In Example 1, QPSK modulation is used for two lower-order signals Tx1 and Tx2 at the transmit end, and 16QAM modulation is used for a higher-order signal Rx to be received by the receive end. After being modulated, the two QPSK signals are superposed based on an amplitude ratio of 2:1 (corresponding to a power ratio of 4:1) in space domain or power domain (namely, energy domain), to generate the 16QAM signal that meets Gray mapping.

The Tx1 (QPSK) serves as a sign bit to indicate a quadrant in which a higher-order constellation obtained through superposition is located. A modulation mapping relationship of the Tx2 (QPSK) varies regularly with the quadrant indicated by the Tx1. It should be noted that, in Example 1, alternatively, the Tx2 may serve as a sign bit, and a modulation mapping relationship of the Tx1 needs to vary regularly with a quadrant indicated by the Tx2. To be specific, which one of the Tx1 and the Tx2 specifically serves as a sign bit is not limited.

Therefore, joint coding and modulation in Example 1 need to meet the following criterion: An amplitude ratio of the two lower-order QPSK signals is 2:1, one of the two lower-order QPSK signals serves as a sign bit, a modulation mapping relationship of the other lower-order QPSK signal varies with a quadrant indicated by the sign bit, and a higher-order 16QAM signal that meets Gray mapping can be generated by superposing the two lower-order QPSK signals.

Figure 5:
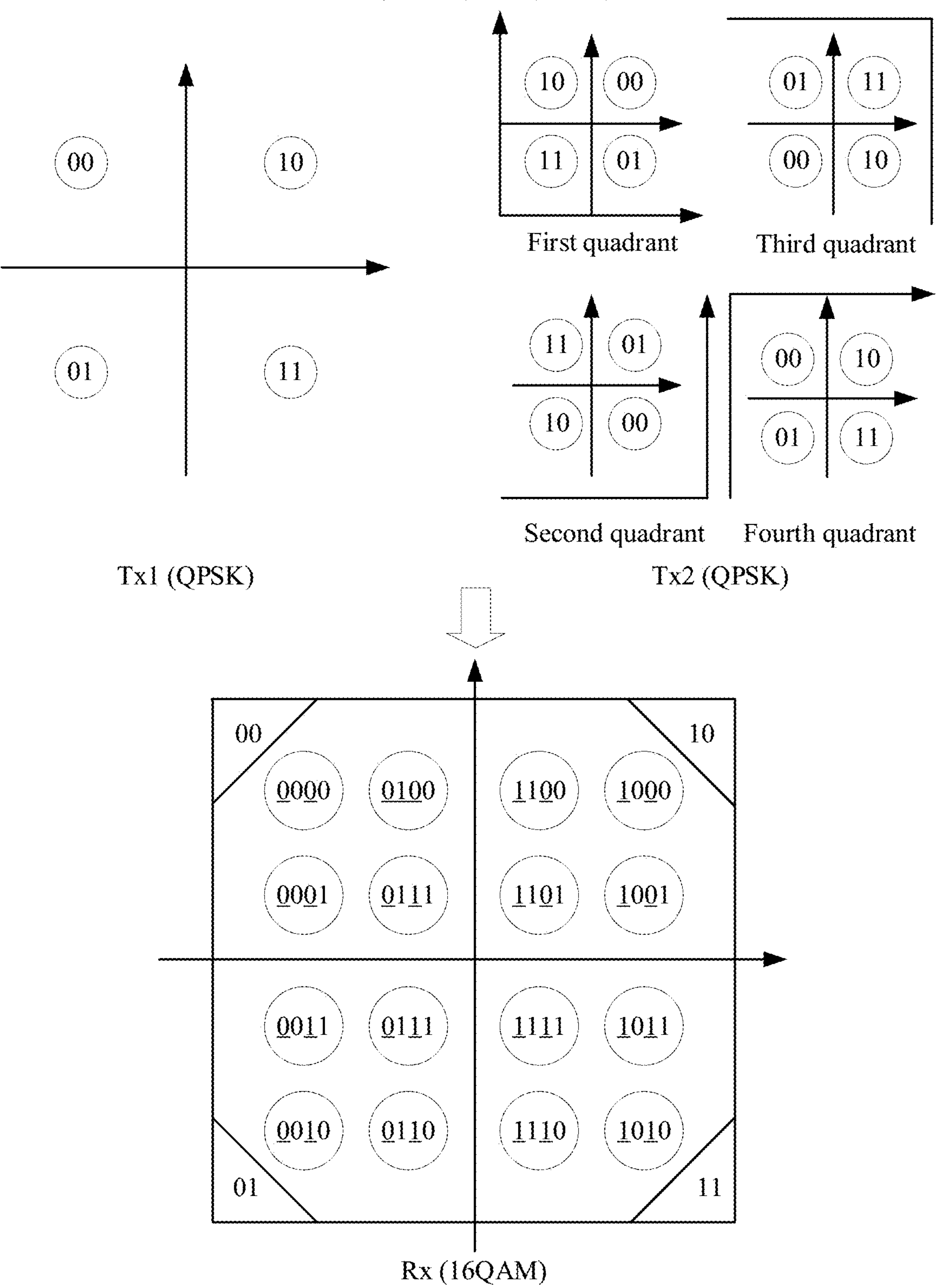
FIG. 5 is a diagram of superposing two QPSK signals based on a specific amplitude ratio to generate a 16QAM signal that meets Gray mapping according to Example 1 in an embodiment of this application.

FIG. 5 is an example diagram of superposing two QPSK signals based on a specific amplitude ratio to generate a 16QAM signal that meets Gray mapping in Example 1, where the specific amplitude ratio is 2:1. A number in a circle indicates a raw bit corresponding to a constellation point. A location of a circle indicates a complex symbol represented by a constellation point. A bit-to-symbol modulation mapping relationship is indicated by a constellation diagram. Tx2 provides four modulation mapping relationships suitable for different quadrants. Small coordinate axes in the middle indicate a symbol of the Tx2, and large coordinate axes on outer sides indicate a quadrant to which a modulation mapping relationship is applicable. As shown in FIG. 5, after a modulation mapping relationship of a Tx1 (QPSK) sign bit is determined, a modulation mapping relationship of the Tx2 (QPSK) varies in different quadrants.

TABLE 1

Code mapping table in a case in which two QPSK signals are superposed based on an amplitude ratio of 2:1 to generate a 16QAM signal

| Number | Tx1 coding | Tx1 symbol | Tx2 coding | Tx2 symbol | Rx coding | Rx symbol = 2 × Tx1 symbol + Tx2 symbol |
|---|---|---|---|---|---|---|
| 1 | 10 | 1 + 1j | 10 | −1 + 1j | 1100 | 1 + 3j |
| 2 | | | 11 | −1 − 1j | 1101 | 1 + 1j |
| 3 | | | 01 | 1 − 1j | 1001 | 3 + 1j |
| 4 | | | 00 | 1 + 1j | 1000 | 3 + 3j |
| 5 | 11 | 1 − 1j | 10 | −1 − 1j | 1110 | 1 − 3j |
| 6 | | | 11 | −1 + 1j | 1111 | 1 − 1j |
| 7 | | | 01 | 1 + 1j | 1011 | 3 − j |
| 8 | | | 00 | 1 − 1j | 1010 | 3 − 3j |
| 9 | 01 | −1 − 1j | 10 | 1 − 1j | 0110 | −1 − 3j |
| 10 | | | 11 | 1 + 1j | 0111 | −1 − 1j |
| 11 | | | 01 | −1 + 1j | 0011 | −3 − 1j |
| 12 | | | 00 | −1 − 1j | 0010 | −3 − 3j |
| 13 | 00 | −1 + 1j | 10 | 1 + 1j | 0100 | −1 + 3j |
| 14 | | | 11 | 1 − 1j | 0101 | −1 + 1j |
| 15 | | | 01 | −1 − 1j | 0001 | −3 + 3j |
| 16 | | | 00 | −1 + 1j | 0000 | −3 + 1j |

Table 1 shows a code mapping table in Example 1 in which two QPSK signals are superposed based on an amplitude ratio of 2:1 to generate a 16QAM signal. It should be noted that the code mapping table shown in Table 1 may include all or some columns of the code mapping table. For example, for the transmit end, when modulating two bitstreams, the transmit end needs to know a mapping relationship between Tx1 coding and a Tx1 symbol (namely, a modulation mapping relationship of Tx1) in the table, and also needs to know a mapping relationship between Tx2 coding and a Tx2 symbol (namely, a modulation mapping relationship of the Tx1) in the table. To be specific, a code mapping table for the transmit end needs to include at least four columns: Tx1 coding, Tx1 symbol, Tx2 coding, and Tx2 symbol. Optionally, if there is one independent bitstream at the transmit end, the transmit end further needs to know correspondences (namely, bit location splitting relationships) between Rx coding and Tx1 coding and between Rx coding and Tx2 coding, to split one bitstream into two bitstreams. To be specific, the code mapping table for the transmit end further needs to include an Rx coding column. Optionally, the code mapping table for the transmit end may further include an Rx symbol column, indicating a higher-order signal that the transmit end expects the receive end to receive. For the receive end, because the receive end receives a higher-order modulation signal and the higher-order modulation signal needs to be demodulated and decoded, the receive end needs to know a correspondence between an Rx symbol and Rx coding (namely, a modulation mapping relationship of Rx). To be specific, a code mapping table for the receive end needs to include an Rx symbol column and an Rx coding column. Optionally, if the transmit end sends two independent bitstreams, the receive end further needs to know correspondences (namely, bit location splitting relationships) between Rx coding and Tx1 coding and between Rx coding and Tx2 coding, to split one bitstream obtained through decoding into two bitstreams. To be specific, optionally, the code mapping table for the receive end further include a Tx1 coding column and a Tx2 coding column. It should be understood that designs of the code mapping tables for the transmit end and the receive end may vary based on different signaling designs related to signal sending, and may be prestored on the transmit-end device and the receive-end device. In addition, it should be noted that the descriptions of the code mapping table in this part are applicable to any code mapping table below, and details are not described below again.

The following can be learned from the content in Table 1:

The modulation mapping relationship of the Tx1 (QPSK) is as follows: Bits {10, 00, 01, 11} in a Tx1 bitstream are respectively mapped to four first complex symbols {1+1j, −1+1j, −1−1j, 1−1j} in a first quadrant, a second quadrant, a third quadrant, and a fourth quadrant. Specifically, the bits 10 in the Tx1 bitstream are mapped to the first complex symbol 1+1j in the first quadrant, the bits 11 in the Tx1 bitstream are mapped to the first complex symbol 1−1j in the fourth quadrant, the bits 01 in the Tx1 bitstream are mapped to the first complex symbol −1−1j in the third quadrant, and the bits 00 in the Tx1 bitstream are mapped to the first complex symbol −1+1j in the second quadrant.

The modulation mapping relationship of the Tx2 (QPSK) is as follows: Bits {10, 00, 01, 11} in a Tx2 bitstream are respectively mapped to four second complex symbols {1+1j, −1+1j, −1−1j, 1−1j} in the first quadrant, the second quadrant, the third quadrant, and the fourth quadrant. However, when a quadrant of a complex symbol to which bits in the Tx1 bitstream are mapped varies, a modulation mapping relationship of bits in the Tx2 bitstream varies. To be specific, when a quadrant of a complex symbol to which bits in the Tx1 bitstream are mapped varies, same bits in the Tx2 bitstream are mapped to different complex symbols.

Specifically, when bits in the Tx1 bitstream are 10, the bits correspond to the first quadrant. The bits 10 in the Tx2 bitstream are mapped to the second complex symbol −1+1j in the second quadrant, the bits 11 in the Tx2 bitstream are mapped to the second complex symbol −1−1j in the third quadrant, the bits 01 in the Tx2 bitstream are mapped to the second complex symbol 1−1j in the fourth quadrant, and the bits 00 in the Tx2 bitstream are mapped to the second complex symbol 1+1j in the first quadrant.

When bits in the Tx1 bitstream are 11, the bits correspond to the fourth quadrant. The bits 10 in the Tx2 bitstream are mapped to the second complex symbol −1-1j in the third quadrant, the bits 11 in the Tx2 bitstream are mapped to the second complex symbol −1+1j in the second quadrant, the bits 01 in the Tx2 bitstream are mapped to the second complex symbol 1+1j in the first quadrant, and the bits 00 in the Tx2 bitstream are mapped to the second complex symbol 1−1j in the fourth quadrant.

When bits in the Tx1 bitstream are 01, the bits correspond to the third quadrant. The bits 10 in the Tx2 bitstream are mapped to the second complex symbol 1−1j in the fourth quadrant, the bits 11 in the Tx2 bitstream are mapped to the second complex symbol 1+1j in the first quadrant, the bits 01 in the Tx2 bitstream are mapped to the second complex symbol −1+1j in the second quadrant, and the bits 00 in the Tx2 bitstream are mapped to the second complex symbol −1−1j in the third quadrant.

When bits in the Tx1 bitstream are 00, the bits correspond to the second quadrant. The bits 10 in the Tx2 bitstream are mapped to the second complex symbol 1+1j in the first quadrant, the bits 11 in the Tx2 bitstream are mapped to the second complex symbol 1−1j in the fourth quadrant, the bits 01 in the Tx2 bitstream are mapped to the second complex symbol −1−1j in the third quadrant, and the bits 00 in the Tx2 bitstream are mapped to the second complex symbol −1+1j in the second quadrant.

It can be learned from the foregoing modulation mapping relationships that every two bits in the Tx1 bitstream are modulated into one symbol, every two bits in the Tx2 bitstream are modulated into one symbol, and every four bits in an Rx bitstream are modulated into one symbol. A first complex symbol (Tx1 symbol) to which two bits in the Tx1 bitstream are mapped and a second complex symbol (Tx2 symbol) to which two bits in the Tx2 bitstream are mapped may be superposed based on an amplitude ratio of 2:1 to obtain a third complex symbol (Rx symbol) corresponding to four bits in the Rx bitstream: 2×Tx1 (QPSK)+Tx2 (QPSK)=Rx (16QAM). For example, when bits in the Tx1 bitstream are 10 and bits in the Tx2 bitstream are 10, the third complex symbol=2×the first complex symbol+the second complex symbol=2(1+1j)+(−1+1j)=1+3j.

In addition, among every four bits in the Rx bitstream, the 1st and 3rd bits are bits (indicated by underscores in the foregoing code mapping table) in the Tx1 bitstream, and the 2nd and 4th bits are bits in the Tx2 bitstream. Therefore, based on the code mapping table designed in this manner, bits corresponding to the Tx1 and the Tx2 may be determined, based on the foregoing location correspondence, from coded bits obtained by the receive end through demodulation. Similarly, in a transceiver framework based on a single-point transmit end, the transmit end may also determine a Tx1 bitstream and a Tx2 bitstream based on the location correspondence. To be specific, the transmit end may perform bit decomposition on one independent bitstream based on the location relationship to obtain the Tx1 bitstream and the Tx2 bitstream.

Alternatively, the foregoing code mapping table may be represented by a corresponding formula:

$$d_{Tx1}(i) = [(-1 + 2b_1(2i)) + j(1 - 2b_1(2i + 1))]$$

$$d_{Tx2}(i) = \begin{cases} [(1 - 2b_2(2i)) + j(1 - 2b_2(2i+1))], & \text{when } b_1(2i) = 1 \cap b_1(2i+1) = 0 \\ [(1 - 2b_2(2i)) + j(-1 + 2b_2(2i+1))], & \text{when } b_1(2i) = 1 \cap b_1(2i+1) = 1 \\ [(-1 + 2b_2(2i)) + j(-1 + 2b_2(2i+1))], & \text{when } b_1(2i) = 0 \cap b_1(2i+1) = 1 \\ [(-1 + 2b_2(2i)) + j(1 - 2b_2(2i+1))], & \text{when } b_1(2i) = 0 \cap b_1(2i+1) = 0 \end{cases}$$

Alternatively, the foregoing code mapping table may be expressed as follows:

$$d_{Tx1}(i) = [(-1 + 2b_1(2i)) + j(1 - 2b_1(2i + 1))]$$

$$d_{Tx2}(i) = \begin{cases} [(1 - 2b_2(2i)) + j(1 - 2b_2(2i+1))], & \text{when } d_{Tx1}(i) = 1 + 1j \\ [(1 - 2b_2(2i)) + j(-1 + 2b_2(2i+1))], & \text{when } d_{Tx1}(i) = 1 - 1j \\ [(-1 + 2b_2(2i)) + j(-1 + 2b_2(2i+1))], & \text{when } d_{Tx1}(i) = -1 - 1j \\ [(-1 + 2b_2(2i)) + j(1 - 2b_2(2i+1))], & \text{when } d_{Tx1}(i) = -1 + 1j \end{cases}$$

The foregoing formula means that, for two continuous bitstreams $b_1$ and $b_2$ whose lengths are L, one symbol is generated for every two bits in each of $b_1$ and $b_2$, and there are a total of L/2 symbols. i indicates a sequence number of a symbol, and a value of i ranges from 0 to L/2−1. $d_{Tx1}(i)$ and $d_{Tx2}(i)$ respectively indicate a first complex symbol of the Tx1 and a second complex symbol of the Tx2 that are generated by modulating the two bitstreams.

Therefore, a higher-order signal obtained through ideal superposition may be expressed as follows:

$$d_{Rx} = a * d_{Tx1} + d_{Tx2}$$

$d_{RX}$ is a complex symbol in the higher-order signal obtained through ideal superposition, and a is an amplitude ratio of the first complex symbol of the Tx1 and the second complex symbol of the Tx2 that are not normalized. The normalization means separately performing power normalization on the first complex symbol and the second complex symbol, and a power of a normalized first complex symbol and a power of a normalized second complex symbol are 1. In this example, a=2, and $d_{RX}$ is a complex symbol in 16QAM.

It should be noted that, in the foregoing design in this example, for ease of calculation, normalization of a complex constellation diagram for modulation mapping is not considered currently, and the amplitude ratio 2:1 and the power ratio 4:1 are also ratios in a case in which normalization is not considered.

The modulation mapping relationships of low-order signals in the foregoing code mapping table are merely examples, and other modulation mapping relationships may alternatively be used to achieve a same objective. When a quadrant of a symbol to which $d_{Tx1}$ serving as a sign bit is mapped varies, a modulation mapping relationship of corresponding $d_{TX2}$ also needs to be modified correspondingly. However, only a quadrant of a complex symbol corresponding to different bits, namely, positive/negative properties of amplitudes of an I branch and a Q branch of the complex symbol, is changed. In this application, the I branch is a vertical axis in a constellation diagram and represents a real part of a complex symbol, and the Q branch is a horizontal axis in the constellation diagram and represents an imaginary part of the complex symbol. Therefore, the joint modulation and coding scheme in this example needs to meet only the following: Two bitstreams at the transmit end are mapped to two lower-order QPSK signals. An amplitude ratio a of the two QPSK signals is 2, and the two QPSK signals may be mapped to a higher-order 16QAM signal at the receive end through superposition in space domain. In addition, a modulation mapping relationship of a QPSK signal that serves as a sign bit is not changed (for example, refer to a definition of the modulation mapping relationship in an existing standard), and a modulation mapping relationship of the other QPSK signal is changed correspondingly when the sign bit indicates different quadrants. In this way, a higher-order constellation obtained through superposition at the receive end can finally meet Gray mapping.

Example 2: a QPSK Signal and an 8QAM Signal are Superposed Based on a Specific Amplitude Ratio to Generate a 32QAM Signal that Meets Gray Mapping In Example 2, QPSK modulation is used for a lower-order signal Tx1 at the transmit end, 8QAM modulation is used for the other lower-order signal Tx2, and 32QAM modulation is used for a higher-order signal Rx to be received by the receive end. After being modulated, the QPSK signal and the 8QAM signal are superposed based on an amplitude ratio of 3:1 (corresponding to a power ratio of 9:1) in space domain or power domain (namely, energy domain), to generate the 32QAM signal that meets Gray mapping.

The Tx1 (QPSK) serves as a sign bit to indicate a quadrant in which a higher-order constellation obtained through superposition is located. A modulation mapping relationship of the Tx2 (8QAM) varies with the quadrant indicated by the Tx1.

Figure 6:
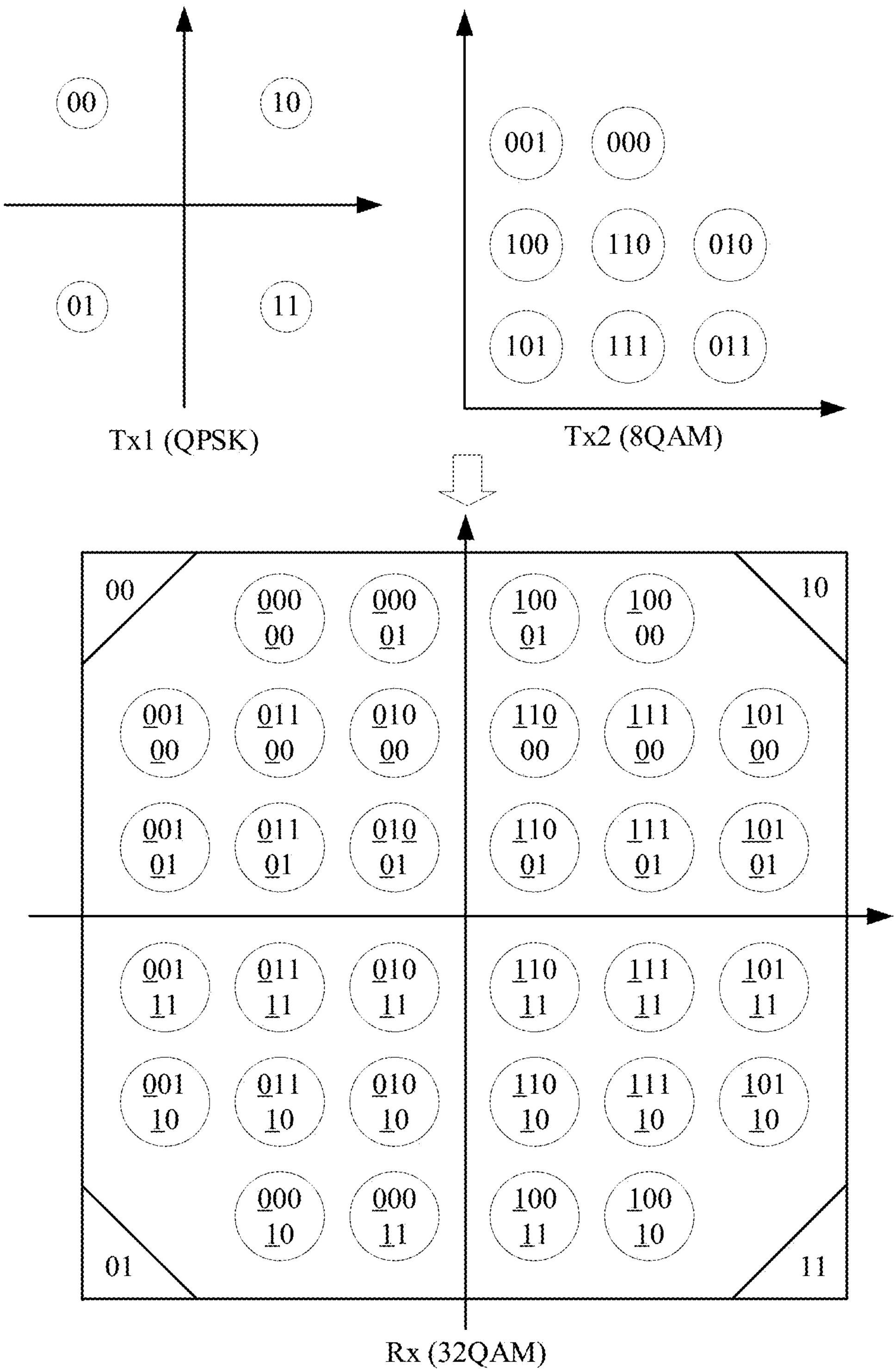
FIG. 6 is a diagram of superposing a QPSK signal and an 8QAM signal based on a specific amplitude ratio to generate a 32QAM signal that meets Gray mapping according to Example 2 in an embodiment of this application.

FIG. 6 is an example diagram of superposing a QPSK signal and an 8QAM signal based on a specific amplitude ratio to generate a 32QAM signal that meets Gray mapping in Example 2, where the specific amplitude ratio is 3:1.

As shown in FIG. 6, after a modulation mapping relationship of a Tx1 (QPSK) sign bit is determined, a modulation mapping relationship of Tx2 (8QAM) varies in different quadrants. It can be learned that, generally, a constellation diagram (a coding mapping table) of the Tx2 in a first quadrant is rotated, so that a higher-order constellation finally obtained through superposition meets Gray mapping, to achieve better demodulation performance.

TABLE 2

Code mapping table in a case in which a QPSK signal and an 8QAM signal are superposed based on an amplitude ratio of 3:1 to generate a 32QAM signal

| Number | Tx1 coding | Tx1 symbol | Tx2 coding | Tx2 symbol | Rx coding | Rx symbol = 3 × Tx1 symbol + Tx2 symbol |
|---|---|---|---|---|---|---|
| 1 | 10 | 1 + 1j | 000 | 0 + 2j | 10000 | 3 + 5j |
| 2 | | | 001 | −2 + 2j | 10001 | 1 + 5j |
| 3 | | | 100 | −2 + 0j | 11000 | 1 + 3j |
| 4 | | | 101 | −2 − 2j | 11001 | 1 + 1j |
| 5 | | | 111 | 0 − 2j | 11101 | 3 + 1j |
| 6 | | | 011 | 2 − 2j | 10101 | 5 + 1j |
| 7 | | | 010 | 2 + 0j | 10100 | 5 + 3j |
| 8 | | | 110 | 0 + 0j | 11100 | 3 + 3j |
| 9 | 11 | 1 − 1j | 000 | 0 − 2j | 10010 | 3 − 5j |
| 10 | | | 001 | −2 − 2j | 10011 | 1 − 5j |
| 11 | | | 100 | −2 − 0j | 11010 | 1 − 3j |
| 12 | | | 101 | −2 + 2j | 11011 | 1 − 1j |
| 13 | | | 111 | 0 + 2j | 11111 | 3 − 1j |
| 14 | | | 011 | 2 + 2j | 10111 | 5 − 1j |
| 15 | | | 010 | 2 − 0j | 10110 | 5 − 3j |
| 16 | | | 110 | 0 − 0j | 11110 | 3 − 3j |
| 17 | 01 | −1 − 1j | 000 | −0 − 2j | 00010 | −3 − 5j |
| 18 | | | 001 | 2 − 2j | 00011 | −1 − 5j |
| 19 | | | 100 | 2 − 0j | 01010 | −1 − 3j |
| 20 | | | 101 | 2 + 2j | 01011 | −1 − 1j |
| 21 | | | 111 | −0 + 2j | 01111 | −3 − 1j |
| 22 | | | 011 | −2 + 2j | 00111 | −5 − 1j |
| 23 | | | 010 | −2 − 0j | 00110 | −5 − 3j |
| 24 | | | 110 | +0 − 0j | 01110 | −3 − 3j |
| 25 | 00 | −1 + 1j | 000 | −0 + 2j | 00000 | −3 + 5j |
| 26 | | | 001 | 2 + 2j | 00001 | −1 + 5j |
| 27 | | | 100 | 2 + 0j | 01000 | −1 + 3j |
| 28 | | | 101 | 2 − 2j | 01001 | −1 + 1j |
| 29 | | | 111 | −0 − 2j | 01101 | −3 + 1j |
| 30 | | | 011 | −2 − 2j | 00101 | −5 + 1j |
| 31 | | | 010 | −2 + 0j | 00100 | −5 + 3j |
| 32 | | | 110 | −0 + 0j | 01100 | −3 + 3j |

Table 2 shows a code mapping table in Example 2 in which a QPSK signal and an 8QAM signal are superposed based on an amplitude ratio of 3:1 to generate a 32QAM signal. The following can be learned from the content in Table 2:

The modulation mapping relationship of the Tx1 (QPSK) is as follows: Bits {10, 11, 01, 00} in a Tx1 bitstream are respectively mapped to four first complex symbols {1+1j, 1−1j, −1−1j, −1+1j} in the first quadrant, a second quadrant, a third quadrant, and a fourth quadrant. Specifically, the bits 10 in the Tx1 bitstream are mapped to the first complex symbol 1+1j in the first quadrant, the bits 11 in the Tx1 bitstream are mapped to the first complex symbol 1−1j in the fourth quadrant, the bits 01 in the Tx1 bitstream are mapped to the first complex symbol −1−1j in the third quadrant, and the bits 00 in the Tx1 bitstream are mapped to the first complex symbol −1+1j in the second quadrant.

The modulation mapping relationship of the Tx2 (8QAM) is as follows: Bits {000, 001, 100, 101, 111, 011, 010, 110} in a Tx2 bitstream are respectively mapped to eight second complex symbols {0+2j, −2+2j, −2+0j, −2−2j, 0−2j, 2−2j, 2+0j, 0+0j}. However, when a quadrant of a complex symbol to which bits in the Tx1 bitstream are mapped varies, a modulation mapping relationship of bits in the Tx2 bitstream varies. To be specific, when a quadrant of a complex symbol to which bits in the Tx1 bitstream are mapped varies, same bits in the Tx2 bitstream are mapped to different complex symbols.

Specifically, when bits in the Tx1 bitstream are 10, the bits correspond to the first quadrant. The bits 000 in the Tx2 bitstream are mapped to the second complex symbol 0+2j, the bits 001 in the Tx2 bitstream are mapped to the second complex symbol −2+2j, the bits 100 in the Tx2 bitstream are mapped to the second complex symbol −2+0j, the bits 101 in the Tx2 bitstream are mapped to the second complex symbol −2−2j, the bits 111 in the Tx2 bitstream are mapped to the second complex symbol 0−2j, the bits 011 in the Tx2 bitstream are mapped to the second complex symbol 2−2j, the bits 010 in the Tx2 bitstream are mapped to the second complex symbol 2+0j, and the bits 110 in the Tx2 bitstream are mapped to the second complex symbol 0+0j.

When bits in the Tx1 bitstream are 11, the bits correspond to the fourth quadrant. The bits 000 in the Tx2 bitstream are mapped to the second complex symbol 0−2j, the bits 001 in the Tx2 bitstream are mapped to the second complex symbol −2−2j, the bits 100 in the Tx2 bitstream are mapped to the second complex symbol −2−0j, the bits 101 in the Tx2 bitstream are mapped to the second complex symbol −2+2j, the bits 111 in the Tx2 bitstream are mapped to the second complex symbol 0+2j, the bits 011 in the Tx2 bitstream are mapped to the second complex symbol 2+2j, the bits 010 in the Tx2 bitstream are mapped to the second complex symbol 2−0j, and the bits 110 in the Tx2 bitstream are mapped to the second complex symbol 0−0j.

When bits in the Tx1 bitstream are 01, the bits correspond to the third quadrant. The bits 000 in the Tx2 bitstream are mapped to the second complex symbol −0−2j, the bits 001 in the Tx2 bitstream are mapped to the second complex symbol 2−2j, the bits 100 in the Tx2 bitstream are mapped to the second complex symbol 2−0j, the bits 101 in the Tx2 bitstream are mapped to the second complex symbol 2+2j, the bits 111 in the Tx2 bitstream are mapped to the second complex symbol −0+2j, the bits 011 in the Tx2 bitstream are mapped to the second complex symbol −2+2j, the bits 010 in the Tx2 bitstream are mapped to the second complex symbol −2−0j, and the bits 110 in the Tx2 bitstream are mapped to the second complex symbol 0−0j.

When bits in the Tx1 bitstream are 00, the bits correspond to the second quadrant. The bits 000 in the Tx2 bitstream are mapped to the second complex symbol −0+2j, the bits 001 in the Tx2 bitstream are mapped to the second complex symbol 2+2j, the bits 100 in the Tx2 are mapped to the second complex symbol 2+0j, the bits 101 in the Tx2 bitstream are mapped to the second complex symbol 2−2j, the bits 111 in the Tx2 bitstream are mapped to the second complex symbol −0−2j, the bits 011 in the Tx2 bitstream are mapped to the second complex symbol −2−2j, the bits 010 in the Tx2 bitstream are mapped to the second complex symbol −2+0j, and the bits 110 in the Tx2 bitstream are mapped to the second complex symbol −0+0j.

It can be learned from the foregoing modulation mapping relationships that every two bits in the Tx1 bitstream are modulated into one symbol, every three bits in the Tx2 bitstream are modulated into one symbol, and every five bits in an Rx bitstream are modulated into one symbol. A first complex symbol (Tx1 symbol) to which two bits in the Tx1 bitstream are mapped and a second complex symbol (Tx2 symbol) to which three bits in the Tx2 bitstream are mapped may be superposed based on an amplitude ratio of 3:1 to obtain a third complex symbol (Rx symbol) corresponding to five bits in the Rx bitstream: 3×Tx1 (QPSK)+Tx2 (8QAM)=Rx (32QAM). For example, when two bits in the Tx1 bitstream are 10 and three bits in the Tx2 bitstream are 000, the third complex symbol=3×the first complex symbol+the second complex symbol=3(1+1j)+(0+2j)=3+5j.

In addition, among every five bits in the Rx bitstream, the $1^{st}$ and 4th bits are bits (indicated by underscores in the foregoing code mapping table) in the Tx1 bitstream, and the $2^{nd}$, $3^{rd}$ and $5^{th}$ bits are bits in the Tx2 bitstream. Therefore, based on the code mapping table designed in this manner, bits corresponding to the Tx1 and the Tx2 may be obtained, based on the foregoing location correspondence, from coded bits obtained by the receive end through demodulation. Similarly, in a transceiver framework based on a single-point transmit end, the transmit end may also determine a Tx1 bitstream and a Tx2 bitstream based on the code mapping table, for example, perform bit decomposition on one independent bitstream to obtain the Tx1 bitstream and the Tx2 bitstream.

It should be noted that, in the foregoing design in this example, for ease of calculation, normalization of a complex constellation diagram for modulation mapping is not considered currently, and the amplitude ratio 3:1 and the power ratio 9:1 are also ratios in a case in which normalization is not considered.

Example 3: a QPSK Signal and a 16QAM Signal are Superposed Based on a Specific Amplitude Ratio to Generate a 64QAM Signal that Meets Gray Mapping In Example 3, QPSK modulation is used for a lower-order signal Tx1 at the transmit end, 16QAM modulation is used for the other lower-order signal Tx2, and 64QAM modulation is used for a higher-order signal Rx to be received by the receive end. After being modulated, the two QPSK signals and the 16QAM signal are superposed based on an amplitude ratio of 4:1 (corresponding to a power ratio of 16:1) in space domain or power domain (namely, energy domain), to generate the 64QAM signal that meets Gray mapping.

The Tx1 (QPSK) serves as a sign bit to indicate a quadrant in which a higher-order constellation obtained through superposition is located. A modulation mapping relationship of the Tx2 (16QAM) varies with the quadrant indicated by the Tx1.

Figure 7:
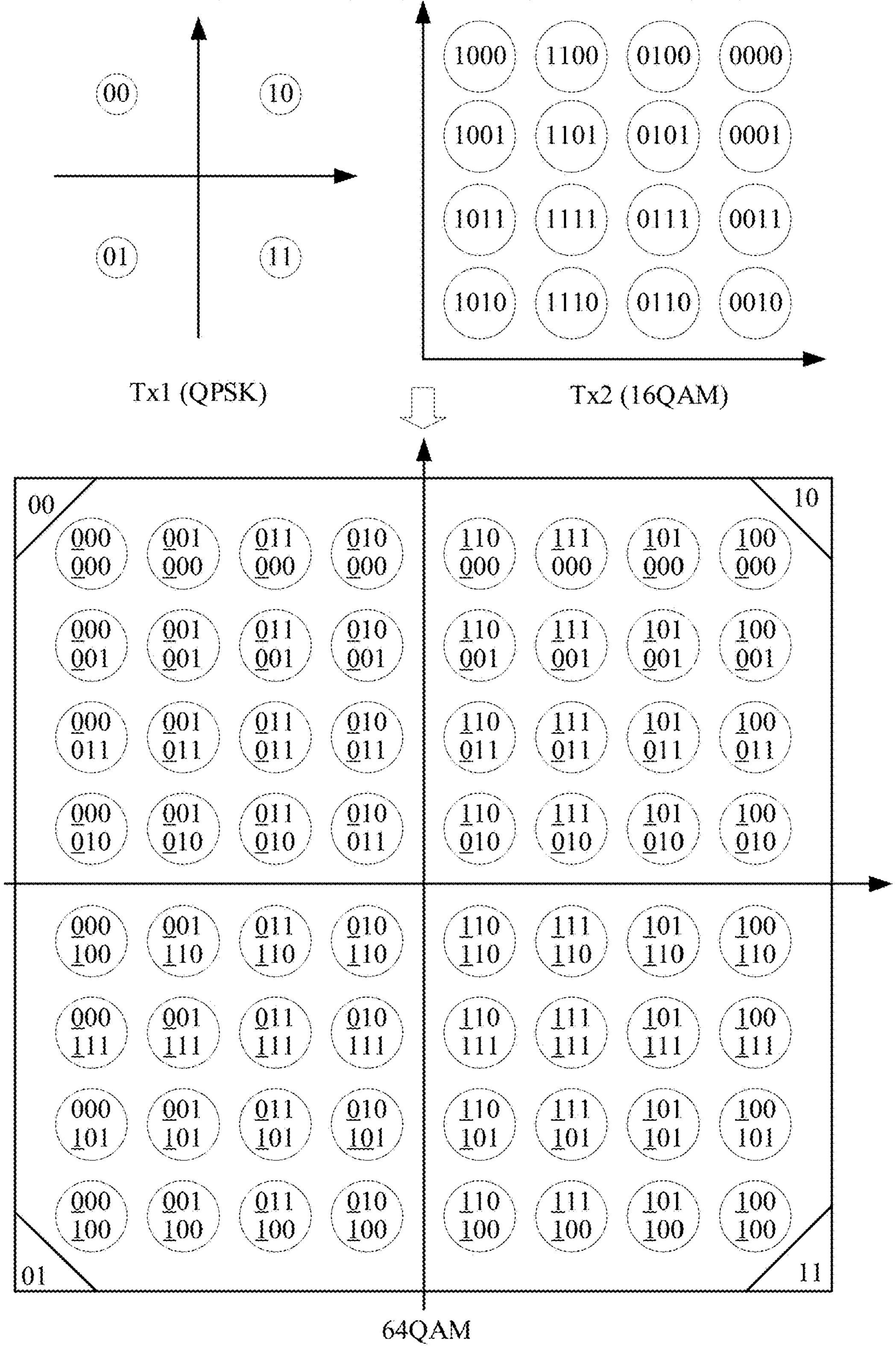
FIG. 7 is a diagram of superposing a QPSK signal and a 16QAM signal based on a specific amplitude ratio to generate a 64QAM signal that meets Gray mapping according to Example 3 in an embodiment of this application.

FIG. 7 is an example diagram of superposing a QPSK signal and a 16QAM signal based on a specific amplitude ratio to generate a 64QAM signal that meets Gray mapping in Example 3, where the specific amplitude ratio is 4:1.

As shown in FIG. 7, after a modulation mapping relationship of a Tx1 (QPSK) sign bit is determined, a modulation mapping relationship of Tx2 (16QAM) varies in different quadrants. It can be learned that, generally, a constellation diagram (a coding mapping table) of the Tx2 in a first quadrant is rotated, so that a higher-order constellation finally obtained through superposition meets Gray mapping, to achieve better demodulation performance.

TABLE 3

Code mapping table in a case in which a QPSK signal and a 16QAM signal are superposed based on an amplitude ratio of 4:1 to generate a 64QAM signal

| Number | Tx1 coding | Tx1 symbol | Tx2 coding | Tx2 symbol | Rx coding | Rx symbol = 4 × Tx1 symbol + Tx2 symbol |
|---|---|---|---|---|---|---|
| 1 | 10 | 1 + 1j | 11 00 | −1 + 3j | 111000 | 3 + 7j |
| 2 | | | 11 01 | −1 + 1j | 111001 | 3 + 5j |
| 3 | | | 10 01 | −3 + 1j | 110001 | 1 + 5j |
| 4 | | | 10 00 | −3 + 3j | 110000 | 1 + 7j |
| 5 | | | 11 10 | −1 − 3j | 111010 | 3 + 1j |
| 6 | | | 11 11 | −1 − 1j | 111011 | 3 + 3j |
| 7 | | | 10 11 | −3 − 1j | 110011 | 1 + 3j |
| 8 | | | 10 10 | −3 − 3j | 110010 | 1 + 1j |
| 9 | | | 01 10 | 1 − 3j | 101010 | 5 + 1j |
| 10 | | | 01 11 | 1 − 1j | 101011 | 5 + 3j |
| 11 | | | 00 11 | 3 − 1j | 100011 | 7 + 3j |
| 12 | | | 00 10 | 3 − 3j | 100010 | 7 + 1j |
| 13 | | | 01 00 | 1 + 3j | 101000 | 5 + 7j |
| 14 | | | 01 01 | 1 + 1j | 101001 | 5 + 5j |
| 15 | | | 00 01 | 3 + 1j | 100001 | 7 + 5j |
| 16 | | | 00 00 | 3 + 3j | 100000 | 7 + 7j |
| 17 | 11 | 1 − 1j | 11 00 | −1 − 3j | 111100 | 3 − 7j |
| 18 | | | 11 01 | −1 − 1j | 111101 | 3 − 5j |
| 19 | | | 10 01 | −3 − 1j | 110101 | 1 − 5j |
| 20 | | | 10 00 | −3 − 3j | 110100 | 1 − 7j |
| 21 | | | 11 10 | −1 + 3j | 111110 | 3 − 1j |
| 22 | | | 11 11 | −1 + 1j | 111111 | 3 − 3j |
| 23 | | | 10 11 | −3 + 1j | 110111 | 1 − 3j |
| 24 | | | 10 10 | −3 + 3j | 110110 | 1 − 1j |
| 25 | | | 01 10 | 1 + 3j | 101110 | 5 − 1j |
| 26 | | | 01 11 | 1 + 1j | 101111 | 5 − 3j |
| 27 | | | 00 11 | 3 + 1j | 100111 | 7 − 3j |
| 28 | | | 00 10 | 3 + 3j | 100110 | 7 − 1j |
| 29 | | | 01 00 | 1 − 3j | 101100 | 5 − 7j |
| 30 | | | 01 01 | 1 − 1j | 101101 | 5 − 5j |
| 31 | | | 00 01 | 3 − 1j | 100101 | 7 − 5j |
| 32 | | | 00 00 | 3 − 3j | 100100 | 7 − 7j |
| 33 | 01 | −1 − 1j | 11 00 | 1 − 3j | 011100 | −3 − 7j |
| 34 | | | 11 01 | 1 − 1j | 011101 | −3 − 5j |
| 35 | | | 10 01 | 3 − 1j | 010101 | −1 − 5j |
| 36 | | | 10 00 | 3 − 3j | 010100 | −1 − 7j |
| 37 | | | 11 10 | 1 + 3j | 011110 | −3 − 1j |
| 38 | | | 11 11 | 1 + 1j | 011111 | −3 − 3j |
| 39 | | | 10 11 | 3 + 1j | 010111 | −1 − 3j |
| 40 | | | 10 10 | 3 + 3j | 010110 | −1 − 1j |
| 41 | | | 01 10 | −1 + 3j | 001110 | −5 − 1j |
| 42 | | | 01 11 | −1 + 1j | 001111 | −5 − 3j |
| 43 | | | 00 11 | −3 + 1j | 000111 | −7 − 3j |
| 44 | | | 00 10 | −3 + 3j | 000110 | −7 − 1j |
| 45 | | | 01 00 | −1 − 3j | 001100 | −5 − 7j |
| 46 | | | 01 01 | −1 − 1j | 001101 | −5 − 5j |
| 47 | | | 00 01 | −3 − 1j | 000101 | −7 − 5j |
| 48 | | | 00 00 | −3 − 3j | 000100 | −7 − 7j |
| 49 | 00 | −1 + 1j | 11 00 | 1 + 3j | 011000 | −3 + 7j |
| 50 | | | 11 01 | 1 + 1j | 011001 | −3 + 5j |
| 51 | | | 10 01 | 3 + 1j | 010001 | −1 + 5j |
| 52 | | | 10 00 | 3 + 3j | 010000 | −1 + 7j |
| 53 | | | 11 10 | 1 − 3j | 011010 | −3 + 1j |
| 54 | | | 11 11 | 1 − 1j | 011011 | −3 + 3j |
| 55 | | | 10 11 | 3 − 1j | 010011 | −1 + 3j |
| 56 | | | 10 10 | 3 − 3j | 010010 | −1 + 1j |
| 57 | | | 01 10 | −1 − 3j | 001010 | −5 + 1j |
| 58 | | | 01 11 | −1 − 1j | 001011 | −5 + 3j |
| 59 | | | 00 11 | −3 − 1j | 000011 | −7 + 3j |
| 60 | | | 00 10 | −3 − 3j | 000010 | −7 + 1j |
| 61 | | | 01 00 | −1 − 3j | 001000 | −5 + 7j |
| 62 | | | 01 01 | −1 + 1j | 001001 | −5 + 5j |
| 63 | | | 00 01 | −3 + 1j | 000001 | −7 + 5j |
| 64 | | | 00 00 | −3 + 3j | 000000 | −7 + 7j |

Table 3 shows a code mapping table in Example 3 in which a QPSK signal and a 16QAM signal are superposed based on an amplitude ratio of 4:1 to generate a 64QAM signal. The following can be learned from the content in Table 3:

The modulation mapping relationship of the Tx1 (QPSK) is as follows: Bits {10, 11, 01, 00} in a Tx1 bitstream are respectively mapped to four first complex symbols {1+1j, 1−1j, −1−1j, −1+1j} in the first quadrant, a second quadrant, a third quadrant, and a fourth quadrant. Specifically, the bits 10 in the Tx1 bitstream are mapped to the first complex symbol 1+1j in the first quadrant, the bits 11 in the Tx1 bitstream are mapped to the first complex symbol 1−1j in the fourth quadrant, the bits 01 in the Tx1 bitstream are mapped to the first complex symbol −1−1j in the third quadrant, and the bits 00 in the Tx1 bitstream are mapped to the first complex symbol −1+1j in the second quadrant.

The modulation mapping relationship of the Tx2 (16QAM) is as follows: Bits {1100, 1101, 1001, 1000, 1110, 1111, 1011, 1010, 0110, 0111, 0011, 0010, 0100, 0101, 0001, 0000} in the Tx2 bitstream are respectively mapped to 16 second complex symbols {−1+3j, −1+1j, −3+1j, −3+3j, −1−3j, −1−1j, −3−1j, −3−3j, 1−3j, 1−1j, 3−1j, 3−3j, 1+3j, 1+1j, 3+1j, 3+3j}. However, when a quadrant of a complex symbol to which bits in the Tx1 bitstream are mapped varies, a modulation mapping relationship of bits in the Tx2 bitstream varies. To be specific, when a quadrant of a complex symbol to which bits in the Tx1 bitstream are mapped varies, same bits in the Tx2 bitstream are mapped to different complex symbols.

Specifically, when bits in the Tx1 bitstream are 10, the bits correspond to the first quadrant. The bits 1100 in the Tx2 bitstream are mapped to the second complex symbol −1+3j, the bits 1101 in the Tx2 bitstream are mapped to the second complex symbol −1+1j, the bits 1001 in the Tx2 bitstream are mapped to the second complex symbol −3+1j, the bits 1000 in the Tx2 bitstream are mapped to the second complex symbol −3+3j, the bits 1110 in the Tx2 bitstream are mapped to the second complex symbol −1−3j, the bits 1111 in the Tx2 bitstream are mapped to the second complex symbol −1−1j, the bits 1011 in the Tx2 bitstream are mapped to the second complex symbol −3−1j, the bits 1010 in the Tx2 bitstream are mapped to the second complex symbol −3−3j, the bits 0110 in the Tx2 bitstream are mapped to the second complex symbol −1j, the bits 0111 in the Tx2 bitstream are mapped to the second complex symbol −1j, the bits 0011 in the Tx2 bitstream are mapped to the second complex symbol −3−1j, the bits 0010 in the Tx2 bitstream are mapped to the second complex symbol 3−3j, the bits 0100 in the Tx2 bitstream are mapped to the second complex symbol 1+3j, the bits 0101 in the Tx2 bitstream are mapped to the second complex symbol 1+1j, the bits 0001 in the Tx2 are mapped to the second complex symbol 3+1j, and the bits 0000 in the Tx2 bitstream are mapped to the second complex symbol 3+3j.

When bits in the Tx1 bitstream are 11, the bits correspond to the fourth quadrant. The bits 1100 in the Tx2 bitstream are mapped to the second complex symbol −1−3j, the bits 1101 in the Tx2 bitstream are mapped to the second complex symbol −1−1j, the bits 1001 in the Tx2 bitstream are mapped to the second complex symbol −3−1j, the bits 1000 in the Tx2 bitstream are mapped to the second complex symbol −3−3j, the bits 1110 in the Tx2 bitstream are mapped to the second complex symbol −1+3j, the bits 1111 in the Tx2 bitstream are mapped to the second complex symbol −1+1j, the bits 1011 in the Tx2 bitstream are mapped to the second complex symbol −3+1j, the bits 1010 in the Tx2 bitstream are mapped to the second complex symbol −3+3j, the bits 0110 in the Tx2 bitstream are mapped to the second complex symbol 1+3j, the bits 0111 in the Tx2 bitstream are mapped to the second complex symbol 1+1j, the bits 0011 in the Tx2 bitstream are mapped to the second complex symbol 3+1j, the bits 0010 in the Tx2 bitstream are mapped to the second complex symbol 3+3j, the bits 0100 in the Tx2 bitstream are mapped to the second complex symbol 1−3j, the bits 0101 in the Tx2 bitstream are mapped to the second complex symbol 1−1j, the bits 0001 in the Tx2 bitstream are mapped to the second complex symbol 3−1j, and the bits 0000 in the Tx2 bitstream are mapped to the second complex symbol 3−3j.

When bits in the Tx1 bitstream are 01, the bits corresponding to the third quadrant. The bits 1100 in the Tx2 bitstream are mapped to the second complex symbol 1−3j, the bits 1101 in the Tx2 bitstream are mapped to the second complex symbol 1−1j, the bits 1001 in the Tx2 bitstream are mapped to the second complex symbol 3−1j, the bits 1000 in the Tx2 bitstream are mapped to the second complex symbol 3−3j, the bits 1110 in the Tx2 bitstream are mapped to the second complex symbol 1+3j, the bits 1111 in the Tx2 bitstream are mapped to the second complex symbol 1+1j, the bits 1011 in the Tx2 bitstream are mapped to the second complex symbol 3+1j, the bits 1010 in the Tx2 bitstream are mapped to the second complex symbol 3+3j, the bits 0110 in the Tx2 bitstream are mapped to the second complex symbol −1+3j, the bits 0111 in the Tx2 bitstream are mapped to the second complex symbol −1+1j, the bits 0011 in the Tx2 bitstream are mapped to the second complex symbol −3+1j, the bits 0010 in the Tx2 bitstream are mapped to the second complex symbol −3+3j, the bits 0100 in the Tx2 bitstream are mapped to the second complex symbol −1−3j, the bits 0101 in the Tx2 bitstream are mapped to the second complex symbol −1−1j, the bits 0001 in the Tx2 bitstream are mapped to the second complex symbol −3−1j, and the bits 0000 in the Tx2 bitstream are mapped to the second complex symbol −3−3j.

When bits in the Tx1 bitstream are 00, the bits correspond to the second quadrant. The bits 1100 in the Tx2 bitstream are mapped to the second complex symbol 1+3j, the bits 1101 in the Tx2 bitstream are mapped to the second complex symbol 1+1j, the bits 1001 in the Tx2 bitstream are mapped to the second complex symbol 3+1j, the bits 1000 in the Tx2 bitstream are mapped to the second complex symbol 3+3j, the bits 1110 in the Tx2 bitstream are mapped to the second complex symbol 1−3j, the bits 1111 in the Tx2 bitstream are mapped to the second complex symbol 1−1j, the bits 1011 in the Tx2 bitstream are mapped to the second complex symbol 3−1j, the bits 1010 in the Tx2 bitstream are mapped to the second complex symbol 3−3j, the bits 0110 in the Tx2 bitstream are mapped to the second complex symbol −1−3j, the bits 0111 in the Tx2 bitstream are mapped to the second complex symbol −1−1j, the bits 0011 in the Tx2 bitstream are mapped to the second complex symbol −3−1j, the bits 0010 in the Tx2 bitstream are mapped to the second complex symbol −3−3j, the bits 0100 in the Tx2 bitstream are mapped to the second complex symbol −1−3j, the bits 0101 in the Tx2 bitstream are mapped to the second complex symbol −1+1j, the bits 0001 in the Tx2 bitstream are mapped to the second complex symbol −3+1j, and the bits 0000 in the Tx2 bitstream are mapped to the second complex symbol −3+3j.

It can be learned from the foregoing modulation mapping relationships that every two bits in the Tx1 bitstream are modulated into one symbol, every four bits in the Tx2 bitstream are modulated into one symbol, and every six bits in an Rx bitstream are modulated into one symbol. A first complex symbol (Tx1 symbol) to which two bits in the Tx1 bitstream are mapped and a second complex symbol (Tx2 symbol) to which three bits in the Tx2 bitstream are mapped may be superposed based on an amplitude ratio of 4:1 to obtain a third complex symbol (Rx symbol) corresponding to six bits in the Rx bitstream: 4×Tx1 (QPSK)+Tx2 (16QAM)=Rx (64QAM). For example, when bits in the Tx1 bitstream are 10 and bits in the Tx2 bitstream are 1100, the third complex symbol=4×the first complex symbol+the second complex symbol=4(1+1j)+(−1+3j)=3+7j.

In addition, among every five bits in the Rx bitstream, the $1^{st}$ and 4th bits are bits (indicated by underscores in the foregoing code mapping table) in the Tx1 bitstream, and the $2^{nd}$, $3^{rd}$, $5^{th}$ and $6^{th}$ bits are bits in the Tx2 bitstream. Therefore, based on a mapping code table designed in this manner, bits corresponding to the Tx1 and the Tx2 may be obtained by splitting, based on the foregoing location correspondence, coded bits obtained by the receive end through demodulation. Similarly, in a transceiver framework based on a single-point transmit end, the transmit end may also perform bit decomposition on one independent bitstream based on the code mapping table to obtain the Tx1 bitstream and the Tx2 bitstream.

Alternatively, the foregoing mapping code table may be represented by a corresponding formula:

sidered currently, and the amplitude ratio 4:1 and the power ratio 16:1 are also ratios in a case in which normalization is not considered.

The modulation mapping relationships of low-order signals in the foregoing code mapping table are merely examples, and other modulation mapping relationships may alternatively be used to achieve a same objective. When a quadrant of a symbol to which $d_{Tx1}$ serving as a sign bit is mapped varies, a modulation mapping relationship of corresponding $d_{Tx2}$ also needs to be modified correspondingly. However, only a quadrant of a complex symbol corresponding to different bits, namely, positive/negative properties of amplitudes of an I branch and a Q branch of the complex symbol, is changed. Therefore, the joint modulation and coding scheme in this example needs to meet only the following: Two bitstreams at the transmit end are mapped to a QPSK signal and a 16QAM signal. An amplitude ratio a of the two signals is 4, and the two signals may be mapped to a 64QAM signal at the receive end through superposition in space domain. In addition, a code mapping rule for the QPSK signal that serves as a sign bit is not changed, and a code mapping rule for the other 16QAM signal is changed correspondingly when the sign bit indicates different quad- $$d_{Tx1}(i) = [(-1 + 2b_1(2i)) + j(1 - 2b_1(2i+1))]$$

$$d_{Tx2}(i) = \begin{cases} (1-2b_2(4i))[2+(1-2b_2(4i+1))] + j(1-2b_2(4i+2))[2+(1-2b_2(4i+3))], & \text{when } b_1(2i)=1 \cap b_1(2i+1)=0 \\ (1-2b_2(4i))[2+(1-2b_2(4i+1))] + j(1-2b_2(4i+2))[-2-(1-2b_2(4i+3))], & \text{when } b_1(2i)=1 \cap b_1(2i+1)=1 \\ (1-2b_2(4i))[-2-(1-2b_2(4i+1))] + j(1-2b_2(4i+2))[-2-(1-2b_2(4i+3))], & \text{when } b_1(2i)=0 \cap b_1(2i+1)=1 \\ (1-2b_2(4i))[-2-(1-2b_2(4i+1))] + j(1-2b_2(4i+2))[2+(1-2b_2(4i+3))], & \text{when } b_1(2i)=0 \cap b_1(2i+1)=0 \end{cases}$$

The foregoing formula means that, for a continuous bitstream $b_1$ whose length is L and a bitstream $b_2$ whose length is 2×L, one symbol is generated for every two bits in $b_1$, and one symbol is generated for every four bits in $b_2$. In this case, there are L/2 symbols. i indicates a sequence number of a symbol, and a value of i ranges from 0 to L/2-1. $d_{Tx1}(i)$ and $d_{Tx2}(i)$ respectively indicate a first complex symbol of the Tx1 and a second complex symbol of the Tx2 that are generated by modulating the two bitstreams.

Therefore, a higher-order signal obtained through ideal superposition may be expressed as follows:

$$d_{Rx} = a * d_{Tx1} + d_{Tx2}$$

$d_{Rx}$ is a complex symbol in the higher-order signal obtained through ideal superposition, and a is an amplitude ratio of the first complex symbol of the Tx1 and the second complex symbol of the Tx2 that are not normalized. In this example, a=4, and $d_{Rx}$ is a complex symbol in 64QAM. During actual signal transmission, the two lower-order signals need to be normalized until an average power is 1. In this case, an amplitude ratio of the two lower-order signals should be a ratio between total powers of two normalized constellations, or may be a ratio between average powers that is calculated by using unnormalized constellations.

It should be noted that, in the foregoing design in this example, for ease of calculation, normalization of a complex constellation diagram for modulation mapping is not conrants. In this way, a higher-order constellation at the receive end can finally meet Gray mapping coding, to improve demodulation performance.

Example 4: Three QPSK Signals are Superposed Based on a Specific Amplitude Ratio to Generate a 64QAM Signal that Meets Gray Mapping In Example 4, QPSK modulation is used for all three lower-order signals Tx1, Tx2, and Tx3 at the transmit end, and 64QAM modulation is used for a higher-order signal Rx to be received by the receive end. After being modulated, the three QPSK signals are superposed based on an amplitude ratio of 4:2:1 (corresponding to a power ratio of 16:4:1) in space domain or power domain (namely, energy domain), to generate the 64QAM signal that meets Gray mapping.

Figure 8:
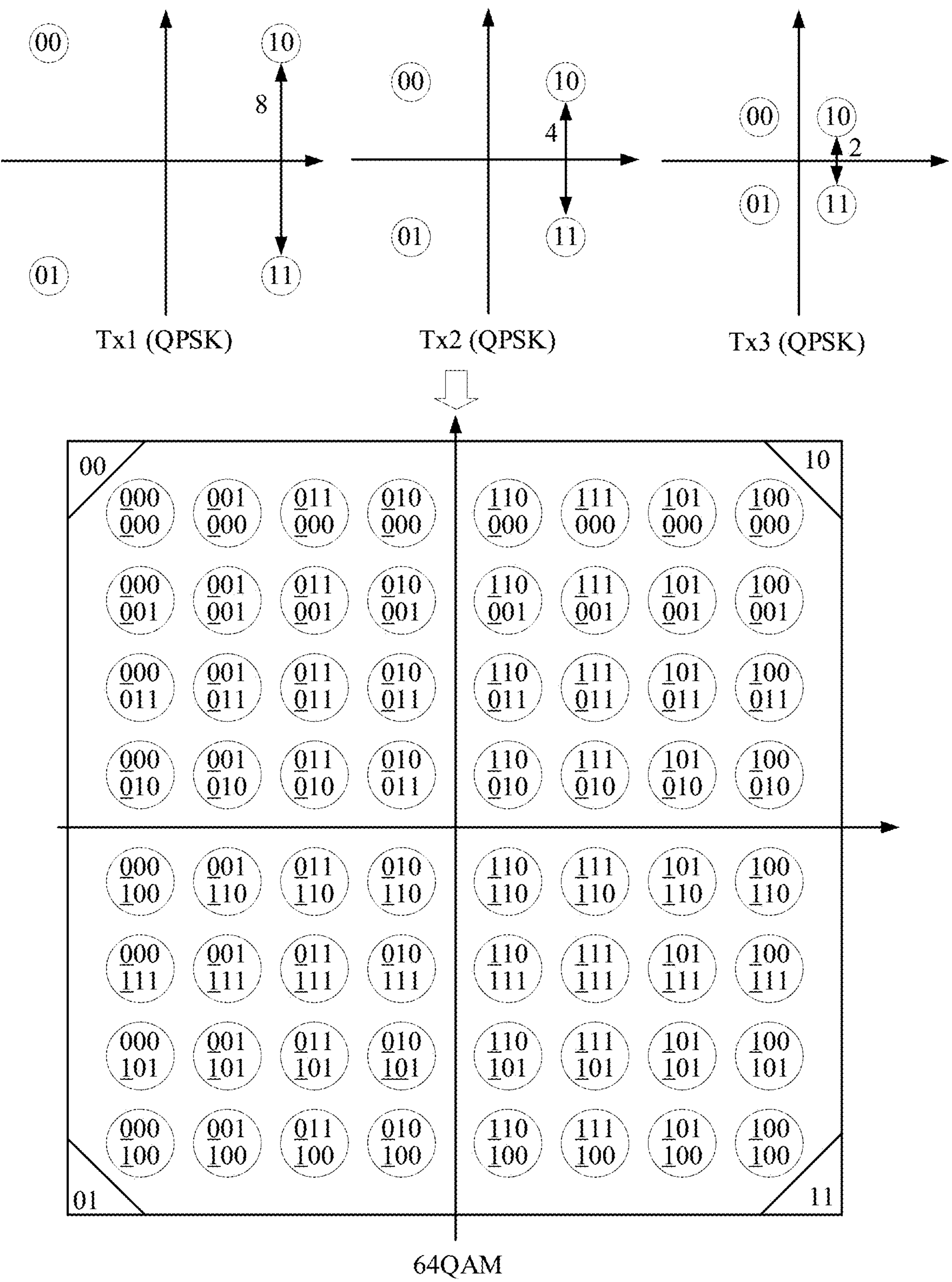
FIG. 8 is a diagram of superposing three QPSK signals based on a specific amplitude ratio to generate a 64QAM signal that meets Gray mapping according to Example 4 in an embodiment of this application.

FIG. 8 is an example superposed constellation diagram in Example 4 in which three QPSK signals are superposed based on a specific amplitude ratio to generate a 16QAM signal that meets Gray mapping, where the specific amplitude ratio is 4:2:1.

As shown in FIG. 8, the three QPSK signals need to meet the following amplitude ratio: Tx1:Tx2:Tx3=4:2:1; and a corresponding power ratio is as follows: P1: P2: P3=16:4:1. This example may be understood as follows: The Tx1 (QPSK) serves as a sign bit, the Tx2 (QPSK) and the Tx2 (QPSK) are superposed to generate 16QAM, and then the 16QAM obtained through superposition is superposed with the Tx1 to generate 64QAM.

TABLE 4

Code mapping table in a case in which three QPSK signals are superposed based on an amplitude ratio of 4:2:1 to generate a 64QAM signal

| Number | Tx1 coding | Tx1 symbol | Tx2 coding | Tx2 symbol | Tx3 coding | Tx3 symbol | Rx coding | Rx symbol = 4 × Tx1 symbol + 2Tx2 symbol + Tx3 symbol |
|---|---|---|---|---|---|---|---|---|
| 1 | 10 | 1 + 1j | 10 | −1 + 1j | 10 | 1 + 1j | 111000 | 3 + 7j |
| 2 | | | | | 11 | 1 − 1j | 111001 | 3 + 5j |
| 3 | | | | | 01 | −1 − 1j | 110001 | 1 + 5j |
| 4 | | | | | 00 | −1 + 1j | 110000 | 1 + 7j |
| 5 | | | 11 | −1 − 1j | 10 | 1−1j | 111010 | 3 + 1j |
| 6 | | | | | 11 | 1 + 1j | 111011 | 3 + 3j |
| 7 | | | | | 01 | −1 + 1j | 110011 | 1 + 3j |
| 8 | | | | | 00 | −1 − 1j | 110010 | 1 + 1j |
| 9 | | | 01 | 1 − 1j | 10 | −1 − 1j | 101010 | 5 + 1j |
| 10 | | | | | 11 | −1 + 1j | 101011 | 5 + 3j |
| 11 | | | | | 01 | 1 + 1j | 100011 | 7 + 3j |
| 12 | | | | | 00 | 1 − 1j | 100010 | 7 + 1j |
| 13 | | | 00 | 1 + 1j | 10 | −1 + 1j | 101000 | 5 + 7j |
| 14 | | | | | 11 | −1 − 1j | 101001 | 5 + 5j |
| 15 | | | | | 01 | 1 − 1j | 100001 | 7 + 5j |
| 16 | | | | | 00 | 1 + 1j | 100000 | 7 + 7j |
| 17 | 11 | 1 − 1j | 10 | −1 − 1j | 10 | 1 − 1j | 111100 | 3 − 7j |
| 18 | | | | | 11 | 1 + 1j | 111101 | 3 − 5j |
| 19 | | | | | 01 | −1 + 1j | 110101 | 1 − 5j |
| 20 | | | | | 00 | −1 − 1j | 110100 | 1 − 7j |
| 21 | | | 11 | −1 + 1j | 10 | 1 + 1j | 111110 | 3 − 1j |
| 22 | | | | | 11 | 1 − 1j | 111111 | 3 − 3j |
| 23 | | | | | 01 | −1 − 1j | 110111 | 1 − 3j |
| 24 | | | | | 00 | −1 + 1j | 110110 | 1 − 1j |
| 25 | | | 01 | 1 + 1j | 10 | −1 + 1j | 101110 | 5 − 1j |
| 26 | | | | | 11 | −1 − 1j | 101111 | 5 − 3j |
| 27 | | | | | 01 | 1 − 1j | 100111 | 7 − 3j |
| 28 | | | | | 00 | 1 + 1j | 100110 | 7 − 1j |
| 29 | | | 00 | 1 − 1j | 10 | −1 − 1j | 101100 | 5 − 7j |
| 30 | | | | | 11 | −1 + 1j | 101101 | 5 − 5j |
| 31 | | | | | 01 | 1 + 1j | 100101 | 7 − 5j |
| 32 | | | | | 00 | 1 − 1j | 100100 | 7 − 7j |
| 33 | 01 | −1 − 1j | 10 | 1 − 1j | 10 | −1 − 1j | 011100 | −3 − 7j |
| 34 | | | | | 11 | −1 + 1j | 011101 | −3 − 5j |
| 35 | | | | | 01 | 1 + 1j | 010101 | −1 − 5j |
| 36 | | | | | 00 | 1 − 1j | 010100 | −1 − 7j |
| 38 | | | | | 11 | −1 − 1j | 011111 | −3 − 3j |
| 39 | | | | | 01 | 1 − 1j | 010111 | −1 − 3j |
| 40 | | | | | 00 | 1 + 1j | 010110 | −1 − 1j |
| 41 | | | 01 | −1 + 1j | 10 | 1 + 1j | 001110 | −5 − 1j |
| 42 | | | | | 11 | 1 − 1j | 001111 | −5 − 3j |
| 43 | | | | | 01 | −1 − 1j | 000111 | −7 − 3j |
| 44 | | | | | 00 | −1 + 1j | 000110 | −7 − 1j |
| 45 | | | 00 | −1 − 1j | 10 | 1 − 1j | 001100 | −5 − 7j |
| 46 | | | | | 11 | 1 + 1j | 001101 | −5 − 5j |
| 47 | | | | | 01 | −1 + 1j | 000101 | −7 − 5j |
| 48 | | | | | 00 | −1 − 1j | 000100 | −7 − 7j |
| 49 | 00 | −1 + 1j | 10 | 1 + 1j | 10 | −1 + 1j | 011000 | −3 + 7j |
| 50 | | | | | 11 | −1 − 1j | 011001 | −3 + 5j |
| 51 | | | | | 01 | 1 − 1j | 010001 | −1 + 5j |
| 52 | | | | | 00 | 1 + 1j | 010000 | −1 + 7j |
| 53 | | | 11 | 1 − 1j | 10 | −1 − 1j | 011010 | −3 + 1j |
| 54 | | | | | 11 | −1 + 1j | 011011 | −3 + 3j |
| 55 | | | | | 01 | 1 + 1j | 010011 | −1 + 3j |
| 56 | | | | | 00 | 1 − 1j | 010010 | −1 + 1j |
| 57 | | | 01 | −1 − 1j | 10 | 1 − 1j | 001010 | −5 + 1j |
| 58 | | | | | 11 | 1 + 1j | 001011 | −5 + 3j |
| 59 | | | | | 01 | −1 + 1j | 000011 | −7 + 3j |
| 60 | | | | | 00 | −1 − 1j | 000010 | −7 + 1j |
| 61 | | | 00 | −1 + 1j | 10 | 1 + 1j | 001000 | −5 + 7j |
| 62 | | | | | 11 | 1 − 1j | 001001 | −5 + 5j |
| 63 | | | | | 01 | −1 − 1j | 000001 | −7 + 5j |
| 64 | | | | | 00 | −1 + 1j | 000000 | −7 + 7j |

Table 4 shows a code mapping table in Example 4 in which three QPSK signals are superposed based on an amplitude ratio of 4:2:1 to generate a 64QAM signal. A modulation mapping relationship indicated in the code mapping table is similar to that in Example 1 to Example 3. Details are not described herein again.

It can be learned from the table that, among every six bits in an Rx bitstream, the $1^{st}$ and 4th bits are bits in a Tx1 bitstream, the $2^{nd}$ and $5^{th}$ bits are bits in a Tx2 bitstream, and the $3^{rd}$ and $6^{th}$ bits are bits in a Tx3 bitstream. Therefore, based on the code mapping table designed in this manner, bits corresponding to the Tx1 and the Tx2 may be obtained by splitting, based on the foregoing location correspondence, coded bits obtained by the receive end through demodulation. Similarly, in a transceiver framework based on a single-point transmit end, the transmit end may also perform bit decomposition on one independent bitstream based on the location correspondence to obtain the Tx1 bitstream, the Tx2 bitstream, and the Tx3 bitstream.

Alternatively, the foregoing mapping code table may be represented by a corresponding formula:

$$d_{Tx1}(i) = [(-1 + 2b_1(2i)) + j(1 - 2b_1(2i + 1))]$$

$$d_{Tx2}(i) = \begin{cases} [(1 - 2b_2(2i)) + j(1 - 2b_2(2i + 1))], & \text{when } d_{Tx1}(i) = 1 + 1j \\ [(1 - 2b_2(2i)) + j(-1 + 2b_2(2i + 1))], & \text{when } d_{Tx1}(i) = 1 - 1j \\ [(-1 + 2b_2(2i)) + j(-1 + 2b_2(2i + 1))], & \text{when } d_{Tx1}(i) = -1 - 1j \\ [(-1 + 2b_2(2i)) + j(1 - 2b_2(2i + 1))], & \text{when } d_{Tx1}(i) = -1 + 1j \end{cases}$$

$$d_{Tx3}(i) = \begin{cases} [(1 - 2b_3(2i)) + j(1 - 2b_3(2i + 1))], & \text{when } d_{Tx2}(i) = 1 + 1j \\ [(1 - 2b_3(2i)) + j(-1 + 2b_3(2i + 1))], & \text{when } d_{Tx2}(i) = 1 - 1j \\ [(-1 + 2b_3(2i)) + j(-1 + 2b_3(2i + 1))], & \text{when } d_{Tx2}(i) = -1 - 1j \\ [(-1 + 2b_3(2i)) + j(1 - 2b_3(2i + 1))], & \text{when } d_{Tx2}(i) = -1 + 1j \end{cases}$$

The foregoing formula means that, for three continuous bitstreams $b_1$, $b_2$, and $b_3$ whose lengths are L, one symbol is generated for every two bits in each of $b_1$, $b_2$, and $b_3$, and there are a total of L/2 symbols. i indicates a sequence number of a symbol, and a value of i ranges from 0 to L/2−1. $d_{Tx1}(i)$, $d_{Tx2}(i)$, and $d_{Tx3}(i)$ respectively indicate complex symbols, generated by modulating the three bitstreams, of the Tx1, the Tx2, and the Tx3.

Therefore, a higher-order signal obtained through ideal superposition may be expressed as follows:

$$d_{Rx} = a_1 * d_{Tx1} + a_2 * d_{Tx2} + d_{Tx3}$$

$d_{Rx}$ is a complex symbol in the higher-order signal obtained through ideal superposition, and an amplitude ratio of the complex symbols of the Tx1, the Tx2, and the Tx3 is as follows: $a_1$:$a_2$:1=4:2:1. In this case, $d_{Rx}$ obtained through superposition is a complex symbol in 64QAM.

It should be noted that, in the foregoing design in this example, for ease of calculation, normalization of a complex constellation diagram for modulation mapping is not considered currently.

The modulation mapping relationships of low-order signals in the foregoing code mapping table are merely examples, and other modulation mapping relationships may alternatively be used to achieve a same objective. When a quadrant of a symbol to which $d_{Tx1}$ serving as a sign bit is mapped varies, modulation mapping relationships of corresponding $d_{Tx2}$ and $d_{Tx3}$ also need to be modified correspondingly. However, only a quadrant of a complex symbol corresponding to different bits, namely, positive/negative properties of amplitudes of an I branch and a Q branch of the complex symbol, is changed. Therefore, the joint modulation and coding scheme in this example needs to meet only the following: Three bitstreams at the transmit end are mapped to three QPSK symbols. An amplitude ratio of the three QPSK signals is as follows: $a_1$:$a_2$:1=4:2:1. The three QPSK signals can be mapped to a 64QAM symbol at the receive end through superposition. In addition, a code mapping rule for a QPSK signal that serves as a sign bit is not changed, and code mapping rules for the other two QPSK signals are changed correspondingly when the sign bit indicates different quadrants. In this way, a higher-order constellation at the receive end can finally meet Gray mapping.

It can be learned from the foregoing content that, when a plurality of lower-order modulation signals at the transmit end are superposed at the receive end in space domain or power domain (namely, energy domain) to generate a higher-order modulation signal, constellation point demodulation performance is affected if coding at the transmit end and the receive end does not meet Gray mapping. In the several examples of joint coding and modulation, modulation mapping relationship schemes for a plurality of lower-order modulation constellations at the transmit end are jointly designed, so that the transmit end and the receive end meet Gray coding, and demodulation performance is improved. Specifically, examples of modulation mapping rules for generating 16QAM, 32QAM, and 64QAM respectively through superposition are provided. A modulation mapping relationship of a QPSK constellation that serves as a sign bit is fixed to indicate locations, in different quadrants, of a higher-order constellation finally obtained through superposition. In addition, a modulation mapping relationship of another lower-order signal is designed to vary in different quadrants. A modulation mapping relationship at the transmit end is changed, so that a signal finally obtained through superposition at the receive end can meet Gray mapping, to improve performance.

It can be learned from the foregoing Example 1 to Example 4 that, in the joint coding and modulation scheme provided in this application, a higher-order modulation signal at the receive end can meet Gray mapping, to improve demodulation performance at the receive end.

2. Superposed-Signal Splitting Scheme

In this scheme, the transmit end may directly map bits in an original bitstream to complex symbols corresponding to lower-order modulation signals, that is, perform symbol-level modulation mapping, to obtain M lower-order modulation signals.

In this solution, the mapping rule indicates a correspondence between bits in an original bitstream including the S bitstreams and a complex symbol in the higher-order modulation signal (namely, a modulation mapping relationship of a higher-order signal), and a correspondence between a complex symbol in the higher-order modulation signal and complex symbols in the M lower-order modulation signals (namely, a symbol splitting relationship of a higher-order signal).

The original bitstream includes bits respectively corresponding to the M lower-order modulation signals, and S is equal to 1 or M. Optionally, bits respectively corresponding to the M lower-order modulation signals are at specific locations of a group of bits in the original bitstream. For example, among every four bits in an Rx bitstream, the 1st and 3rd bits correspond to bits in a Tx1 bitstream, and the 2nd and 4th bits correspond to bits in a Tx2 bitstream. The correspondence between bits in the original bitstream including the S bitstreams and a complex symbol in the higher-order modulation signal means that a plurality of values of a group of bits in the original bitstream including the S bitstreams are in a one-to-one correspondence with complex symbols in the higher-order modulation signal.

Complex symbols in the M lower-order modulation signals are obtained by splitting a complex symbol in the higher-order modulation signal based on an equi-amplitude ratio. To be specific, each complex symbol in the higher-order modulation signal may be split based on an equi-amplitude ratio to obtain complex symbols in the M lower-order modulation signals.

For example, when the transmit end sends two lower-order modulation signals (in other words, M=2) and N-order modulation is used for the higher-order modulation signal at the receive end (in this case, N is greater than or equal to 4), to enable a constellation diagram of the higher-order modulation signal to be received by the receive end to meet Gray mapping and improve demodulation performance, the mapping rule may include the following content:

(1) $2^N$ values ofN bits in the original bitstream are in a one-to-one correspondence with $2^N$ third complex symbols in the higher-order modulation signal to be received by the receive-end device, and every N bits in the original bitstream include N/2 bits corresponding to a first lower-order modulation signal and N/2 bits corresponding to a second lower-order modulation signal. Optionally, when S is equal to 1, the original bitstream is the S bitstreams; or when S is equal to M, the original bitstream includes a first bitstream and a second bitstream, and every N bits in the original bitstream include N/2 bits in the first bitstream and N/2 bits in the second bitstream. For example, the original bitstream may be one independent bitstream that has not undergone bit decomposition, or may be a bitstream constituted by two independent bitstreams based on a specified location correspondence.

(2) In the first modulation scheme, a group of $2^{N/2}$ fourth complex symbols corresponds to the first lower-order modulation signal, a group of $2^{N/2}$ fifth complex symbols corresponds to the second lower-order modulation signal, and results obtained by superposing each of the $2^{N/2}$ fourth complex symbols and each of the $2^{N/2}$ fifth complex symbols based on an equi-amplitude ratio are in a one-to-one correspondence with the $2^N$ third complex symbols.

Therefore, in this modulation scheme, that the transmit-end device modulates one or two bitstreams based on the foregoing superposed-signal splitting scheme to generate two lower-order modulation signals may be: sequentially mapping every N bits in the original bitstream to one of the $2^{N/2}$ fourth complex symbols and one of the $2^{N/2}$ fifth complex symbols, to form the first lower-order modulation signal and the second lower-order modulation signal, where a combination of the fourth complex symbol and the fifth complex symbol corresponds to a third complex symbol to which N bits in the original bitstream are mapped.

It can be understood that, based on the designed superposed-signal splitting scheme, a modulation mapping relationship between N bits in the original bitstream and a complex symbol in the higher-order modulation signal and a correspondence between a complex symbol in the higher-order modulation signal and complex symbols in a plurality of lower-order modulation signals are both known, and each higher-order symbol may correspond to a group of a plurality of lower-order symbols at an equi-amplitude ratio. Therefore, during modulation, the transmit-end device may directly generate, based on every N bits in the original bitstream, complex symbols respectively corresponding to the plurality of lower-order signals, to form a plurality of lower-order modulation signals.

To be specific, the mapping rule may be designed based on the following considerations:

(a) Each higher-order symbol is split to obtain a plurality of corresponding lower-order symbols, so that a plurality of lower-order signals can be superposed to obtain a higher-order signal.

(b) A specific symbol correspondence is designed, so that a higher order obtained through superposition can meet Gray mapping.

Based on the foregoing considerations, different specific symbol correspondences may be designed based on actual cases. This application provides several specific symbol correspondences in different cases as examples, but is not limited to the symbol correspondences. It can be learned from the foregoing content that a complex symbol set of a plurality of lower-order modulation signals at the transmit end and a symbol splitting scheme for a higher-order modulation signal are designed, so that a correspondence between a complex symbol in the higher-order modulation signal and complex symbols in the plurality of lower-order modulation signals is established. Therefore, when modulation is performed based on the superposed-signal splitting scheme, the transmit end may generate a plurality of lower-order modulation signals and send the plurality of lower-order modulation signals, to reduce a modulation order of a transmit-end signal. In addition, the plurality of lower-order modulation signals generated by the transmit end may be superposed based on an equi-amplitude ratio to obtain a higher-order modulation signal, to avoid a problem that a power limitation needs to be set on one or more of the plurality of lower-order modulation signals and transmission performance is affected.

In this application, that a higher-order modulation signal is split based on an equi-amplitude ratio is equivalent to that a plurality of lower-order modulation signals are superposed based on an equi-amplitude ratio. Therefore, a symbol splitting relationship of the higher-order modulation signal may also be referred to as a symbol superposition relationship of the plurality of lower-order modulation signals.

It should be noted that, that a plurality of lower-order modulation signals are superposed based on an equi-amplitude ratio means that an amplitude ratio of the plurality of lower-order modulation signals during modulation is 1:1, and therefore may also be referred to as that amplitudes of the plurality of lower-order modulation signals match. A power ratio of the plurality of lower-order modulation signals at an equi-amplitude ratio after power amplification are the same. To be specific, the power ratio is also 1:1. Therefore, in this application, that a plurality of lower-order modulation signals are superposed based on an equi-power ratio is equivalent to that a plurality of lower-order modulation signals is superposed based on an equi-amplitude ratio, and that a plurality of lower-order modulation signals are superposed based on an equi-power ratio may also be referred to as that powers of the plurality of lower-order modulation signals match.

The following specifically describes the superposed-signal splitting scheme in this application by using several examples.

In the following several examples, corresponding symbol splitting schemes for a higher-order symbol (namely, a correspondence between a higher-order symbol and a plurality of lower-order symbols) are provided for modulation schemes (including uniform modulation and non-uniform modulation) for several higher-order signals such as 16QAM, 64QAM, and NUC-16QAM signals. The symbol splitting schemes specifically include: Example 5: Two lower-order signals whose amplitudes match are superposed to generate a 16QAM signal that meets Gray mapping. Example 6: Two lower-order signals whose amplitudes match are superposed to generate a 64QAM signal that meets Gray mapping. Example 7: Two lower-order signals whose amplitudes match are superposed to generate a 64QAM signal that meets Gray mapping. Example 8: Two lower-order signals whose amplitudes match are superposed to generate an NUC-16QAM signal that meets Gray mapping. Example 9: Two lower-order signals whose amplitudes match are superposed to generate an NUC-64QAM signal that meets Gray mapping.

In the following examples, Tx1, Tx2, and Tx3 represent a plurality of lower-order signals at the transmit end, and Rx represents a higher-order signal to be received by the receive end, where the higher-order signal is obtained by superposing the plurality of lower-order signals at the transmit end.

Example 5: Two Lower-Order Signals Whose Amplitudes Match are Superposed to Generate a 16QAM Signal that Meets Gray Mapping In Example 5, 16QAM modulation is used for a higher-order signal Rx at the receive end. Each of complex symbols in a lower-order signal Tx1 and each of complex symbols in a lower-order signal Tx2 at the transmit end may be superposed based on an equi-amplitude ratio to obtain a complex symbol in the higher-order signal Rx at the receive end. Optionally, complex symbols in the two lower-order signals Tx1 and Tx2 may be obtained by splitting a complex symbol in a higher-order 16QAM signal at the receive end.

It should be noted that, in this example, joint coding and modulation need to be performed on the two lower-order signals at the transmit end, so that a higher-order signal obtained through superposition meets Gray mapping. After receiving the higher-order signal, the receive end may directly restore the raw bits through demodulation. However, in this application, after it is determined that a specific symbol splitting scheme for a higher-order signal is to be used, a specific modulation mapping relationship used for the two lower-order signals at the transmit end is not specifically limited, provided that a used modulation mapping relationship can enable the higher-order signal obtained through superposition to meet Gray mapping. The modulation mapping relationship herein has a same meaning as that in the foregoing embodiments, and is bit-to-symbol mapping. In addition, based on the foregoing symbol splitting scheme for a higher-order signal, modulation constellation diagrams for the two lower-order signals at the transmit end are not constellations specified in a standard (for example, Euclidean distances between adjacent constellation points in a constellation specified in the standard are equal). In other words, lower-order modulation different from that specified in an existing standard is used. It can be learned from FIG. 9 that Euclidean distances between adjacent constellation points in this application are not equal (this may also be considered as a non-square constellation). Constellations that are used in this application and that are different from those in an existing standard are collectively referred to as special constellations.

Figure 9:
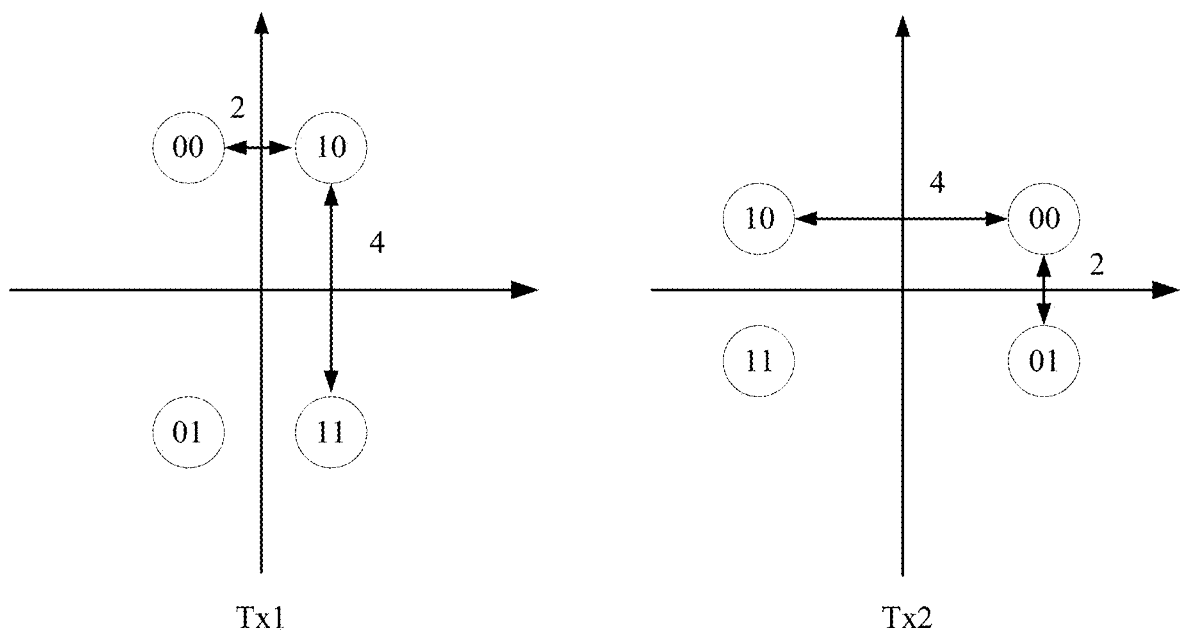
FIG. 9 is a diagram of superposing two lower-order signals whose amplitudes match to generate a 16QAM signal according to Example 5 in an embodiment of this application.

FIG. 9 is an example diagram of superposing two lower-order signals whose amplitudes match to generate a 16QAM signal in Example 5. As shown in FIG. 9, each complex symbol in 16QAM corresponds to four bits. After the 16QAM signal is split into two lower-order signals, each of bits in a lower-order signal Tx1 and each of bits in a lower-order signal Tx2 jointly correspond to one complex symbol. The two bits have four values: {00, 01, 10, 11} which may be mapped to four complex symbols.

TABLE 5

Symbol correspondence in a case in which two lower-order signals whose amplitudes match are superposed to generate a 16QAM signal

| Number | Tx1 symbol | Tx2 symbol | Rx symbol = Tx1 symbol + Tx2 symbol |
|---|---|---|---|
| 1 | 1 + 2j | 2 + 1j | 3 + 3j |
| 2 | | 2 − 1j | 3 + 1j |
| 3 | | −2 + 1j | −1 + 3j |
| 4 | | −2 − 1j | −1 + 1j |
| 5 | 1 − 2j | 2 + 1j | 3 − 1j |
| 6 | | 2 − 1j | 3 − 3j |
| 7 | | −2 + 1j | −1 − 1j |
| 8 | | −2 − 1j | −1 − 3j |
| 9 | −1 − 2j | 2 + 1j | 1 − 1j |
| 10 | | 2 − 1j | 1 − 3j |
| 11 | | −2 + 1j | −3 − 1j |
| 12 | | −2 − 1j | −3 + 3j |
| 13 | −1 + 2j | 2 + 1j | 1 + 3j |
| 14 | | 2 − 1j | 1 + 1j |
| 15 | | −2 + 1j | −3 + 3j |
| 16 | | −2 − 1j | −3 + 1j |

Table 5 shows a symbol correspondence in Example 5 in which two lower-order signals whose amplitudes match are superposed to generate a 16QAM signal, namely, a symbol splitting scheme in which a 16QAM signal is split into two lower-order signals based on an equi-amplitude ratio.

As shown in Table 5, a fourth complex symbol set corresponding to the Tx1 may be {1+2j, 1−2j, −1+2j, −1−2j}, and a fifth complex symbol set corresponding to the Tx2 may be {2+1j, 2−1j, −2+1j, −2−1j}. In addition, each of fourth complex symbols in the fourth complex symbol set corresponding to the Tx1 and each of fifth complex symbols in the fifth complex symbol set corresponding to the Tx2 may be directly superposed based on an equi-amplitude ratio to obtain each complex symbol in 16QAM.

The foregoing symbol correspondence is one-to-one bidirectional mapping. Therefore, based on this symbol splitting scheme for a higher-order signal, provided that a modulation mapping relationship of the 16QAM signal is designed to meet Gray mapping, when it is determined, based on the modulation mapping relationship of 16QAM, that N bits in an original bitstream need to be modulated into a specific higher-order complex symbol, the higher-order complex symbol may be converted, through lookup in Table 5, into two lower-order complex symbols respectively corresponding to two lower-order signals, to omit bit-to-complex symbol mapping in the two lower-order signals Tx1 and Tx2. For a mapping relationship between a raw bit and a symbol, refer to the conventional technology. There may be many types of mapping. For example, in binary phase shift keying (BPSK), bits {0, 1} may be mapped to {1, −1} or {−1, 1}. For example, when it is determined, based on the modulation mapping relationship of 16QAM, that four bits in an original bitstream need to be modulated into a higher-order complex symbol {3+1j}, the higher-order complex symbol {3+1j} may be converted, through table lookup, into two corresponding lower-order complex symbols: {1+2j} and {2−1j}, which serve as complex symbols in two lower-order signals.

Figure 10:
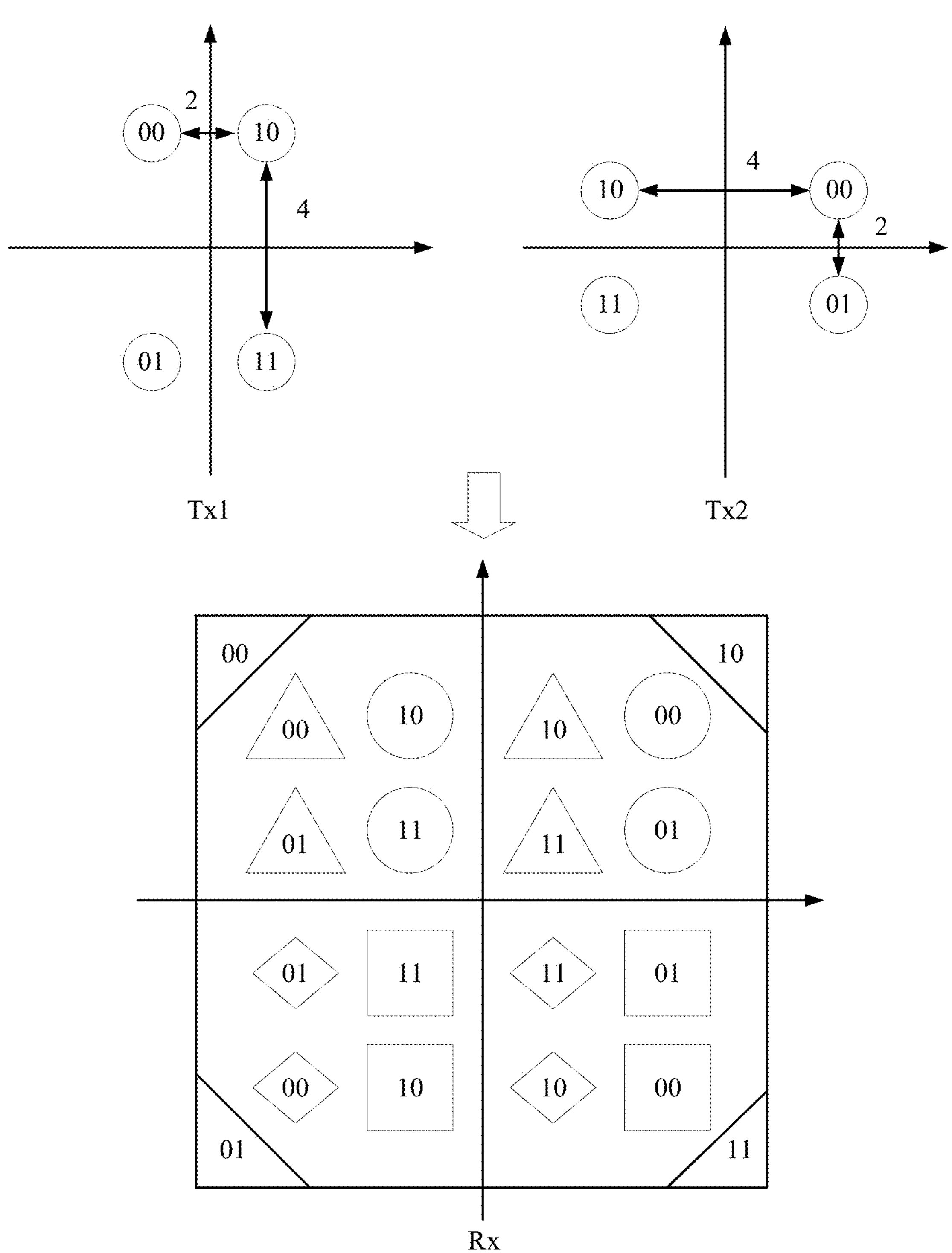
FIG. 10 is a diagram of performing joint modulation and coding on two lower-order signals whose amplitudes match according to Example 5 in an embodiment of this application.

Optionally, modulation mapping relationships of the two lower-order signals may also be specifically designed, as shown in FIG. 10 and Table 6.

FIG. 10 is an example diagram of performing joint coding and modulation on two lower-order signals whose amplitudes match in Example 5. As shown in FIG. 10, a modulation mapping relationship of Tx2 also varies in different quadrants. However, because a higher-order signal obtained through superposition crosses quadrants, a modulation mapping relationship of Tx1 also needs to be changed accordingly. Coding of the Tx1 in the first quadrant in the figure is used as an example. When an I branch of a lower-order signal of the Tx2 is greater than 0(in the first quadrant or a second quadrant), bits {10} in the Tx1 represent a symbol {1+2j} in the first quadrant. When an I branch of a lower-order signal of the Tx2 is less than 0(in a third quadrant or a fourth quadrant), bits {00} in the Tx1 need to represent a symbol {1+2j} in the first quadrant.

TABLE 6

Code mapping table in a case in which two lower-order signals whose amplitudes match are superposed to generate a 16QAM signal

| Number | Tx1 symbol | Tx1 coding | Tx2 symbol | Tx2 coding | Rx symbol = Tx1 symbol + Tx2 symbol | Rx coding |
|---|---|---|---|---|---|---|
| 1 | 1 + 2j | 10 | 2 + 1j | 00 | 3 + 3j | 1000 |
| 2 | | 10 | 2 − 1j | 01 | 3 + 1j | 1001 |
| 3 | | 00 | −2 + 1j | 10 | −1 + 3j | 0100 |
| 4 | | 00 | −2 − 1j | 11 | −1 + 1j | 0101 |
| 5 | 1 − 2j | 11 | 2 + 1j | 01 | 3 − 1j | 1011 |
| 6 | | 11 | 2 − 1j | 00 | 3 − 3j | 1010 |
| 7 | | 01 | −2 + 1j | 11 | −1 − 1j | 0111 |
| 8 | | 01 | −2 − 1j | 10 | −1 − 3j | 0110 |
| 9 | −1 − 2j | 11 | 2 + 1j | 11 | 1 − 1j | 1111 |
| 10 | | 11 | 2 − 1j | 10 | 1 − 3j | 1110 |
| 11 | | 01 | −2 + 1j | 01 | −3 − 1j | 0011 |
| 12 | | 01 | −2 − 1j | 00 | −3 + 3j | 0010 |
| 13 | −1 + 2j | 10 | 2 + 1j | 10 | 1 + 3j | 1100 |
| 14 | | 10 | 2 − 1j | 11 | 1 + 1j | 1101 |
| 15 | | 00 | −2 + 1j | 00 | −3 + 3j | 0000 |
| 16 | | 00 | −2 − 1j | 01 | −3 + 1j | 0001 |

Table 6 shows a code mapping table in Example 5 in which two lower-order signals whose amplitudes match are superposed to generate a T6QAM signal. It should be noted that, to show a correspondence between a higher-order symbol and a plurality of lower-order symbols, in actual application, only information in some columns of Table 6, for example, the Tx1 symbol, Tx2 symbol, and Rx symbol columns, may be used, or information in all columns of Table 6 may be used. When information in some columns of Table 6 is used, these columns may serve as a new mapping table. During modulation, Table 6 further needs to include an Rx coding column for representing an original bitstream. When the Rx coding column is included, Table 6 may further include Tx1 coding and Tx2 coding for representing two bitstreams at the transmit end. Alternatively, Table 6 may not include Tx1 coding or Tx2 coding for representing two bitstreams at the transmit end, because the two bitstreams may be obtained by performing bit decomposition on the original bitstream at a specified location and therefore Tx1 coding or Tx2 coding does not need to be explicitly indicated in Table 6. Similarly, the two bitstreams may alternatively be combined based on a specified location to obtain the original bitstream. To be specific, when Tx1 coding and Tx2 coding are included, Rx coding may not be included. To be specific, during actual use, the Tx1 symbol, Tx2 symbol, and Rx symbol columns in Table 6 may be used, where for a correspondence between the Rx symbol and the Rx coding, refer to the conventional technology; or the Tx1 symbol, the Tx2 symbol, the Rx symbol, and the Rx coding may be used; or the Tx1 symbol, the Tx2 symbol, the Tx1 coding, the Tx2 coding, and the Rx symbol may be used. Table 7 to Table 12 described below are similar to this.

It can be learned from Table 6 that power matching and Gray mapping of the two lower-order signals during modulation can be more directly implemented provided that the higher-order 16QAM signal obtained through superposition meets Gray mapping. To be specific, in the determined modulation mapping relationship of 16QAM, two lower-order complex symbols corresponding to N bits in the original bitstream may be directly determined based on the N bits through table lookup, and then two lower-order complex symbols are directly generated and serve as complex symbols in the two lower-order signals. For example, the bits {1001} in an original bitstream $b_0$ shown in the table are mapped to the complex symbol {3+1j} in 16QAM. Therefore, when $b_0$(4i, 4i+1,4i+2,4i+3)={1001}, it can be learned, through table lookup, that corresponding low-order complex symbols of the Tx1 and the Tx2 in this case are {1+2j} and {2−1j}, and then two complex symbols {1+2j} and {2−1j} may be directly generated as complex symbols in the two lower-order signals.

The modulation mapping relationship shown in Table 6 may also be expressed in the following form.

First, the original bitstream $b_0$ is split into two bitstreams: $b_1$ and $b_2$. Specifically, among every four bits in the original bitstream, the $1^{st}$ and $3^{rd}$ bits may constitute the bitstream $b_1$ of the Tx1, and the $2^{nd}$ and $4^{h}$ bits may constitute the bitstream $b_2$ of the Tx2.

$$b_1(2i)=b_0(4i),\ b_1(2i+1)=b_0(4i+2)$$

$$b_2(2i)=b_0(4i+1),\ b_2(2i+1)=b_0(4i+3)$$

Then the two bitstreams are separately modulated and mapped to complex symbols $d_{Tx1}(i)$ and $d_{Tx2}(i)$, to form two lower-order signals, where i indicates a sequence number of a symbol.

$$d_{Tx1}(i)=\begin{cases}[-(1-2b_1(2i))+2*j(1-2b_1(2i+1))], & \text{when } b_0(4i+1)=0\\ [(1-2b_1(2i))+2*j(1-2b_1(2i+1))], & \text{when } b_0(4i+1)=1\end{cases}$$

-continued $$d_{Tx2}(i) = \begin{cases} [2*(1-2b_2(2i) + j(1-2b_2(2i+1))], & \text{when } b_1(2i)=1 \cap b_1(2i+1)=0 \\ [2*(1-2b_2(2i)) + j(-1+2b_2(2i+1))], & \text{when } b_1(2i)=1 \cap b_1(2i+1)=1 \\ [2*(-1+2b_2(2i) + j(-1+2b_2(2i+1))], & \text{when } b_1(2i)=0 \cap b_1(2i+1)=1 \\ [2*(-1+2b_2(2i)) + j(1-2b_2(2i+1))], & \text{when } b_1(2i)=0 \cap b_1(2i+1)=0 \end{cases}$$

In this way, the two lower-order signals are superposed to obtain the 16QAM signal at the receive end:

$$d_{Rx}(i) = a*d_{Tx1}(i) + d_{Tx2}(i) = d_{Tx1}(i) + d_{Tx2}(i)$$

The 16QAM signal finally obtained through superposition is equivalent to a signal obtained by directly performing higher-order 16QAM modulation:

$$d_{Rx}(i) = (1-2b_0(4i))[2+(1-2b_0(4i+1))] + j(1-2b_0(4i+2))[2+(1-2b_0(4i+3))]$$

Example 6: Two Lower-Order Signals Whose Amplitudes Match are Superposed to Generate a 64QAM Signal that Meets Gray Mapping In Example 6, 64QAM modulation is used for a higher-order signal Rx at the receive end. Each of complex symbols in a lower-order signal Tx1 and each of complex symbols in a lower-order signal Tx2 at the transmit end may be superposed based on an equi-amplitude ratio to obtain a complex symbol in the higher-order signal Rx at the receive end. Optionally, complex symbols in the two lower-order signals Tx1 and Tx2 may be obtained by splitting a complex symbol in a higher-order 64QAM signal at the receive end.

Each complex symbol in 64QAM corresponds to six bits. After the 64QAM signal is split into two lower-order signals, each complex symbol in the two lower-order signals Tx1 and Tx2 may correspond to three bits. The three bits have eight values that may be mapped to eight complex symbols. Correspondingly, constellation diagrams of the two lower-order signals each include eight constellation points. The constellation diagrams of the two lower-order signals are both special (to be specific, not specified in a standard) 8QAM constellation designs proposed in this application. This can be learned from constellation diagrams in FIG. 11 and FIG. 12.

Specifically, Example 6 provides the following two possible symbol splitting schemes for 64QAM in a scenario in which two signals are sent.

Figure 11:
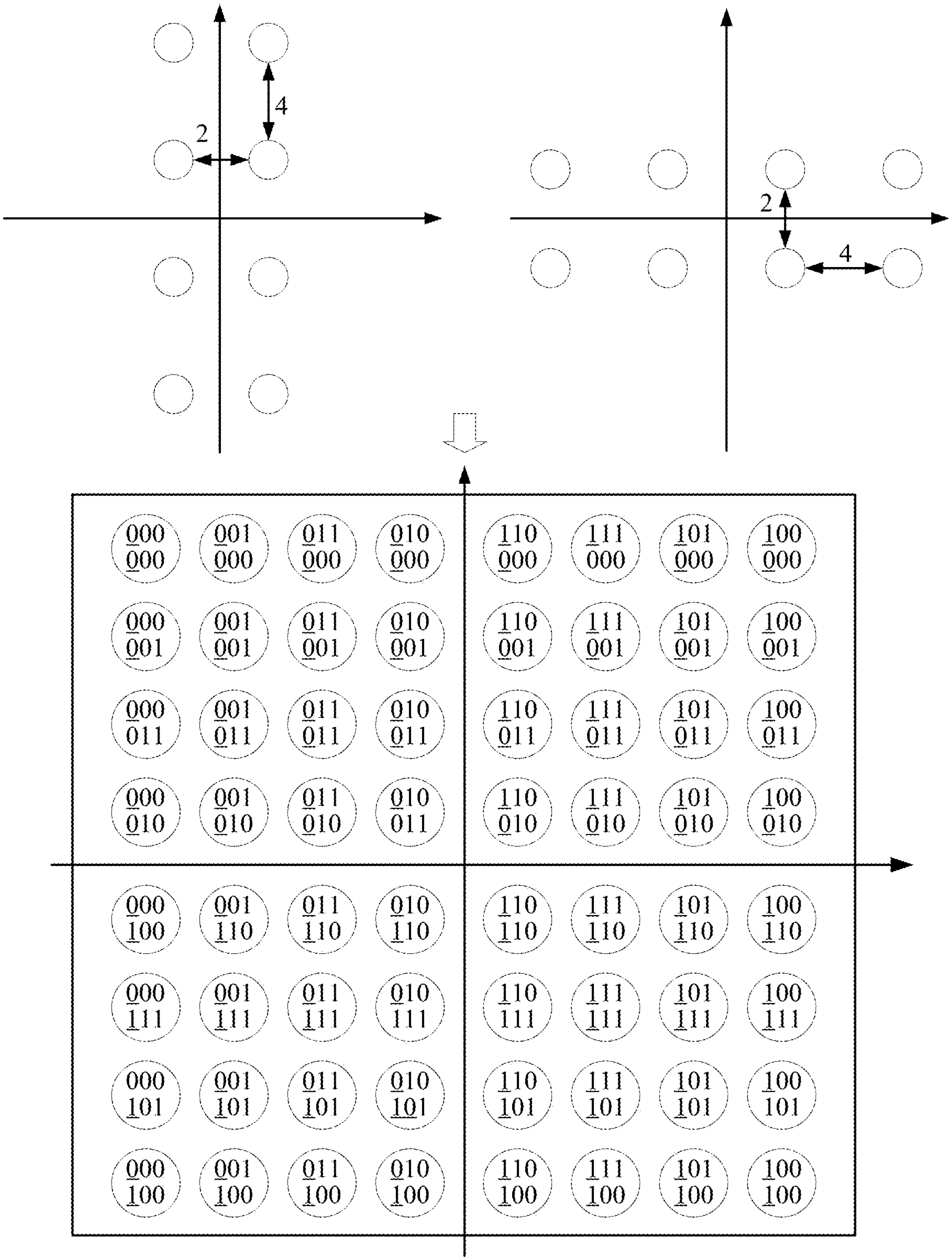
FIG. 11 is a diagram of superposing two lower-order signals whose amplitudes match to generate a 64QAM signal in a symbol splitting scheme 1 for 64QAM according to Example 6 in an embodiment of this application.

(1) Symbol Splitting Scheme 1 for 64QAM:

FIG. 11 is an example diagram of superposing two lower-order signals whose amplitudes match to generate a 64QAM signal in the symbol splitting scheme 1 for 64QAM in Example 6. Table 7 shows a symbol correspondence 1 in Example 6 in which two lower-order signals whose amplitudes match are superposed to generate a 64QAM signal, namely, a symbol splitting scheme 1 in which a 64QAM signal is split into two lower-order signals based on an equi-amplitude ratio.

As shown in FIG. 11 and Table 7, in the symbol splitting scheme 1 for 64QAM, a fourth complex symbol set corresponding to the Tx1 may be {1+6j, 1+2j, 1−2j, 1-6j, −1-6j, −1−2j, −1+2j, −1+6j}, and a fifth complex symbol set corresponding to the Tx2 may be {6+1j, 2+1j, −2+1j, −6+1j, −6−1j, −2−1j, 2−1j, 6−1j}. In addition, each of fourth complex symbols in the fourth complex symbol set corresponding to the Tx1 and each of fifth complex symbols in the fifth complex symbol set corresponding to the Tx2 may be superposed based on an equi-amplitude ratio to obtain each complex symbol in 64QAM.

TABLE 7

Symbol correspondence 1 in a case in which two lower-order signals whose amplitudes match are superposed to generate a 64QAM signal

| Number | Tx1 symbol | Tx2 symbol | Rx symbol = Tx1 symbol + Tx2 symbol |
|---|---|---|---|
| 1 | 1 + 6j | 6 + 1j | 7 + 7j |
| 2 | | 2 + 1j | 3 + 7j |
| 3 | | −2 + 1j | −1 + 7j |
| 4 | | −6 + 1j | −5 + 7j |
| 5 | | −6 − 1j | −5 + 5j |
| 6 | | −2 − 1j | −1 + 5j |
| 7 | | 2 − 1j | 3 + 5j |
| 8 | | 6 − 1j | 7 + 5j |
| 9 | 1 + 2j | 6 + 1j | 7 + 3j |
| 10 | | 2 + 1j | 3 + 3j |
| 11 | | −2 + 1j | −1 + 3j |
| 12 | | −6 + 1j | −5 + 3j |
| 13 | | −6 − 1j | −5 + 1j |
| 14 | | −2 − 1j | −1 + 1j |
| 15 | | 2 − 1j | 3 + 1j |
| 16 | | 6 − 1j | 7 + 1j |
| 17 | 1 − 2j | 6 + 1j | 7 − 1j |
| 18 | | 2 + 1j | 3 − 1j |
| 19 | | −2 + 1j | −1 − 1j |
| 20 | | −6 + 1j | −5 − 1j |
| 21 | | −6 − 1j | −5 − 3j |
| 22 | | −2 − 1j | −1 − 3j |
| 23 | | 2 − 1j | 3 − 3j |
| 24 | | 6 − 1j | 7 − 3j |
| 25 | 1 − 6j | 6 + 1j | 7 − 5j |
| 26 | | 2 + 1j | 3 − 5j |
| 27 | | −2 + 1j | −1 − 5j |
| 28 | | −6 + 1j | −5 − 5j |
| 29 | | −6 − 1j | −5 − 7j |
| 30 | | −2 − 1j | −1 − 7j |
| 31 | | 2 − 1j | 3 − 7j |
| 32 | | 6 − 1j | 7 − 7j |
| 33 | −1 − 6j | 6 + 1j | 5 − 5j |
| 34 | | 2 + 1j | 1 − 5j |
| 35 | | −2 + 1j | −3 − 5j |
| 36 | | −6 + 1j | −7 − 5j |
| 37 | | −6 − 1j | −7 − 7j |
| 38 | | −2 − 1j | −3 − 7j |
| 39 | | 2 − 1j | 1 − 7j |
| 40 | | 6 − 1j | 5 − 7j |
| 41 | −1 − 2j | 6 + 1j | 5 − 1j |
| 42 | | 2 + 1j | 1 − 1j |
| 43 | | −2 + 1j | −3 − 1j |
| 44 | | −6 + 1j | −7 − 1j |
| 45 | | −6 − 1j | −7 − 3j |
| 46 | | −2 − 1j | −3 − 3j |
| 47 | | 2 − 1j | 1 − 3j |
| 48 | | 6 − 1j | 5 − 3j |
| 49 | −1 + 2j | 6 + 1j | 5 + 3j |
| 50 | | 2 + 1j | 1 + 3j |
| 51 | | −2 + 1j | −3 + 3j |
| 52 | | −6 + 1j | −7 + 3j |
| 53 | | −6 − 1j | −7 + 1j |
| 54 | | −2 − 1j | −3 + 1j |
| 55 | | 2 − 1j | 1 + 1j |
| 56 | | 6 − 1j | 5 + 1j |
| 57 | −1 + 6j | 6 + 1j | 5 + 7j |
| 58 | | 2 + 1j | 1 + 7j |
| 59 | | −2 + 1j | −3 + 7j |
| 60 | | −6 + 1j | −7 + 7j |
| 61 | | −6 − 1j | −7 + 5j |

TABLE 7-continued

Symbol correspondence 1 in a case in which two lower-order signals whose amplitudes match are superposed to generate a 64QAM signal

| Number | Tx1 symbol | Tx2 symbol | Rx symbol = Tx1 symbol + Tx2 symbol |
|---|---|---|---|
| 62 | | −2 − 1j | −3 + 5j |
| 63 | | 2 − 1j | 1 + 5j |
| 64 | | 6 − 1j | 5 + 5j |

To be specific, in the symbol splitting scheme 1 for 64QAM, the complex symbols in the two lower-order signals may be respectively expressed as follows:

$$d_{Tx1}=\{1+6j,\ 1+2j,\ 1-2j,\ 1-6j,\ -1-6j,\ -1-2j,\ -1+2j,\ -1+6j\};$$

and $$d_{Tx2}=\{6+1j,\ 2+1j,\ -2+1j,\ -6+1j,\ -6-1j,\ -2-1j,\ 2-1j,\ 6-1j\}.$$

Eight values of three bits in a Tx1 bitstream are mapped to $d_{Tx1}$, and eight values of three bits in a Tx2 bitstream are mapped to $d_{TX2}$. However, a specific modulation mapping relationship is not specifically limited in this application, and may be designed according to a specific requirement.

Figure 12:
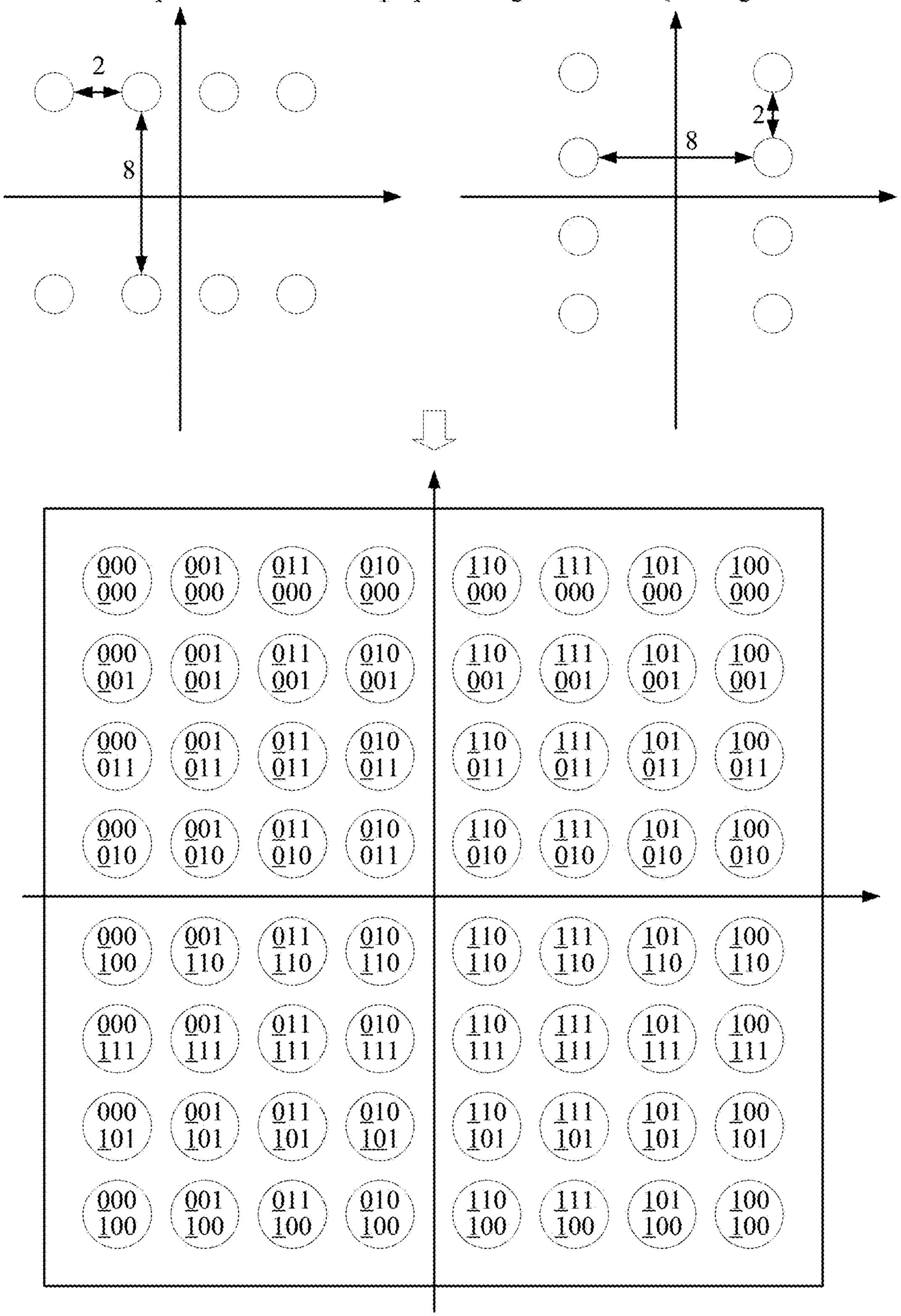
FIG. 12 is a diagram of superposing two lower-order signals whose amplitudes match to generate a 64QAM signal in a symbol splitting scheme 2 for 64QAM according to Example 6 in an embodiment of this application.

(2) Symbol Splitting Scheme 2 for 64QAM:

FIG. 12 is an example diagram of superposing two lower-order signals whose amplitudes match to generate a 64QAM signal in the symbol splitting scheme 2 for 64QAM in Example 6. Table 8 shows a symbol correspondence 2 in Example 6 in which two lower-order signals whose amplitudes match are superposed to generate a 64QAM signal, namely, a symbol splitting scheme 2 in which a 64QAM signal is split into two lower-order signals based on an equi-amplitude ratio.

As shown in FIG. 12 and Table 8, in the symbol splitting scheme 2 for 64QAM, a fourth complex symbol set corresponding to the Tx1 may be {4+3j, 4+1j, 4−1j, 4−3j, −4−3j, −4−1j, −4+1j, −4+3j}, and a fifth complex symbol set corresponding to the Tx2 may be {3+4j, 1+4j, −1+4j, −3+4j, −3−4j, −1−4j, 1−4j, 3−4j}. In addition, each of fourth complex symbols in the fourth complex symbol set corresponding to the Tx1 and each of fifth complex symbols in the fifth complex symbol set corresponding to the Tx2 may be directly superposed based on an equi-amplitude ratio to obtain each complex symbol in 64QAM.

In addition, in the symbol splitting scheme 2 for 64QAM, a location of the Tx1 and a location the Tx2 are interchangeable, with same effect achieved.

TABLE 8

Symbol correspondence 2 in case in which a 64QAM signal is split into two lower-order signals based on an equi-amplitude ratio

| Number | Tx1 symbol | Tx2 symbol | Rx symbol = Tx1 symbol + Tx2 symbol |
|---|---|---|---|
| 1 | 3 + 4j | 4 + 3j | 7 + 7j |
| 2 | | 4 + 1j | 7 + 5j |
| 3 | | 4 − 1j | 7 + 3j |
| 4 | | 4 − 3j | 7 + 1j |
| 5 | | −4 − 3j | −1 + 1j |
| 6 | | −4 − 1j | −1 + 3j |
| 7 | | −4 + 1j | −1 + 5j |
| 8 | | −4 + 3j | −1 + 7j |
| 9 | 1 + 4j | 4 + 3j | 5 + 7j |
| 10 | | 4 + 1j | 5 + 5j |
| 11 | | 4 − 1j | 5 + 3j |
| 12 | | 4 − 3j | 5 + 1j |
| 13 | | −4 − 3j | −3 + 1j |
| 14 | | −4 − 1j | −3 + 3j |
| 15 | | −4 + 1j | −3 + 5j |
| 16 | | −4 + 3j | −3 + 7j |
| 17 | −1 + 4j | 4 + 3j | 3 + 7j |
| 18 | | 4 + 1j | 3 + 5j |
| 19 | | 4 − 1j | 3 + 3j |
| 20 | | 4 − 3j | 3 + 1j |
| 21 | | −4 − 3j | −5 + 1j |
| 22 | | −4 − 1j | −5 + 3j |
| 23 | | −4 + 1j | −5 + 5j |
| 24 | | −4 + 3j | −5 + 7j |
| 25 | −3 + 4j | 4 + 3j | 1 + 7j |
| 26 | | 4 + 1j | 1 + 5j |
| 27 | | 4 − 1j | 1 + 3j |
| 28 | | 4 − 3j | 1 + 1j |
| 29 | | −4 − 3j | −1 + 1j |
| 30 | | −4 − 1j | −1 + 3j |
| 31 | | −4 + 1j | −1 + 5j |
| 32 | | −4 + 3j | −1 + 7j |
| 33 | −3 − 4j | 4 + 3j | 1 − 1j |
| 34 | | 4 + 1j | 1 − 3j |
| 35 | | 4 − 1j | 1 − 5j |
| 36 | | 4 − 3j | 1 − 7j |
| 37 | | −4 − 3j | −7 − 7j |
| 38 | | −4 − 1j | −7 − 5j |
| 39 | | −4 + 1j | −7 − 3j |
| 40 | | −4 + 3j | −7 − 1j |
| 41 | −1 − 4j | 4 + 3j | 3 − 1j |
| 42 | | 4 + 1j | 3 − 3j |
| 43 | | 4 − 1j | 3 − 5j |
| 44 | | 4 − 3j | 3 − 7j |
| 45 | | −4 − 3j | −5 − 7j |
| 46 | | −4 − 1j | −5 − 5j |
| 47 | | −4 + 1j | −5 − 3j |
| 48 | | −4 + 3j | −5 − 1j |
| 49 | 1 − 4j | 4 + 3j | 5 − 1j |
| 50 | | 4 + 1j | 5 − 3j |
| 51 | | 4 − 1j | 5 − 5j |
| 52 | | 4 − 3j | 5 − 7j |
| 53 | | −4 − 3j | −3 − 7j |
| 54 | | −4 − 1j | −3 − 5j |
| 55 | | −4 + 1j | −3 − 3j |
| 56 | | −4 + 3j | −3 − 1j |
| 57 | 3 − 4j | 4 + 3j | 7 − 1j |
| 58 | | 4 + 1j | 7 − 3j |
| 59 | | 4 − 1j | 7 − 5j |
| 60 | | 4 − 3j | 7 − 7j |
| 61 | | −4 − 3j | −1 − 7j |
| 62 | | −4 − 1j | −1 − 5j |
| 63 | | −4 + 1j | −1 − 3j |
| 64 | | −4 + 3j | −1 − 1j |

To be specific, in the symbol splitting scheme 2 for 64QAM, the complex symbols in the two lower-order signals may be respectively expressed as follows:

$$d_{Tx1}=\{4+3j,\ 4+1j,\ 4-1j,\ 4-3j,\ -4-3j,\ -4-1j,\ -4+1j,\ -4+3j\};$$

and $$d_{Tx2}=\{3+4j,\ 1+4j,\ -1+4j,\ -3+4j,\ -3-4j,\ -1-4j,\ 1-4j,\ 3-4j\};$$

or $$d_{Tx1}=\{3+4j,\ 1+4j,\ -1+4j,\ -3+4j,\ -3-4j,\ -1-4j,\ 1-4j,\ 3-4j\};$$

-continued and $$d_{Tx2} = \{4+3j, 4+1j, 4-1j, 4-3j, -4-3j, -4-1j, -4+1j, -4+3j\}.$$

Eight values of three bits in a Tx1 bitstream are mapped to $d_{Tx1}$, and eight values of three bits in a Tx2 bitstream are mapped to $d_{TX2}$. However, a specific symbol to which a bit is mapped is not specifically limited in this application, and this may be designed according to a specific requirement.

It can be learned that, based on the symbol splitting schemes 1 and 2 for 64QAM, symbol splitting may be performed on a complex symbol in higher-order 64QAM at the receive end to obtain complex symbols in two lower-order signals with equal powers at the transmit end, and the two lower-order signals may be superposed in space domain or power domain (namely, energy domain) to obtain a higher-order standard 64QAM constellation that meets one-to-one bidirectional mapping at the receive end.

Example 7: Three Lower-Order Signals are Superposed to Generate a 64QAM Signal that Meets Gray Mapping In Example 7, 64QAM modulation is used for a higher-order signal Rx at the receive end. A complex symbol of a 64QAM signal at the receive end may be split to obtain complex symbols of three lower-order signals Tx1, Tx2, and Tx3 at the transmit end. In this way, the three lower-order signals Tx1, Tx2, and Tx3 may be superposed to obtain the higher-order signal Rx in a case in which a transmit-end power difference is reduced.

Each complex symbol in 64QAM corresponds to six bits. After the 64QAM signal is split into three lower-order signals, each complex symbol in the three lower-order signals Tx1, Tx2, and Tx3 may correspond to two bits. The two bits have four values that may be mapped to four complex symbols. Correspondingly, constellation diagrams of the three lower-order signals each include four constellation points. The constellation diagrams of the three lower-order signals are all special (not specified in a standard) 4QAM constellation designs proposed in this application. This can be learned from constellation diagrams in FIG. 13 and FIG. 14.

Specifically, Example 6 provides the following two possible symbol splitting schemes for 64QAM in a scenario in which three signals are sent.

Figure 13:
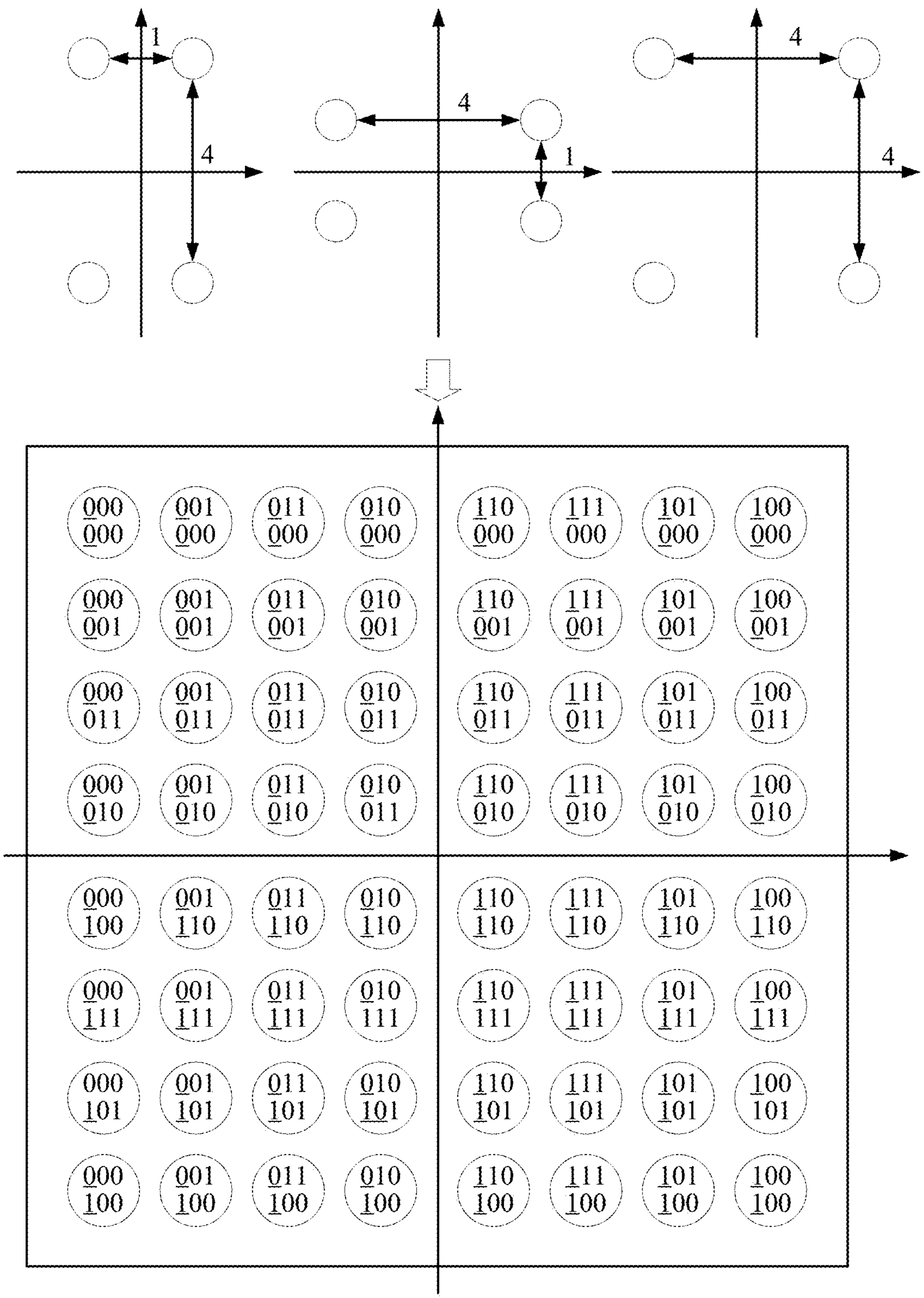
FIG. 13 is a diagram of superposing three lower-order signals to generate a 64QAM signal in a case in which a transmit-end power difference is reduced in a symbol splitting scheme 3 for 64QAM according to Example 7 in an embodiment of this application.

(1) Symbol Splitting Scheme 3 for 64QAM:

FIG. 13 is an example diagram of superposing three lower-order signals to generate a 64QAM signal in a case in which a transmit-end power difference is reduced in the symbol splitting scheme 3 for 64QAM in Example 7. Table 9 shows a symbol correspondence 3 and a code mapping table in Example 7 in which three lower-order signals are superposed to generate a 64QAM signal in a case in which a transmit-end power difference is reduced, namely, a symbol splitting scheme 3 and a code mapping table in which a 64QAM signal is split into three lower-order signals in a case in which a transmit-end power difference is reduced. Specifically, an amplitude ratio of the three lower-order signals is approximately 1:1:2.5, and a corresponding power ratio is approximately 1:1:6.3. In this solution, a problem that a power difference between the three lower-order signals is excessively large and affects system performance can be avoided.

As shown in FIG. 13 and Table 9, in the symbol splitting scheme 3 for 64QAM, a complex symbol set corresponding to the Tx1 may be {1+2j, 1−2j, −1+2j, −1−2j}, a complex symbol set corresponding to the Tx2 may be {2+1j, 2−1j, −2+1j, −2-1j}, and a complex symbol set corresponding to the Tx3 may be {4+4j, 4−4j, −4+4j, −4−4j}. In addition, complex symbols in the complex symbol set corresponding to the Tx1, complex symbols in the complex symbol set corresponding to the Tx2, and complex symbols in the complex symbol set corresponding to the Tx3 may be superposed based on the foregoing amplitude ratio to obtain complex symbols in 64QAM.

TABLE 9

Symbol correspondence 3 in a case in which three lower-order signals are superposed to generate a 64QAM signal in a case in which a transmit-end power difference is reduced

| Number | Tx1 symbol | Tx2 symbol | Tx1 + Tx2 | Tx3 symbol | Rx symbol = Tx1 symbol + Tx2 symbol + Tx3 symbol |
|---|---|---|---|---|---|
| 1 | 1 + 2j | 2 + 1j | 3 + 3j | 4 + 4j | 7 + 7j |
| 2 | | | | 4 − 4j | 7 − 1j |
| 3 | | | | −4 + 4j | −1 + 7j |
| 4 | | | | −4 − 4j | −1 − 1j |
| 5 | | 2 − 1j | 3 + 1j | 4 + 4j | 7 + 5j |
| 6 | | | | 4 − 4j | 7 − 3j |
| 7 | | | | −4 + 4j | −1 + 5j |
| 8 | | | | −4 − 4j | −1 − 3j |
| 9 | | −2 + 1j | −1 + 3j | 4 + 4j | 3 + 7j |
| 10 | | | | 4 − 4j | 3 − 1j |
| 11 | | | | −4 + 4j | −5 + 7j |
| 12 | | | | −4 − 4j | −5 − 1j |
| 13 | | −2 − 1j | −1 + 1j | 4 + 4j | 3 + 5j |
| 14 | | | | 4 − 4j | 3 − 3j |
| 15 | | | | −4 + 4j | −5 + 5j |
| 16 | | | | −4 − 4j | −5 − 3j |
| 17 | 1 − 2j | 2 + 1j | 3 − 1j | 4 + 4j | 7 + 3j |
| 18 | | | | 4 − 4j | 7 − 5j |
| 19 | | | | −4 + 4j | −1 + 3j |
| 20 | | | | −4 − 4j | −1 − 5j |
| 21 | | 2 − 1j | 3 − 3j | 4 + 4j | 7 + 1j |
| 22 | | | | 4 − 4j | 7 − 7j |
| 23 | | | | −4 + 4j | −1 + 1j |
| 24 | | | | −4 − 4j | −1 − 7j |
| 25 | | −2 + 1j | −1 − 1j | 4 + 4j | 3 + 3j |
| 26 | | | | 4 − 4j | 3 − 5j |
| 27 | | | | −4 + 4j | −5 + 3j |
| 28 | | | | −4 − 4j | −5 − 5j |
| 29 | | −2 − 1j | −1 − 3j | 4 + 4j | 3 + 1j |
| 30 | | | | 4 − 4j | 3 − 7j |
| 31 | | | | −4 + 4j | −5 + 1j |
| 32 | | | | −4 − 4j | −5 − 7j |
| 33 | −1 − 2j | 2 + 1j | 1 − 1j | 4 + 4j | 5 + 3j |
| 34 | | | | 4 − 4j | 5 − 5j |
| 35 | | | | −4 + 4j | −3 + 3j |
| 36 | | | | −4 − 4j | −3 − 5j |
| 37 | | 2 − 1j | 1 − 3j | 4 + 4j | 5 + 1j |
| 38 | | | | 4 − 4j | 5 − 7j |
| 39 | | | | −4 + 4j | −3 + 1j |
| 40 | | | | −4 − 4j | −3 − 7j |
| 41 | | −2 + 1j | −3 − 1j | 4 + 4j | 1 + 3j |
| 42 | | | | 4 − 4j | 1 − 5j |
| 43 | | | | −4 + 4j | −7 + 3j |
| 44 | | | | −4 − 4j | −7 − 5j |
| 45 | | −2 − 1j | −3 − 3j | 4 + 4j | 1 + 1j |
| 46 | | | | 4 − 4j | 1 − 7j |
| 47 | | | | −4 + 4j | −7 + 1j |
| 48 | | | | −4 − 4j | −7 − 7j |
| 49 | −1 + 2j | 2 + 1j | 1 + 3j | 4 + 4j | 5 + 7j |
| 50 | | | | 4 − 4j | 5 − 1j |
| 51 | | | | −4 + 4j | −3 + 7j |
| 52 | | | | −4 − 4j | −3 − 1j |
| 53 | | 2 − 1j | 1 + 1j | 4 + 4j | 5 + 5j |
| 54 | | | | 4 − 4j | 5 − 3j |
| 55 | | | | −4 + 4j | −3 + 5j |

TABLE 9-continued

Symbol correspondence 3 in a case in which three lower-order signals are superposed to generate a 64QAM signal in a case in which a transmit-end power difference is reduced

| Number | Tx1 symbol | Tx2 symbol | Tx1 + Tx2 | Tx3 symbol | Rx symbol = Tx1 symbol + Tx2 symbol + Tx3 symbol |
|---|---|---|---|---|---|
| 56 | | | | −4 − 4j | −3 − 3j |
| 57 | | −2 + 1j | −3 + 3j | 4 + 4j | 1 + 7j |
| 58 | | | | 4 − 4j | 1 − 1j |
| 59 | | | | −4 + 4j | −7 + 7j |
| 60 | | | | −4 − 4j | −7 − 1j |
| 61 | | −2 − 1j | −3 + 1j | 4 + 4j | 1 + 5j |
| 62 | | | | 4 − 4j | 1 − 3j |
| 63 | | | | −4 + 4j | −7 + 5j |
| 64 | | | | −4 − 4j | −7 − 3j |

To be specific, in the symbol splitting scheme 3 for 64QAM, the complex symbols in the three lower-order signals may be respectively expressed as follows:

$$d_{Tx1} = \{1+2j, 1-2j, -1+2j, -1-2j\};$$

$$d_{Tx2} = \{2+1j, 2-1j, -2+1j, -2-1j\};$$

and $$d_{Tx3} = \{4+4j, 4-4j, -4+4j, -4-4j\}.$$

Four values of two bits in a Tx1 bitstream are mapped to $d_{Tx1}$, four values of two bits in a Tx2 bitstream are mapped to $d_{TX2}$, and four values of two bits in a Tx3 bitstream are mapped to $d_{TX3}$. However, a specific modulation mapping relationship is not limited, and may be designed according to a specific requirement. The modulation mapping relationship shown in Table 9 is merely an example.

Modulation performed by using the symbol splitting scheme 3 for 64QAM is equivalent to the following: The Tx1 and the Tx2 are superposed to generate standard 16QAM (for example, in the design in Example 5), and then the 16QAM is superposed with the Tx3 to finally obtain 64QAM.

Figure 14:
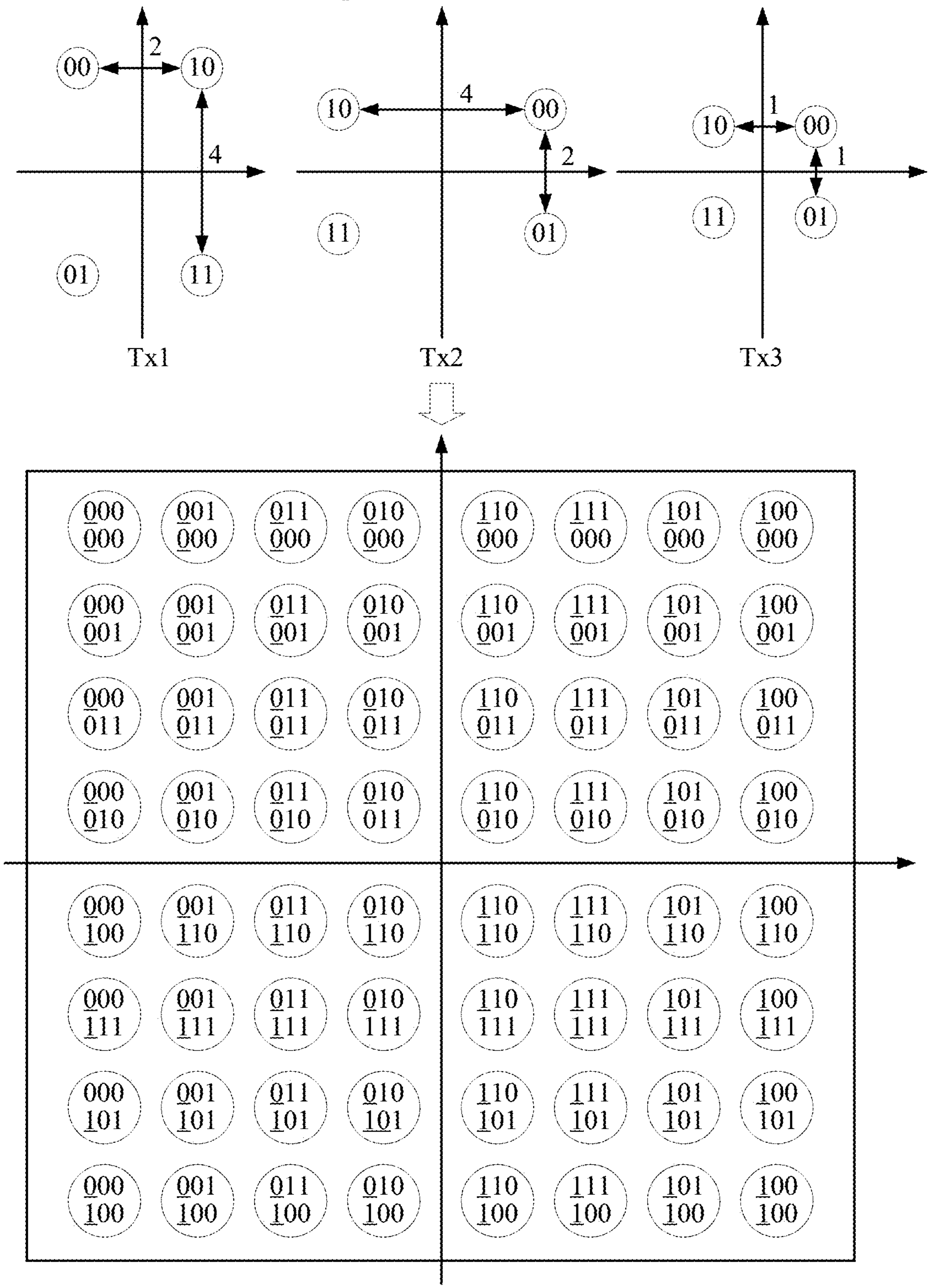
FIG. 14 is a diagram of superposing three lower-order signals to generate a 64QAM signal in a case in which a transmit-end power difference is reduced in a symbol splitting scheme 4 for 64QAM according to Example 7 in an embodiment of this application.

(4) Symbol Splitting Scheme 4 for 64QAM:

FIG. 14 is an example diagram of superposing three lower-order signals to generate a 64QAM signal in a case in which a transmit-end power difference is reduced in the symbol splitting scheme 4 for 64QAM in Example 7. Table 10 shows a symbol correspondence 4 and a code mapping table 2 in Example 7 in which three lower-order signals are superposed to generate a 64QAM signal in a case in which a transmit-end power difference is reduced, namely, a symbol splitting scheme 4 and a code mapping table 2 in which a 64QAM signal is split into three lower-order signals in a case in which a transmit-end power difference is reduced. Specifically, an amplitude ratio obtained by normalizing the three lower-order signals is as follows: Tx1:Tx2:Tx2=3.16:3.16:1; and a corresponding power ratio is 9.98:9.98:1. In this solution, a problem that a power difference between the three lower-order signals is excessively large and affects system performance can be avoided.

TABLE 10

Symbol correspondence 4 in a case in which three lower-order signals are superposed to generate a 64QAM signal in a case in which a transmit-end power difference is reduced

| Number | Tx1 symbol | Tx2 symbol | Tx1 + Tx2 | Tx3 symbol | Rx symbol = Tx1 symbol + Tx2 symbol + Tx3 symbol |
|---|---|---|---|---|---|
| 1 | 2 + 4j | 4 + 2j | 6 + 6j | 1 + 1j | 7 + 7j |
| 2 | | | | 1 − 1j | 7 + 5j |
| 3 | | | | −1 + 1j | 5 + 7j |
| 4 | | | | −1 − 1j | 5 − 5j |
| 5 | | 4 − 2j | 6 + 2j | 1 + 1j | 7 + 3j |
| 6 | | | | 1 − 1j | 7 + j |
| 7 | | | | −1 + 1j | 5 + 3j |
| 8 | | | | −1 − 1j | 5 + j |
| 9 | | −4 + 2j | −2 + 6j | 1 + 1j | −1 + 7j |
| 10 | | | | 1 − 1j | −1 + 5j |
| 11 | | | | −1 + 1j | −3 + 7j |
| 12 | | | | −1 − 1j | −3 + 5j |
| 13 | | −4 − 2j | −2 + 2j | 1 + 1j | −1 + 3j |
| 14 | | | | 1 − 1j | −1 + j |
| 15 | | | | −1 + 1j | −3 + 3j |
| 16 | | | | −1 − 1j | −3 + j |
| 17 | 2 − 4j | 4 + 2j | 6 − 2j | 1 + 1j | 7 − 1j |
| 18 | | | | 1 − 1j | 7 − 3j |
| 19 | | | | −1 + 1j | 5 − 1j |
| 20 | | | | −1 − 1j | 5 − 3j |
| 21 | | 4 − 2j | 2 − 6j | 1 + 1j | 3 − 5j |
| 22 | | | | 1 − 1j | 3 − 7j |
| 23 | | | | −1 + 1j | 1 − 5j |
| 24 | | | | −1 − 1j | 1 − 7j |
| 25 | | −4 + 2j | −2 −2j | 1 + 1j | −1 − 1j |
| 26 | | | | 1 − 1j | −1 − 3j |
| 27 | | | | −1 + 1j | −3 − 1j |
| 28 | | | | −1 − 1j | −3 − 3j |
| 29 | | −4 − 2j | −2 − 6j | 1 + 1j | −1 − 5j |
| 30 | | | | 1 − 1j | −1 − 7j |
| 31 | | | | −1 + 1j | −5 − 5j |
| 32 | | | | −1 − 1j | −5 − 7j |
| 33 | −2 + 4j | 4 + 2j | 2 + 6j | 1 + 1j | 3 + 7j |
| 34 | | | | 1 − 1j | 3 + 5j |
| 35 | | | | −1 + 1j | 1 + 7j |
| 36 | | | | −1 − 1j | 1 + 5j |
| 37 | | 4 − 2j | 2 + 2j | 1 + 1j | 3 + 3j |
| 38 | | | | 1 − 1j | 3 + 1j |
| 39 | | | | −1 + 1j | 1 + 3j |
| 40 | | | | −1 − 1j | −1 + 1j |
| 41 | | −4 + 2j | −6 + 6j | 1 + 1j | −5 + 7j |
| 42 | | | | 1 − 1j | −5 + 5j |
| 43 | | | | −1 + 1j | −7 + 7j |
| 44 | | | | −1 − 1j | −7 + 5j |
| 45 | | −4 − 2j | −6 + 2j | 1 + 1j | −5 + 3j |
| 46 | | | | 1 − 1j | −5 + 1j |
| 47 | | | | −1 + 1j | −7 + 3j |
| 48 | | | | −1 − 1j | −7 + j |
| 49 | −2 − 4j | 4 + 2j | 2 − 2j | 1 + 1j | 3 − 1j |
| 50 | | | | 1 − 1j | 3 − 3j |
| 51 | | | | −1 + 1j | 1 − 1j |
| 52 | | | | −1 − 1j | 1 − 3j |
| 53 | | 4 − 2j | 2 − 6j | 1 + 1j | 3 − 5j |
| 54 | | | | 1 − 1j | 3 − 7j |
| 55 | | | | −1 + 1j | 1 − 5j |
| 56 | | | | −1 − 1j | 1 − 7j |
| 57 | | −4 + 2j | −6 − 2j | 1 + 1j | −5 − 1j |
| 58 | | | | 1 − 1j | −5 − 3j |
| 59 | | | | −1 + 1j | −7 − 1j |
| 60 | | | | −1 − 1j | −7 − 3j |
| 61 | | −4 − 2j | −6 − 6j | 1 + 1j | −5 − 5j |
| 62 | | | | 1 − 1j | −5 − 7j |
| 63 | | | | −1 + 1j | −7 + 5j |
| 64 | | | | −1 − 1j | −7 − 7j |

As shown in FIG. 14 and Table 10, in the symbol splitting scheme 4 for 64QAM, a complex symbol set corresponding to the Tx1 may be {2+4j, 2−4j, −2+4j, −2−4j}, a complex symbol set corresponding to the Tx2 may be {4+2j, 4−2j, −4+2j, −4−2j}, and a complex symbol set corresponding to the Tx3 may be {1+1j, 1−1j, −1+1j, −1−1j}. In addition, complex symbols in the complex symbol set corresponding to the Tx1, complex symbols in the complex symbol set corresponding to the Tx2, and complex symbols in the complex symbol set corresponding to the Tx3 may be superposed based on the foregoing amplitude ratio to obtain complex symbols in 64QAM.

It should be noted that, in the foregoing Example 5 to Example 7, uniform modulation, for example, standard 16QAM or 64QAM, is used for each higher-order signal generated by superposing a plurality of lower-order signals at the transmit end.

Further, in view of phase noise in a high-frequency scenario, this application further provides a technical solution (for example, as shown in the following Example 8 and Example 9) in which a plurality of lower-order signals at the transmit end are superposed to generate a non-uniformly modulated higher-order signal, so that the transmit end sends the plurality of lower-order signals. This not only can reduce a PAPR at the transmit end, but also can obtain a non-uniformly modulated higher-order signal through superposition at the receive end, to improve a capability of resisting phase noise.

Example 8: Two Lower-Order Signals Whose Amplitudes Match are Superposed to Generate a Non-Uniform Constellation (NUC)-16QAM Signal that Meets Gray Mapping In Example 8, NUC-16QAM modulation is used for a higher-order signal Rx at the receive end, where the NUC-16QAM modulation is a type of non-uniform modulation. Each of complex symbols in a lower-order signal Tx1 and each of complex symbols in a lower-order signal Tx2 at the transmit end may be superposed based on an equi-amplitude ratio to obtain a complex symbol in an NUC-16QAM signal at the receive end. Optionally, complex symbols in the two lower-order signals Tx1 and Tx2 at the transmit end may be obtained by splitting a complex symbol in the NUC-16QAM signal.

Each complex symbol in NUC-16QAM corresponds to four bits. After the NUC-16QAM signal is split into two lower-order signals, each complex symbol in the two lower-order signals corresponds to two bits. The two bits have four possible values that may be mapped to four complex symbols.

Figure 15:
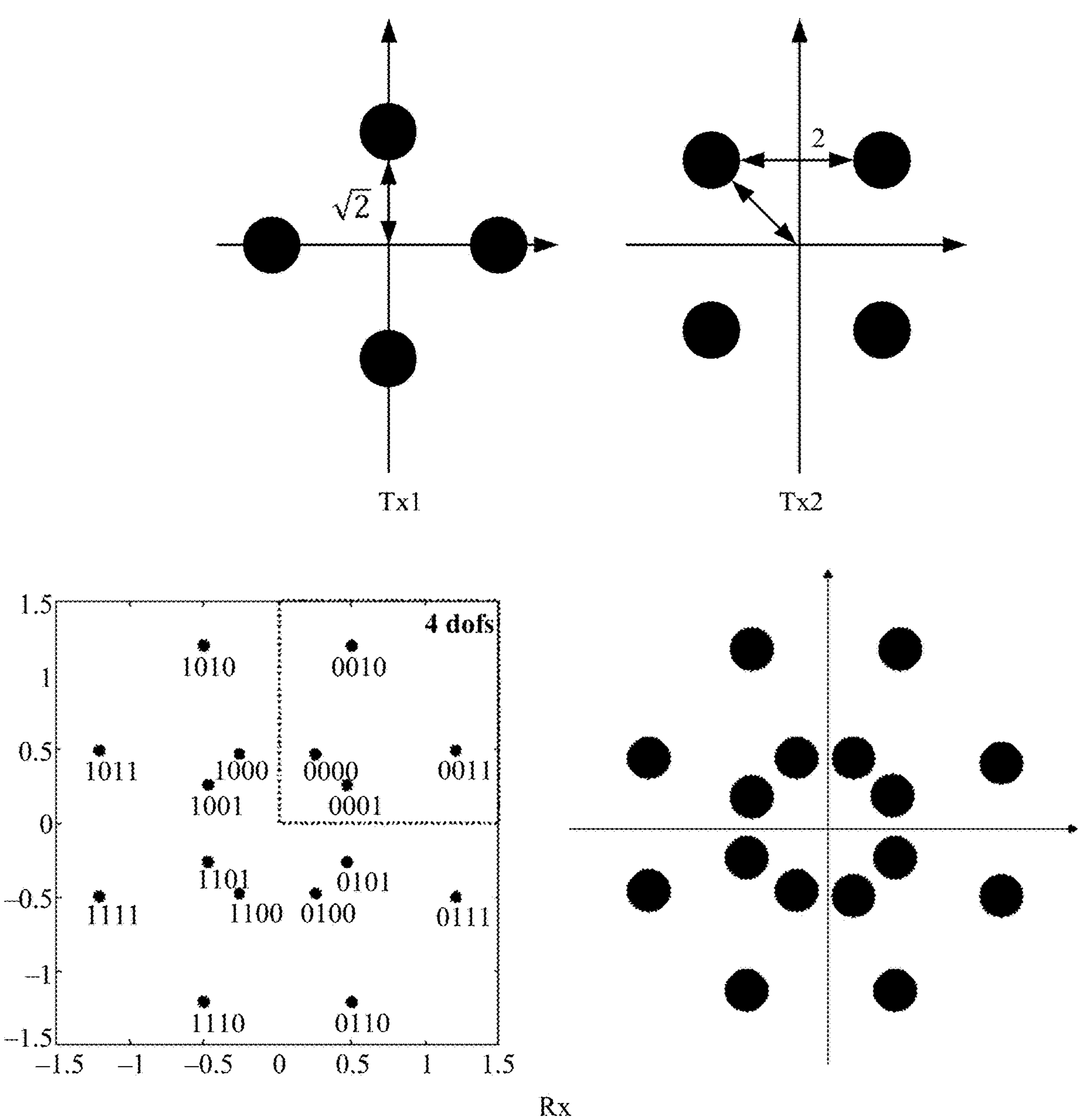
FIG. 15 is a diagram of superposing two lower-order signals whose amplitudes match to generate an NUC-16QAM signal according to Example 8 in an embodiment of this application.

FIG. 15 is an example diagram of superposing two lower-order signals whose amplitudes match to generate an NUC-16QAM signal in Example 8. Table 11 shows a symbol correspondence in Example 8 in which two lower-order signals whose amplitudes match are superposed to generate an NUC-16QAM signal, namely, a symbol splitting scheme in which an NUC-16QAM signal is split into two lower-order signals based on an equi-amplitude ratio.

As shown in FIG. 15 and Table 11, in this symbol splitting scheme, a complex symbol set corresponding to the Tx1 may be {$\sqrt{2}$j, $\sqrt{2}$, −$\sqrt{2}$j, −$\sqrt{2}$}, and a complex symbol set corresponding to the Tx2 may be {1+1j, 1−1j, −1+1j, −1−1j}. In addition, each of complex symbols in the complex symbol set corresponding to the Tx1 and each of complex symbols in the complex symbol set corresponding to the Tx2 may be directly superposed based on an equi-amplitude ratio to obtain each complex symbol in NUC-16QAM.

TABLE 11

Symbol correspondence in a case in which two lower-order signals with equal powers at the transmit end are superposed to generate an NUC-16QAM signal

| Number | Tx1 symbol | Tx2 symbol | Rx symbol = Tx1 symbol + Tx2 symbol |
|---|---|---|---|
| 1 | $\sqrt{2}$j | 1 + 1j | 1 + ($\sqrt{2}$j + 1) × j |
| 2 | | 1 − 1j | 1 + ($\sqrt{2}$j − 1) × j |
| 3 | | −1 + 1j | −1 + ($\sqrt{2}$j + 1) × j |
| 4 | | −1 − 1j | −1 + ($\sqrt{2}$j − 1) × j |
| 5 | $\sqrt{2}$ | 1 + 1j | (1 + $\sqrt{2}$) + 1j |
| 6 | | 1 − 1j | (1 + $\sqrt{2}$) − 1j |
| 7 | | −1 + 1j | (−1 + $\sqrt{2}$) + 1j |
| 8 | | −1 − 1j | (−1 + $\sqrt{2}$) − 1j |
| 9 | −$\sqrt{2}$j | 1 + 1j | 1 + (−$\sqrt{2}$j + 1) × j |
| 10 | | 1 − 1j | 1 + (−$\sqrt{2}$j − 1) × j |
| 11 | | −1 + 1j | −1 + (−$\sqrt{2}$j + 1) × j |
| 12 | | −1 − 1j | −1 + (−$\sqrt{2}$j − 1) × j |
| 13 | −$\sqrt{2}$ | 1 + 1j | (1 − $\sqrt{2}$) + 1j |
| 14 | | 1 − 1j | (1 − $\sqrt{2}$) − 1j |
| 15 | | −1 + 1j | (−1 − $\sqrt{2}$) + 1j |
| 16 | | −1 − 1j | (−1 − $\sqrt{2}$) − 1j |

To be specific, in this symbol splitting scheme, the complex symbols in the two lower-order signals may be respectively expressed as follows:

$$d_{Tx1} = \{\sqrt{2}\,j, \sqrt{2}, -\sqrt{2}\,j, -\sqrt{2}\};$$

and $$d_{Tx2} = \{1 + 1j, 1 - 1j, -1 + 1j, -1 - 1j\}.$$

Four values of two bits in the Tx1 are mapped to $d_{Tx1}$, and four values of two bits in the Tx2 are mapped to $d_{TX2}$. However, a specific symbol to which a combination of bits is mapped is not limited, and this may be designed according to a specific requirement.

It can be learned that, based on the foregoing symbol splitting scheme, symbol splitting may be performed on a higher-order signal at the receive end to obtain two lower-order signals with equal powers at the transmit end, and the two lower-order signals may be superposed in space domain or power domain (namely, energy domain) to obtain a non-uniformly modulated higher-order constellation that meets one-to-one bidirectional mapping at the receive end, to improve a capability of resisting phase noise.

Example 9: Two Lower-Order Signals Whose Amplitudes Match are Superposed to Generate an NUC-64QAM Signal that Meets Gray Mapping In Example 9, NUC-64QAM modulation is used for a higher-order signal Rx at the receive end, where the NUC-64QAM modulation is a type of non-uniform modulation. Each of complex symbols in a lower-order signal Tx1 and each of complex symbols in a lower-order signal Tx2 at the transmit end may be superposed based on an equi-amplitude ratio to obtain a complex symbol in an NUC-64QAM signal at the receive end. Optionally, complex symbols in the two lower-order signals Tx1 and Tx2 at the transmit end may be obtained by decomposing a complex symbol in the NUC-16QAM signal.

Each complex symbol in NUC-64QAM corresponds to six bits. After the NUC-64QAM signal is split into two lower-order signals, each complex symbol in the two lower-order signals corresponds to three bits. The three bits have eight possible values that may be mapped to eight complex symbols. Constellation diagrams of the two lower-order signals are both non-uniform modulation NUC-8QAM constellation designs. This can be learned from a constellation diagram in FIG. 16.

Figure 16:
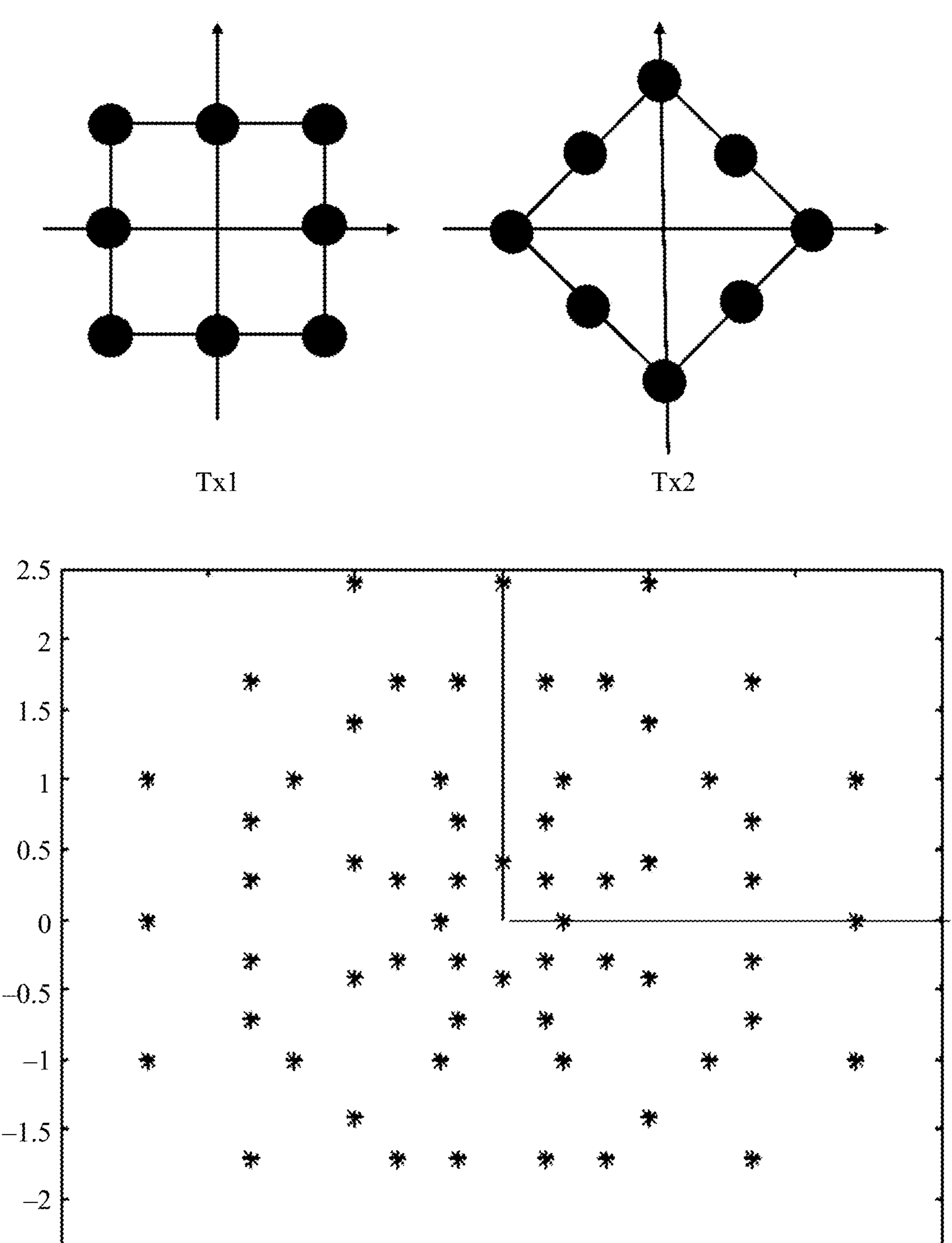
FIG. 16 is a diagram of superposing two lower-order signals whose amplitudes match to generate an NUC-64QAM signal according to Example 8 in an embodiment of this application.

FIG. 16 is an example diagram of superposing two lower-order signals whose amplitudes match to generate an NUC-64QAM signal in Example 9. Table 11 shows a symbol correspondence in Example 9 in which two lower-order signals whose amplitudes match are superposed to generate an NUC-64QAM signal, namely, a symbol splitting scheme in which an NUC-64QAM signal is split into two lower-order signals based on an equi-amplitude ratio.

As shown in FIG. 16 and Table 12, in this symbol splitting scheme, a complex symbol set corresponding to the Tx1 may be {1, 1+1j, 1j, −1+1j, −1, −1−1j, −1j, 1−1j}, and a complex symbol set corresponding to Tx1 may be $$\left\{\sqrt{2}, \frac{\sqrt{2}}{2}(1+1j), \sqrt{2}j, \frac{\sqrt{2}}{2}(-1+1j), -\sqrt{2}, \frac{\sqrt{2}}{2}(-1-1j), -\sqrt{2}j, \frac{\sqrt{2}}{2}(1-1j)\right\}.$$

In addition, each of complex symbols in the complex symbol set corresponding to the Tx1 and each of complex symbols in the complex symbol set corresponding to the Tx2 may be directly superposed based on an equi-amplitude ratio to obtain each complex symbol in NUC-64QAM.

TABLE 12

Symbol correspondence in a case in which two lower-order signals with equal powers at the transmit end are superposed to generate an NUC-64QAM signal

| Number | Tx1 symbol | Tx2 symbol | Rx symbol = Tx1 symbol + Tx2 symbol |
|---|---|---|---|
| 1 | 1 | $\sqrt{2}$ | $1+\sqrt{2}$ |
| 2 | | $\frac{\sqrt{2}}{2}(1+1j)$ | $\left(\frac{\sqrt{2}}{2}+1\right)+\frac{\sqrt{2}}{2}j$ |
| 3 | | $\sqrt{2}j$ | $1+\sqrt{2}j$ |
| 4 | | $\frac{\sqrt{2}}{2}(-1+1j)$ | $\left(1-\frac{\sqrt{2}}{2}\right)+\frac{\sqrt{2}}{2}j$ |
| 5 | | $-\sqrt{2}$ | $1-\sqrt{2}$ |
| 6 | | $\frac{\sqrt{2}}{2}(-1-1j)$ | $-\left(\frac{\sqrt{2}}{2}+1\right)-\frac{\sqrt{2}}{2}j$ |
| 7 | | $-\sqrt{2}j$ | $1-\sqrt{2}j$ |
| 8 | | $\frac{\sqrt{2}}{2}(1-1j)$ | $\left(\frac{\sqrt{2}}{2}+1\right)-\frac{\sqrt{2}}{2}j$ |
| 9 | 1 + 1j | $\sqrt{2}$ | $1+(\sqrt{2}+1)j$ |
| 10 | | $\frac{\sqrt{2}}{2}(1+1j)$ | $\left(\frac{\sqrt{2}}{2}+1\right)+\left(\frac{\sqrt{2}}{2}+1\right)j$ |
| 11 | | $\sqrt{2}j$ | $1+(\sqrt{2}+1)j$ |
| 12 | | $\frac{\sqrt{2}}{2}(-1+1j)$ | $\left(1-\frac{\sqrt{2}}{2}\right)+\left(\frac{\sqrt{2}}{2}+1\right)j$ |
| 13 | | $-\sqrt{2}$ | $1-\sqrt{2}+1j$ |
| 14 | | $\frac{\sqrt{2}}{2}(-1-1j)$ | $-\left(\frac{\sqrt{2}}{2}+1\right)+\left(1-\frac{\sqrt{2}}{2}\right)j$ |
| 15 | | $-\sqrt{2}j$ | $1+(1-\sqrt{2})j$ |
| 16 | | $\frac{\sqrt{2}}{2}(1-1j)$ | $\left(\frac{\sqrt{2}}{2}+1\right)+\left(1-\frac{\sqrt{2}}{2}\right)j$ |
| 17 | 1j | $\sqrt{2}$ | $\sqrt{2}+1j$ |
| 18 | | $\frac{\sqrt{2}}{2}(1+1j)$ | $\frac{\sqrt{2}}{2}+\left(\frac{\sqrt{2}}{2}+1\right)j$ |
| 19 | | $\sqrt{2}j$ | $(\sqrt{2}+1)j$ |
| 20 | | $\frac{\sqrt{2}}{2}(-1+1j)$ | $-\frac{\sqrt{2}}{2}+\left(\frac{\sqrt{2}}{2}+1\right)j$ |

TABLE 12-continued

| Symbol correspondence in a case in which two lower-order signals with equal powers at the transmit end are superposed to generate an NUC-64QAM signal | | | |
|---|---|---|---|
| Number | Tx1 symbol | Tx2 symbol | Rx symbol = Tx1 symbol + Tx2 symbol |
| 21 | | $-\sqrt{2}$ | $-\sqrt{2}+1j$ |
| 22 | | $\frac{\sqrt{2}}{2}(-1-1j)$ | $-\frac{\sqrt{2}}{2}+\left(1-\frac{\sqrt{2}}{2}\right)j$ |
| 23 | | $-\sqrt{2}j$ | $(1-\sqrt{2})j$ |
| 24 | | $\frac{\sqrt{2}}{2}(1-1j)$ | $\left(\frac{\sqrt{2}}{2}\right)+\left(1-\frac{\sqrt{2}}{2}\right)j$ |
| 25 | $-1+1j$ | $\sqrt{2}$ | $-1+(\sqrt{2}+1)j$ |
| 26 | | $\frac{\sqrt{2}}{2}(1+1j)$ | $\left(\frac{\sqrt{2}}{2}-1\right)+\left(\frac{\sqrt{2}}{2}+1\right)j$ |
| 27 | | $\sqrt{2}j$ | $-1+(\sqrt{2}+1)j$ |
| 28 | | $\frac{\sqrt{2}}{2}(-1+1j)$ | $\left(-1-\frac{\sqrt{2}}{2}\right)+\left(\frac{\sqrt{2}}{2}+1\right)j$ |
| 29 | | $-\sqrt{2}$ | $-1-\sqrt{2}+1j$ |
| 30 | | $\frac{\sqrt{2}}{2}(-1-1j)$ | $-\left(\frac{\sqrt{2}}{2}+1\right)+\left(1-\frac{\sqrt{2}}{2}\right)j$ |
| 31 | | $-\sqrt{2}j$ | $-1+(1-\sqrt{2})j$ |
| 32 | | $\frac{\sqrt{2}}{2}(1-1j)$ | $\left(\frac{\sqrt{2}}{2}-1\right)+\left(1-\frac{\sqrt{2}}{2}\right)j$ |
| 33 | $-1$ | $\sqrt{2}$ | $-1+\sqrt{2}$ |
| 34 | | $\frac{\sqrt{2}}{2}(1+1j)$ | $\left(\frac{\sqrt{2}}{2}-1\right)+\frac{\sqrt{2}}{2}j$ |
| 35 | | $\sqrt{2}j$ | $-1+\sqrt{2}j$ |
| 36 | | $\frac{\sqrt{2}}{2}(-1+1j)$ | $\left(-1-\frac{\sqrt{2}}{2}\right)+\frac{\sqrt{2}}{2}j$ |
| 37 | | $-\sqrt{2}$ | $-1-\sqrt{2}$ |
| 38 | | $\frac{\sqrt{2}}{2}(-1-1j)$ | $-\left(\frac{\sqrt{2}}{2}-1\right)-\frac{\sqrt{2}}{2}j$ |
| 39 | | $-\sqrt{2}j$ | $-1-\sqrt{2}j$ |
| 40 | | $\frac{\sqrt{2}}{2}(1-1j)$ | $\left(\frac{\sqrt{2}}{2}-1\right)-\frac{\sqrt{2}}{2}j$ |
| 41 | $-1-1j$ | $\sqrt{2}$ | $-1+(\sqrt{2}-1)j$ |
| 42 | | $\frac{\sqrt{2}}{2}(1+1j)$ | $\left(\frac{\sqrt{2}}{2}-1\right)+\left(\frac{\sqrt{2}}{2}-1\right)j$ |
| 43 | | $\sqrt{2}j$ | $-1+(\sqrt{2}-1)j$ |
| 44 | | $\frac{\sqrt{2}}{2}(-1+1j)$ | $\left(-1-\frac{\sqrt{2}}{2}\right)+\left(\frac{\sqrt{2}}{2}-1\right)j$ |
| 45 | | $-\sqrt{2}$ | $-1-\sqrt{2}-1j$ |
| 46 | | $\frac{\sqrt{2}}{2}(-1-1j)$ | $-\left(\frac{\sqrt{2}}{2}+1\right)-\left(1+\frac{\sqrt{2}}{2}\right)j$ |
| 47 | | $-\sqrt{2}j$ | $-1+(-1-\sqrt{2})j$ |

TABLE 12-continued

Symbol correspondence in a case in which two lower-order signals with equal powers at the transmit end are superposed to generate an NUC-64QAM signal

| Number | Tx1 symbol | Tx2 symbol | Rx symbol = Tx1 symbol + Tx2 symbol |
|---|---|---|---|
| 48 | | $\frac{\sqrt{2}}{2}(1-1j)$ | $\left(\frac{\sqrt{2}}{2}-1\right)+\left(-1-\frac{\sqrt{2}}{2}\right)j$ |
| 49 | −1j | $\sqrt{2}$ | $(\sqrt{2}-1)j$ |
| 50 | | $\frac{\sqrt{2}}{2}(1+1j)$ | $\left(\frac{\sqrt{2}}{2}\right)+\left(\frac{\sqrt{2}}{2}-1\right)j$ |
| 51 | | $\sqrt{2}j$ | $(\sqrt{2}-1)j$ |
| 52 | | $\frac{\sqrt{2}}{2}(-1+1j)$ | $\left(-\frac{\sqrt{2}}{2}\right)+\left(\frac{\sqrt{2}}{2}-1\right)j$ |
| 53 | | $-\sqrt{2}$ | $-\sqrt{2}-1j$ |
| 54 | | $\frac{\sqrt{2}}{2}(-1-1j)$ | $-\left(\frac{\sqrt{2}}{2}\right)-\left(1+\frac{\sqrt{2}}{2}\right)j$ |
| 55 | | $-\sqrt{2}j$ | $(-1-\sqrt{2})j$ |
| 56 | | $\frac{\sqrt{2}}{2}(1-1j)$ | $\left(\frac{\sqrt{2}}{2}\right)+\left(-1-\frac{\sqrt{2}}{2}\right)j$ |
| 57 | 1 − 1j | $\sqrt{2}$ | $1+(\sqrt{2}-1)j$ |
| 58 | | $\frac{\sqrt{2}}{2}(1+1j)$ | $\left(\frac{\sqrt{2}}{2}+1\right)+\left(\frac{\sqrt{2}}{2}-1\right)j$ |
| 59 | | $\sqrt{2}j$ | $1+(\sqrt{2}-1)j$ |
| 60 | | $\frac{\sqrt{2}}{2}(-1+1j)$ | $\left(1-\frac{\sqrt{2}}{2}\right)+\left(\frac{\sqrt{2}}{2}-1\right)j$ |
| 61 | | $-\sqrt{2}$ | $1-\sqrt{2}-1j$ |
| 62 | | $\frac{\sqrt{2}}{2}(-1-1j)$ | $\left(-\frac{\sqrt{2}}{2}+1\right)-\left(1+\frac{\sqrt{2}}{2}\right)j$ |
| 63 | | $-\sqrt{2}j$ | $1+(-1-\sqrt{2})j$ |
| 64 | | $\frac{\sqrt{2}}{2}(1-1j)$ | $\left(\frac{\sqrt{2}}{2}+1\right)+\left(-1-\frac{\sqrt{2}}{2}\right)j$ |

To be specific, in this symbol splitting scheme, the complex symbols in the two lower-order signals may be respectively expressed as follows:

$$d_{Tx1}=\{1,\ 1+1j,\ 1j,\ -1+1j,\ -1,\ -1-1j,\ -1j,\ 1-1j\};$$

and $$d_{Tx2}=\left\{\sqrt{2},\ \frac{\sqrt{2}}{2}(1+1j),\ \sqrt{2}j,\ \frac{\sqrt{2}}{2}(-1+1j),\ -\sqrt{2},\ \frac{\sqrt{2}}{2}(-1-1j),\ -\sqrt{2}j,\ \frac{\sqrt{2}}{2}(1-1j)\right\}.$$

Eight values of three bits in the Tx1 are mapped to $d_{Tx1}$, and eight values of three bits in the Tx2 are mapped to $d_{Tx2}$. However, a specific symbol to which a combination of bits is mapped is not limited, and this may be designed according to a specific requirement.

It can be learned from the foregoing Example 5 to Example 9 that, in technical solutions of this application in which modulation is performed by using the superposed-signal splitting scheme, a complex symbol in a higher-order signal to be received by the receive end is split to obtain a mapping relationship between a complex symbol in the higher-order signal and complex symbols in a plurality of lower-order signals, and a modulation and superposition scheme for a plurality of lower-order signals at the transmit end is designed, so that the plurality of lower-order signals at the transmit end can be superposed based on an equi-amplitude ratio or with an amplitude ratio minimized during superposition, to obtain a higher-order signal. In this way, a power difference between the plurality of lower-order signals at the transmit end is reduced, and system performance is improved. In addition, a modulation and coding scheme for a higher-order signal at the receive end may be designed to meet Gray mapping, to improve demodulation performance at the receive end.

Figure 17:
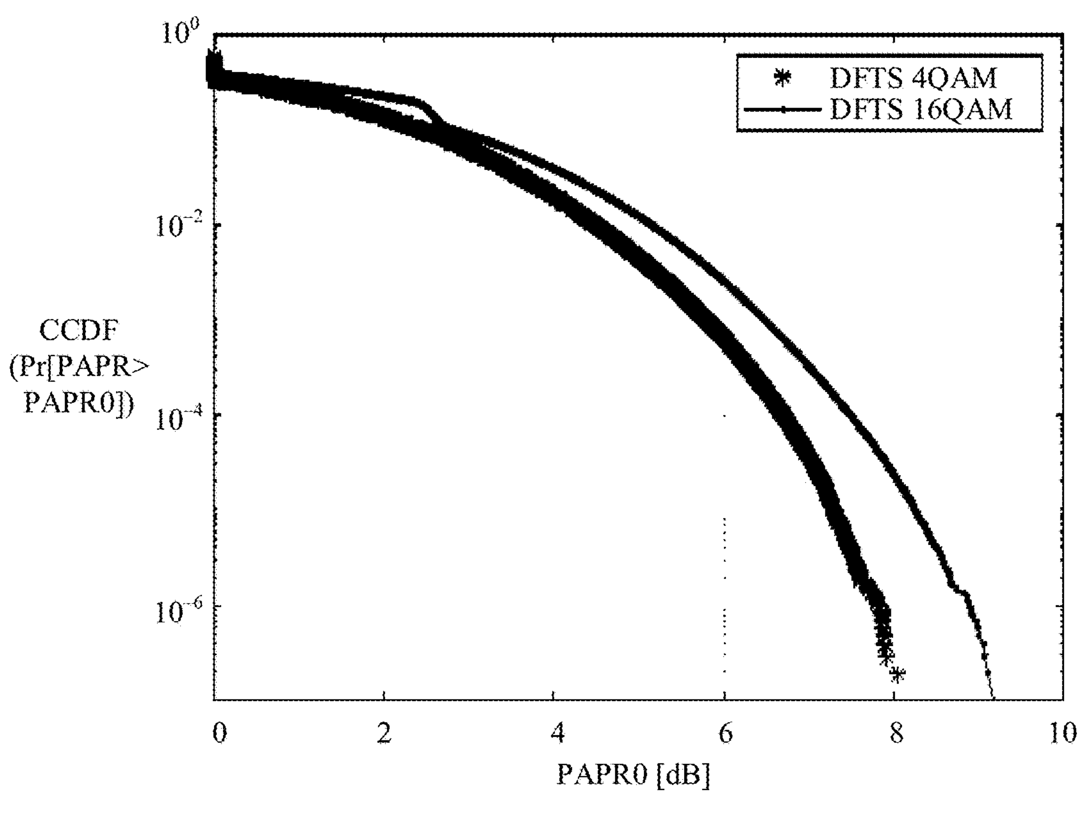
FIG. 17 is a diagram of PAPRs of transmit-end signals in a symbol splitting scheme in which non-uniform modulation is used according to an embodiment of this application.

For the non-uniform modulation symbol splitting schemes shown in Example 8 and Example 9, a PAPR of a lower-order signal at the transmit end may be shown in FIG. 17, and is lower than a PAPR of a higher-order signal.

Non-uniform modulation in NUC-16QAM is used below as an example to describe a function of non-uniform modulation to resist phase noise.

Usually, a capability of a modulation constellation to resist phase noise may be evaluated from two aspects: (1) a quantity of circles in a constellation diagram, where the quantity of circles depends on distribution of constellation points and a distance from each modulation signal to an origin, and a smaller quantity of circles indicates a stronger resistance capability; and (2) a minimum angle difference between constellation points in each circle, where a larger angle difference indicates greater tolerance for rotation caused by impact of phase noise.

Figure 18:
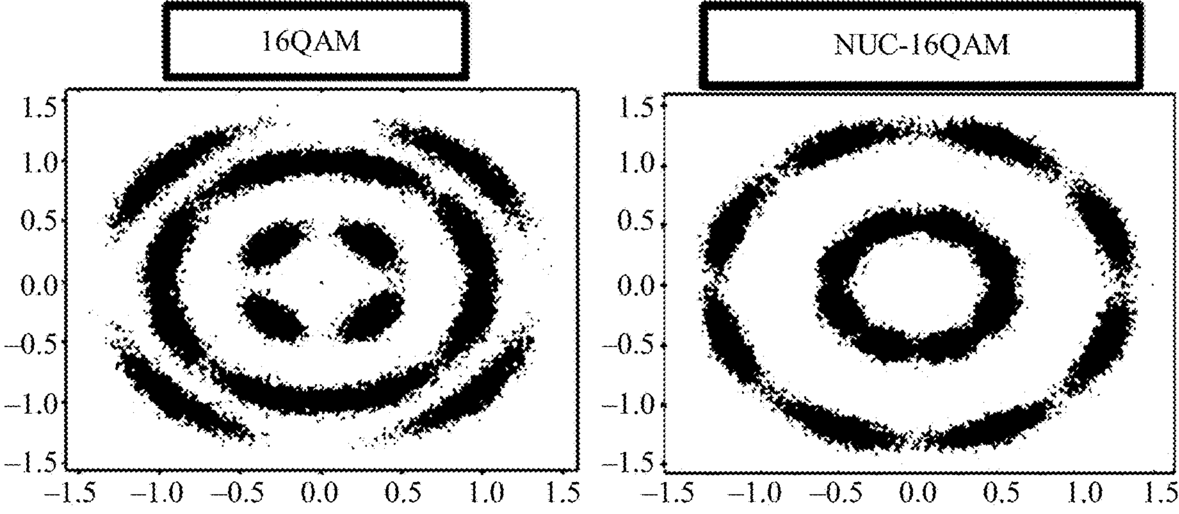
FIG. 18 is modulation constellation diagrams for 16QAM and NUC-16QAM according to an embodiment of this application.
Figure 19:
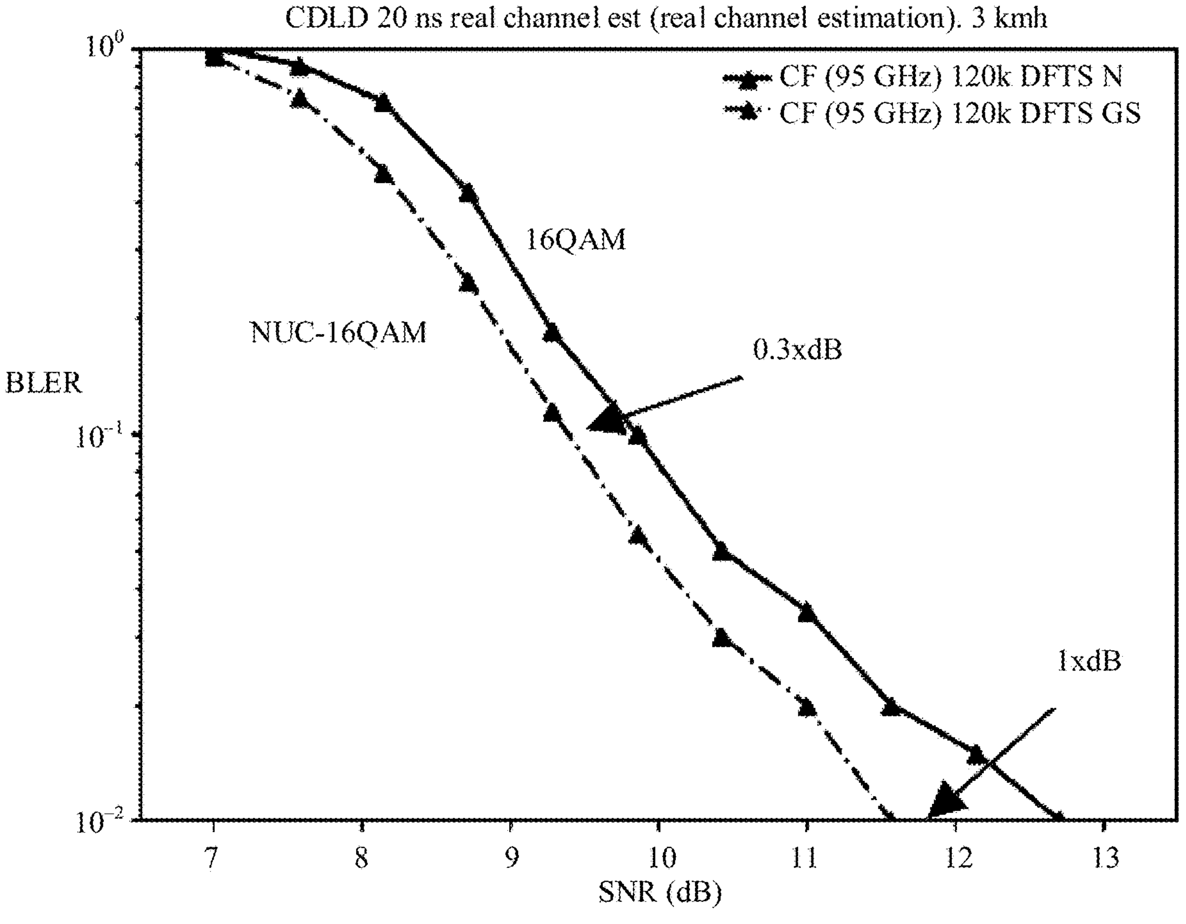
FIG. 19 is a diagram of comparison between phase noise impact and BLER impact in 16QAM and those in NUC-16QAM according to an embodiment of this application.

A diagram on the left and a diagram on the right in FIG. 18 are constellation diagrams for 16QAM and NUC-16QAM respectively. FIG. 19 is a diagram of comparison between phase noise impact and block error rate (BLER) impact in 16QAM and NUC-16QAM. As shown in FIG. 18 and FIG. 19, existence of phase noise causes phase rotation of constellation points. A minimum angle between adjacent constellation points in the 16QAM and that in the NUC-16QAM are both 45 degrees. However, the 16QAM has a larger quantity of circles and has a weak capability of resisting to phase noise, and the NUC-16QAM has a smaller quantity of circles and has good performance. Rough performance evaluation may also be learned from a line graph of a BELR.

It can be learned from the foregoing analysis that, in the solution provided in this application in which a plurality of lower-order signals are superposed to obtain a non-uniformly modulated higher-order constellation, a technical problem that both a low PAPR and resistance to phase noise need to be achieved in a high-frequency scenario can be resolved. Compared with a uniformly modulated higher-order constellation, a non-uniformly modulated higher-order constellation generated through superposition at the receive end in a case in which a plurality of lower-order signals are obtained through decomposition at the transmit end and transmit-end signals have equal powers can better resist impact of phase noise.

Step 402: The transmit-end device sends the M lower-order modulation signals through a LOS channel.

The line of sight (LOS) channel is a wireless channel under a line of sight condition. Usually, a mode in which a radio wave is propagated along a straight line is referred to as line of sight (LOS) propagation. Under a line of sight condition, a radio signal is propagated between the transmit end and the receive end along a straight line without being blocked.

The M lower-order modulation signals may be sent on different antennas of the transmit-end device.

Optionally, in this application, before sending the M lower-order modulation signals, the transmit-end device may precode a transmit signal matrix including the M lower-order modulation signals, where the precoding may also be referred to as pre-equalization at the transmit end.

Different from precoding in the conventional technology, because the M lower-order modulation signals actually pass through different channels, the precoding in this application is intended to compensate for impact of the channels, and reduce impact of a channel difference on the higher-order modulation signal obtained by superposing the M lower-order modulation signals at the receive end, to improve signal transmission performance. Therefore, a precoding matrix needs to meet the following relationship: $H^*W=\Lambda$, where W is the precoding matrix, H is a rank-deficient channel matrix, and $\Lambda$ is a diagonal matrix.

To be specific, a result obtained by multiplying the precoding matrix by the channel matrix needs to be a diagonal matrix. The transmit-end device may obtain channel state information on M antennas through channel quality information (CSI) feedback, to determine the channel matrix, and then perform precoding in the foregoing manner.

For example, when the transmit-end device sends two lower-order modulation signals, the precoding matrix may be expressed in the following form:

$$W=\begin{bmatrix} 1/h_1 & 0 \\ 0 & 1/h_2 \end{bmatrix};$$

or $$W=\begin{bmatrix} \frac{h_1^*}{|h_1|^2} & 0 \\ 0 & \frac{h_2^*}{|h_2|^2} \end{bmatrix};$$

or $$W=\begin{bmatrix} 1/(\sqrt{2})h_1 & 0 \\ 0 & 1/(\sqrt{2})h_2 \end{bmatrix};$$

or $$W=\begin{bmatrix} \frac{h_1^*}{(\sqrt{2})|h_1|^2} & 0 \\ 0 & \frac{h_2^*}{(\sqrt{2}|h_2|^2} \end{bmatrix},$$

where $h_1$ is channel information of a channel through which a first lower-order modulation signal passes, and $h_2$ is channel information of a channel through which a first lower-order modulation signal passes.

The following describes a derivation process of the precoding matrix by using several specific examples.

(1) When there are two antennas at the transmit end and one antenna at the receive end (2×1) and an amplitude ratio of the two lower-order modulation signals is not considered.

A receive-end signal in an ideal case is as follows:

$$y=x_1+x_2=\begin{bmatrix} 1 & 1 \end{bmatrix}\begin{bmatrix} x_1 \\ x_2 \end{bmatrix}.$$

A receive-end signal in a real channel H is as follows:

$$y=Hx=\begin{bmatrix} h_1 & h_2 \end{bmatrix}\begin{bmatrix} x_1 \\ x_2 \end{bmatrix}=h_1x_1+h_2x_2=\begin{bmatrix} h_1 & h_2 \end{bmatrix}\begin{bmatrix} x_1 \\ x_2 \end{bmatrix}.$$

A receive-end signal in a case in which precoding W is considered is as follows:

$$y=\begin{bmatrix} h_1 & h_2 \end{bmatrix}W\begin{bmatrix} x_1 \\ x_2 \end{bmatrix}=\begin{bmatrix} h_1 & h_2 \end{bmatrix}\begin{bmatrix} w_{11} & w_{21} \\ w_{12} & w_{22} \end{bmatrix}\begin{bmatrix} x_1 \\ x_2 \end{bmatrix}=\begin{bmatrix} h_1w_{11}+h_2w_{12} & h_1w_{21}+h_2w_{22} \end{bmatrix}\begin{bmatrix} x_1 \\ x_2 \end{bmatrix}.$$

Therefore, the precoding matrix W needs to meet the following condition:

$$[h_1 \quad h_2]\begin{bmatrix} w_{11} & w_{21} \\ w_{12} & w_{22} \end{bmatrix} = [1 \quad 1],$$

namely, $$\begin{cases} h_1 w_{11} + h_2 w_{12} = 1 \\ h_1 w_{21} + h_2 w_{22} = 1 \end{cases}$$

In an ideal case, $x_1$ is related only to $h_1$, and $x_2$ is related only to $h_2$. Therefore, the precoding matrix W should be a diagonal matrix, to eliminate impact of $h_2$ on $x_1$ and impact of $h_1$ on $x_2$.

When the channel matrix H is known through CSI feedback, a zero-forcing (ZF) algorithm is used, and the matrix code matrix W may be expressed as follows:

$$W = \begin{bmatrix} w_{11} & 0 \\ 0 & w_{22} \end{bmatrix} = \begin{bmatrix} 1/h_1 & 0 \\ 0 & 1/h_2 \end{bmatrix}$$

(2) When there are two antennas at the transmit end and one antenna at the receive end (2×1) and the two lower-order modulation signals need to meet a specific amplitude ratio, where the amplitude ratio may be expressed as follows: $Tx1:Tx2=p_1:p_2$.

A receive-end signal in an ideal case is as follows:

$$y = p_1 x_1 + p_2 x_2 = [p_1 \quad p_2]\begin{bmatrix} x_1 \\ x_2 \end{bmatrix}.$$

A receive-end signal in a real channel H in a case in which precoding W is considered is as follows:

$$Y = HPWx = [h_1 \quad h_2]\begin{bmatrix} p_1 & 0 \\ 0 & p_2 \end{bmatrix}\begin{bmatrix} w_{11} & w_{21} \\ w_{12} & w_{22} \end{bmatrix}\begin{bmatrix} x_1 \\ x_2 \end{bmatrix} = [h_1 p_1 \quad h_2 p_2]\begin{bmatrix} w_{11} & w_{21} \\ w_{12} & w_{22} \end{bmatrix}\begin{bmatrix} x_1 \\ x_2 \end{bmatrix} = [h_1 p_1 w_{11} + h_2 p_2 w_{12} \quad h_1 p_1 w_{21} + h_2 p_2 w_{22}]\begin{bmatrix} x_1 \\ x_2 \end{bmatrix} = (h_1 p_1 w_{11} + h_2 p_2 w_{12})x_1 + (h_1 p_1 w_{21} + h_2 p_2 w_{22})x_2$$

Therefore, the precoding matrix W needs to meet the following condition:

$$\begin{cases} h_1 p_1 w_{11} + h_2 p_2 w_{12} = p_1 \\ h_1 p_1 w_{21} + h_2 p_2 w_{22} = p_2 \end{cases},$$

namely, $$[h_1 \quad h_2]\begin{bmatrix} w_{11} & w_{21} \\ w_{12} & w_{22} \end{bmatrix} = [p_1 \quad p_2]$$

In an ideal case, $x_1$ is related only to $h_1$, and $x_2$ is related only to $h_2$. Therefore, the precoding matrix W should be a diagonal matrix, to eliminate impact of $h_2$ on $x_1$ and impact of $h_1$ on $x_2$.

When the channel matrix H is known through CSI feedback, a minimum mean square error (MMSE) algorithm is used, and the precoding matrix W ma be expressed as follows:

$$W = \begin{bmatrix} w_{11} & 0 \\ 0 & w_{22} \end{bmatrix},$$

where $$w_{11} = (h_1^H h_1 + \delta^2 I)^{-1} h_1^H,$$

and $$w_{22} = (h_2^H h_2 + \delta^2 I)^{-1} h_2^H$$

A final precoding matrix in the case of single-antenna reception may be expressed as follows:

$$W = \begin{bmatrix} (h_1^H h_1 + \delta^2 I)^{-1} h_1^H & 0 \\ 0 & (h_2^H h_2 + \delta^2 I)^{-1} h_2^H \end{bmatrix}$$

The precoding matrix W may be expressed as follows by using the ZF algorithm:

$$W = \begin{bmatrix} \frac{h_1^*}{|h_1|^2} & 0 \\ 0 & \frac{h_1^*}{|h_2|^2} \end{bmatrix}$$

(3) When there are two antennas at the transmit end and two antennas at the receive end (2×2) and a rank (H) is 1:

During precoding in conventional multiple-input multiple-output (MIMO), signals received by the two antennas at the receive end are expected not to interfere with each other. Therefore, the precoding matrix W may perform SVD decomposition on the channel matrix H to extract a diagonal matrix. When the rank (H) is 1, only one column is extracted.

However, in this application, it is expected that the receive end receives a superposed signal obtained through superposition based on a specific amplitude ratio (namely, power ratio). Therefore, precoding cannot be performed through conventional SVD decomposition, and the following method may be used.

Due to rank deficiency of the channel matrix, namely, rank (H)=1, the channel matrix H may be expressed in the following form:

$$H = \begin{bmatrix} h_{11} & h_{21} \\ h_{12} & h_{22} \end{bmatrix} = \begin{bmatrix} h_1 & h_2 \\ \theta h_1 & \theta h_2 \end{bmatrix} = \frac{1}{2} * \begin{bmatrix} 1 & 1 \\ \theta & \theta \end{bmatrix}\begin{bmatrix} h_1 & h_2 \\ h_1 & h_2 \end{bmatrix} = \begin{bmatrix} 1 \\ \theta \end{bmatrix}[h_1 \quad h_2]$$

A receive-end signal in an ideal case is as follows:

$$y_1 = p_1 x_2 + p_2 x_2 = [P_1 \quad P_2]\begin{bmatrix} x_1 \\ x_2 \end{bmatrix};$$

and $$y_2 = \theta(p_1 x_1 + p_2 x_2) = [\theta p_1 \quad \theta p_2]\begin{bmatrix} x_1 \\ x_2 \end{bmatrix}.$$

An expected receive-end signal is as follows:

$$Y_{opt} = \begin{bmatrix} y_1 \\ y_2 \end{bmatrix} = \begin{bmatrix} p_1 & p_2 \\ \theta p_1 & \theta p_2 \end{bmatrix}\begin{bmatrix} x_1 \\ x_2 \end{bmatrix} = \begin{bmatrix} 1 & 1 \\ \theta & \theta \end{bmatrix}\begin{bmatrix} p_1x_1 \\ p_2x_2 \end{bmatrix}.$$

A receive-end signal in a real channel H in a case in which precoding W is considered is as follows:

$$Y = HPWx = \begin{bmatrix} h_1 & h_2 \\ \theta h_1 & \theta h_2 \end{bmatrix}\begin{bmatrix} p_1 & 0 \\ 0 & p_2 \end{bmatrix}\begin{bmatrix} w_{11} & w_{21} \\ w_{12} & w_{22} \end{bmatrix}\begin{bmatrix} x_1 \\ x_2 \end{bmatrix} = \begin{bmatrix} h_1p_1 & h_2p_2 \\ \theta h_1p_1 & \theta h_2p_2 \end{bmatrix}\begin{bmatrix} w_{11} & w_{21} \\ w_{12} & w_{22} \end{bmatrix}\begin{bmatrix} x_1 \\ x_2 \end{bmatrix} = \begin{bmatrix} (h_1p_1w_{11} + h_2p_2w_{12})x_1 + (h_1p_1w_{21} + h_2p_2w_{22})x_2 \\ \theta(h_1p_1w_{11} + \theta h_2p_2w_{12})x_1 + \theta(h_1p_1w_{21} + h_2p_2w_{22})x_2 \end{bmatrix}$$

To express a receive-end signal in the form of $p_1x_1+p_2x_2$, in an ideal case, $x_1$ is related only to $h_1$, and $x_2$ is related only to $h_2$. Therefore, the precoding matrix W should be a diagonal matrix, to eliminate impact of $h_2$ on $x_1$ and impact of $h_1$ on $x_2$.

When the channel matrix H is known through CSI feedback, the MMSE or the ZF may be used for pre-equalization, and the precoding matrix needs to meet the following condition:

$$\begin{cases} (h_1p_1w_{11} + h_2p_2w_{12}) = p_1 \\ (h_1p_1w_{21} + h_2p_2w_{22}) = p_2 \end{cases}$$

If the precoding matrix W is a diagonal matrix:

$$W = \begin{bmatrix} \frac{h_1^*}{|h_1|^2} & 0 \\ 0 & \frac{h_2^*}{|h_2|^2} \end{bmatrix}$$

The precoding matrix W may be substituted into an original form as a diagonal matrix to obtain the following form:

$$Y = HPWx = \begin{bmatrix} h_1 & h_2 \\ \theta h_1 & \theta h_2 \end{bmatrix}\begin{bmatrix} p_1 & 0 \\ 0 & p_2 \end{bmatrix}\begin{bmatrix} w_1 & 0 \\ 0 & w_2 \end{bmatrix}\begin{bmatrix} x_1 \\ x_2 \end{bmatrix} = \begin{bmatrix} h_1 & h_2 \\ \theta h_1 & \theta h_2 \end{bmatrix}\begin{bmatrix} w_1 & 0 \\ 0 & w_2 \end{bmatrix}\begin{bmatrix} p_1x_1 \\ p_2x_2 \end{bmatrix}$$

$$Y = \begin{bmatrix} 1 & 1 \\ \theta & \theta \end{bmatrix}\begin{bmatrix} p_1x_1 \\ p_2x_2 \end{bmatrix}$$

$$\text{so } \begin{bmatrix} h_1 & h_2 \\ \theta h_1 & \theta h_2 \end{bmatrix}\begin{bmatrix} w_1 & 0 \\ 0 & w_2 \end{bmatrix} = \begin{bmatrix} h_1w_1 & h_2w_2 \\ \theta h_1w_1 & \theta h_2w_2 \end{bmatrix} = \begin{bmatrix} 1 & 1 \\ \theta & \theta \end{bmatrix}; \text{ and}$$

$$\text{so } W = \begin{bmatrix} \frac{h_1^*}{|h_1|^2} & 0 \\ 0 & \frac{h_2^*}{|h_2|^2} \end{bmatrix}$$

Optionally, in this application, after precoding the M lower-order modulation signals, the transmit-end device may input the M lower-order modulation signals to a PA module for power amplification, to generate M radio frequency signals, and then send the M radio frequency signals. To enable the M lower-order modulation signals to be superimposed to obtain a higher-order modulation signal, the M lower-order modulation signals at the transmit end may need to meet a specific amplitude ratio based on different modulation schemes, for example, in the foregoing technical solutions in which a joint coding and modulation scheme is used. Correspondingly, the M radio frequency signals transmitted on an air interface also need to meet a specific power ratio, where the power ratio is a square of the amplitude ratio. For example, when the transmit end sends two lower-order modulation signals, if an amplitude ratio that the two lower-order modulation signals at the transmit end need to meet is $Tx1:Tx2=p_1:p_2=2:1$, a power ratio that two radio frequency signals transmitted on an air interface need to meet is $P1:P2=p_1^2:p_2^2=4:1$. Therefore, based on different designs of splitting a plurality of low-order signals at the transmit end, in this application, a specific ratio requirement needs to be imposed on an amplification ratio of the power amplifier, and a corresponding constraint needs to be imposed on a radio frequency power amplifier design for two signals at the transmit end.

In view of this, the transmit-end device may determine a power ratio of the M lower-order modulation signals based on an amplitude ratio of the M lower-order modulation signals, and then control, based on the power ratio, the M lower-order modulation signals to undergo power amplification in the power amplifier. To be specific, a power constraint is performed on the M lower-order modulation signals based on the power ratio when the M lower-order modulation signals pass through the power amplifier, to obtain the M radio frequency signals.

Optionally, in technical solutions of this application in which the superposed-signal splitting scheme is used, a plurality of lower-order modulation signals at the transmit end may have an I/Q imbalance problem. In view of this problem, a time domain polling-based sending scheme is designed in this application. To-be-sent signals on a plurality of antennas are alternately changed periodically to reduce possible impact (for example, an increase in a bit error rate) caused by the I/Q imbalance of the plurality of lower-order modulation signals at the transmit end to system performance.

During specific implementation, the transmit-end device may alternately change, based on a specified periodicity T, an antenna for sending the M lower-order modulation signals, or alternately change modulation constellation patterns (also referred to as mapping patterns) for to-be-sent signals on M antennas, where the modulation constellation pattern corresponds to a modulation mapping relationship of the signal.

For example, two lower-order special 4QAM signals are superposed to generate a 16QAM signal. In this case, the transmit end has two antennas {Tx1, Tx2} and two modulation constellation patterns {Pattern 1, Pattern 2} for the 4QAM signals. The two modulation constellation patterns {Pattern 1, Pattern 2} are {1+2j, 1−2j, −1+2j, −1−2j} and {2+1j, 2−1j, −2+1j, −2−1j} respectively.

Figure 20:
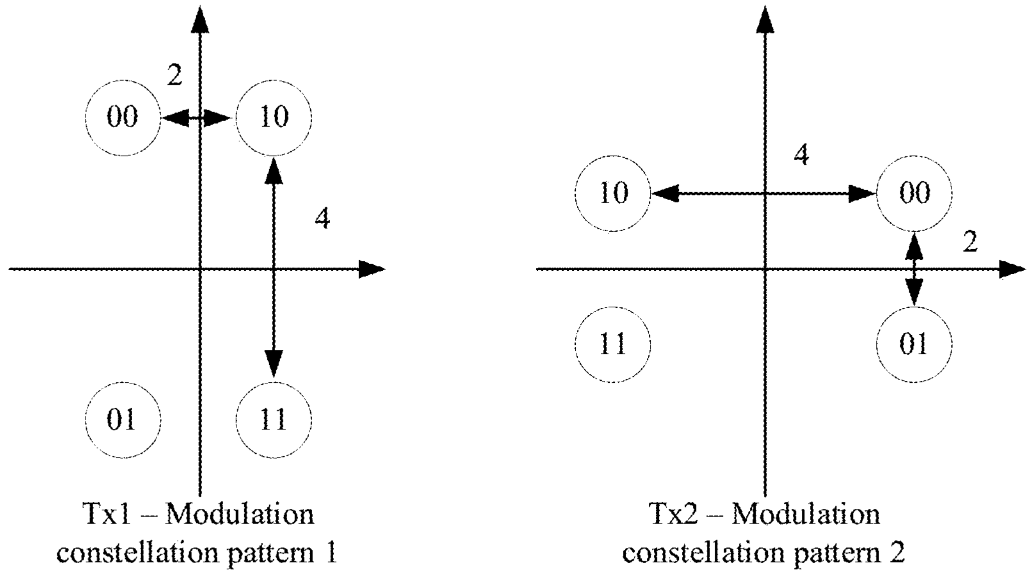
FIG. 20 is a diagram of performing time domain polling-based sending when two lower-order 4QAM signals are superposed to generate a 16QAM signal according to an embodiment of this application.
Figure 20:
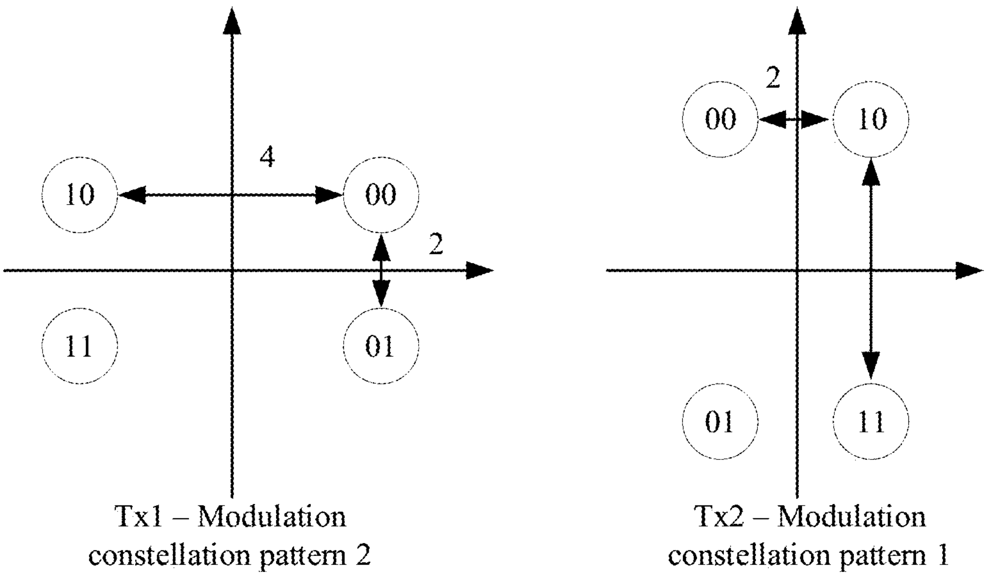

As shown in FIG. 20, the following two sending schemes are available for time domain polling-based sending in this case.

Sending scheme 1: A pattern 1 is used for Tx1, and a pattern 2 is used for Tx2.

Sending scheme 2: A pattern 2 is used for Tx1, and a pattern 1 is used for Tx2.

Therefore, the time domain polling-based sending specifically means changing a sending scheme on the two antennas based on the specified periodicity T. To be specific, the two antennas use the sending scheme 1 within a time period [0, T], use the sending scheme 2 within a time period

[T, 2T], use the sending scheme 1 within a time period [2T, 3T], use the sending scheme 2 within a time period [3T, 4T], and so on.

For another example, three lower-order signals are superposed to generate a 64QAM signal. In this case, the transmit end has three antennas {Tx1, Tx2, Tx3} and three modulation constellation patterns {Pattern 1, Pattern 2, Pattern 3}.

The following two sending schemes are available for time domain polling-based sending in this case.

Sending scheme 1: A pattern 1 is used for Tx1, a pattern 2 is used for Tx2, and a pattern 3 is used for Tx3.

Sending scheme 2: A pattern 3 is used for Tx1, a pattern 1 is used for Tx2, and a pattern 2 is used for Tx3.

Sending scheme 3: A pattern 2 is used for Tx1, a pattern 3 is used for Tx2, and a pattern 1 is used for Tx3.

Therefore, the time domain polling-based sending specifically means alternately changing a sending scheme on the three antennas per periodicity. To be specific, the three antennas use the sending scheme 1 within a time period [0, T], use the sending scheme 2 within a time period [T, 2T], use the sending scheme 3 within a time period [2T, 3T], use the sending scheme 1 within a time period [3T, 4T], and so on.

Step 403: The receive-end device receives a higher-order modulation signal from the transmit-end device, where the higher-order modulation signal is obtained by superposing the M lower-order modulation signals sent by the transmit-end device.

Step 404: The receive-end device performs channel estimation by using a demodulation reference signal (DMRS) port, and performs post-equalization on the higher-order modulation signal based on a channel matrix obtained through estimation. For a post-equalization method, refer to the conventional technology.

Based on the technical solutions described above, this application further correspondingly provides a signaling indication solution, to ensure normal sending and receiving of a signal, and obtain a performance gain in a high-frequency scenario in which a rank is 1.

In the signaling indication solution for a superposed signal, a transmit end may generate M lower-order modulation signals according to a known mapping rule, send the M lower-order modulation signals, and notify a receive end of some related indication information, for example, parameters such as a modulation and coding scheme (MCS) for each lower-order modulation signal and an MCS for a higher-order modulation signal obtained through superposition. Correspondingly, the receive end may receive a higher-order modulation signal obtained by superposing a plurality of lower-order modulation signals, and demodulate and decode the higher-order modulation signal based on the parameters indicated by the indication information, to restore raw data.

The signaling indication solution may have the following several possible implementations.

(1) When there is a power ratio constraint between a plurality of lower-order modulation signals at a transmit end, the transmit end needs to indicate one or more of an MCS, a sign bit indication, a power ratio, and an amplitude ratio to a receive end.

The MCS is a required parameter, and the parameter may indicate MCSs for M lower-order modulation signals at the transmit end, or may indicate an MCS for a higher-order modulation signal obtained through superposition at the receive end, or may indicate both the MCSs for the M lower-order modulation signals and the MCS for the higher-order modulation signal. It should be noted that, if the parameter indicates only MCSs for a plurality of lower-order modulation signals at the transmit end, the receive end further needs to know, in advance, an order of a corresponding higher-order constellation obtained through superposition. For example, this may be implemented by prestoring a corresponding mapping rule.

The sign bit indication is an optional parameter, and the parameter indicates a specific one of the M lower-order modulation signals at the transmit end that serves as a sign bit. It should be noted that, if the parameter is not indicated, a same mapping rule needs to be prestored at both the transmit end and the receive end. In this way, the transmit end may directly modulate a plurality of lower-order modulation signals according to the preset mapping rule. Correspondingly, the receive end may also decode a sign bit of a received higher-order modulation signal according to the same mapping rule.

The power ratio is an optional parameter. To be specific, the transmit end may indicate a power ratio between a plurality of sent lower-order modulation signals, or may not indicate the power ratio. This is not specifically limited in this application. When the power ratio is not indicated, the power matching may be preconfigured as a known rule between the transmit end and the receive end.

The amplitude ratio is an optional parameter. Similarly, the amplitude ratio may be indicated or preconfigured.

In addition, the mapping rule needs to be known to both the transmit end and the receive end, and may be preconfigured as prestored information.

It can be learned from the foregoing content that, when a plurality of lower-order modulation signals at the transmit end need to meet a specific power ratio constraint, in the signaling indication solution, a required parameter such as an MCS for a higher-order modulation signal at the receive end or MCSs for the plurality of lower-order modulation signals at the transmit end needs to be indicated, and an optional parameter such as a power ratio may also be indicated.

Figure 21:
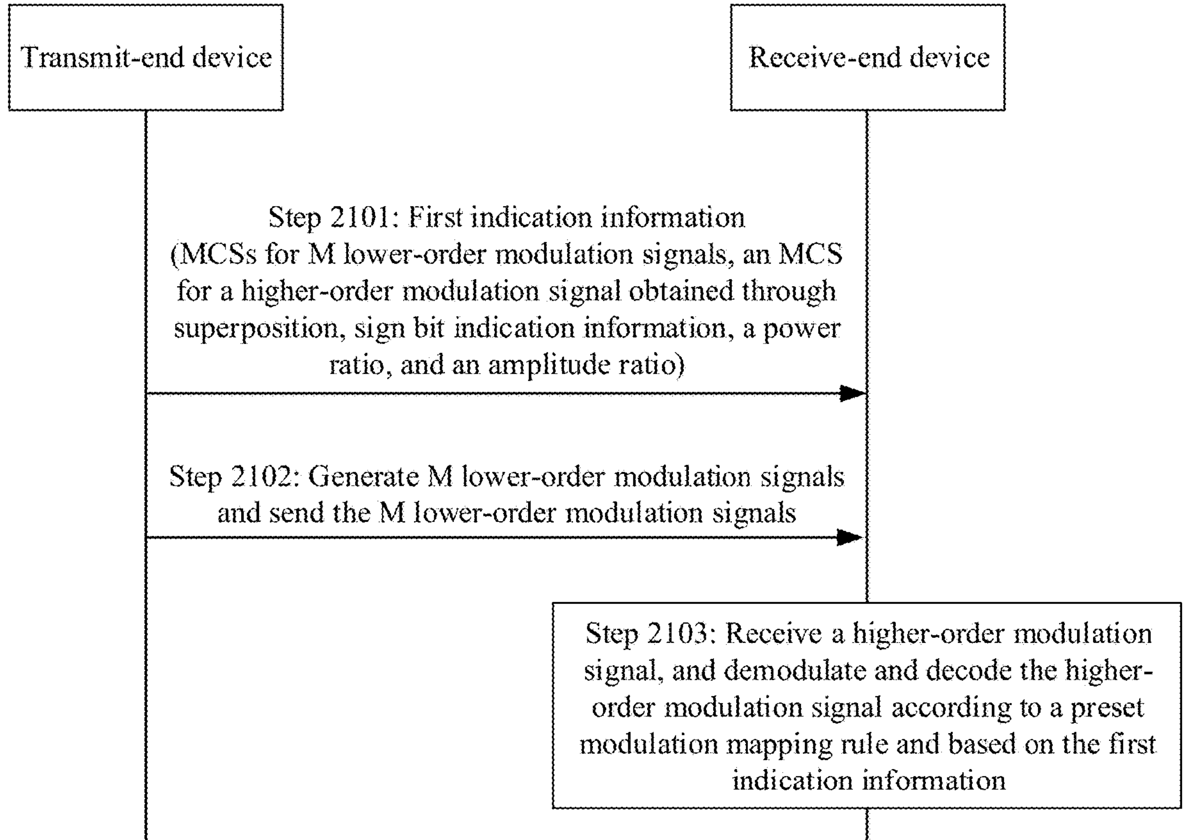
FIG. 21 and FIG. 22 are diagrams of two signaling indication solutions according to an embodiment of this application.

For example, the signaling indication solution in this case may be shown in FIG. 21, and includes the following steps.

Step 2101: A transmit end sends first indication information to a receive end, and correspondingly, the receive end may receive the first indication information from the transmit end.

The first indication information includes one or more of the following information: MCSs for M lower-order modulation signals sent by the transmit end, an MCS for a higher-order modulation signal obtained by superposing the M lower-order modulation signals at the receive end, sign bit indication information, an amplitude ratio of the M lower-order modulation signals, and a power ratio of the M lower-order modulation signals, where the sign bit indication information indicates a lower-order modulation signal serving as a sign bit among the M lower-order modulation signals.

Optionally, the first indication information may be carried in downlink control information (DCI) or uplink control information (UCI) for sending.

Step 2102: The transmit end sends M lower-order modulation signals to the receive end according to a preset mapping rule.

Step 2103: The receive end receives a higher-order modulation signal, and demodulates and decodes the higher-order modulation signal according to the preset mapping rule and based on the first indication information.

(2) When powers of a plurality of lower-order modulation signals at a transmit end match, the transmit end needs to indicate only an MCS parameter to a receive end.

Specifically, the MCS may indicate MCSs for M lower-order modulation signals at the transmit end, or may indicate an MCS for a higher-order modulation signal obtained through superposition at the receive end, or may indicate both the MCSs for the M lower-order modulation signals and the MCS for the higher-order modulation signal.

In addition, in this case, both the receive end and the transmit end need to know a mapping rule for a higher-order modulation signal obtained through superposition at the receive end, and a symbol correspondence and a superposition rule between a plurality of lower-order modulation signals at the transmit end and a higher-order modulation signal at the receive end, namely, a symbol splitting scheme for a complex symbol in a higher-order signal at the receive end.

Figure 22:
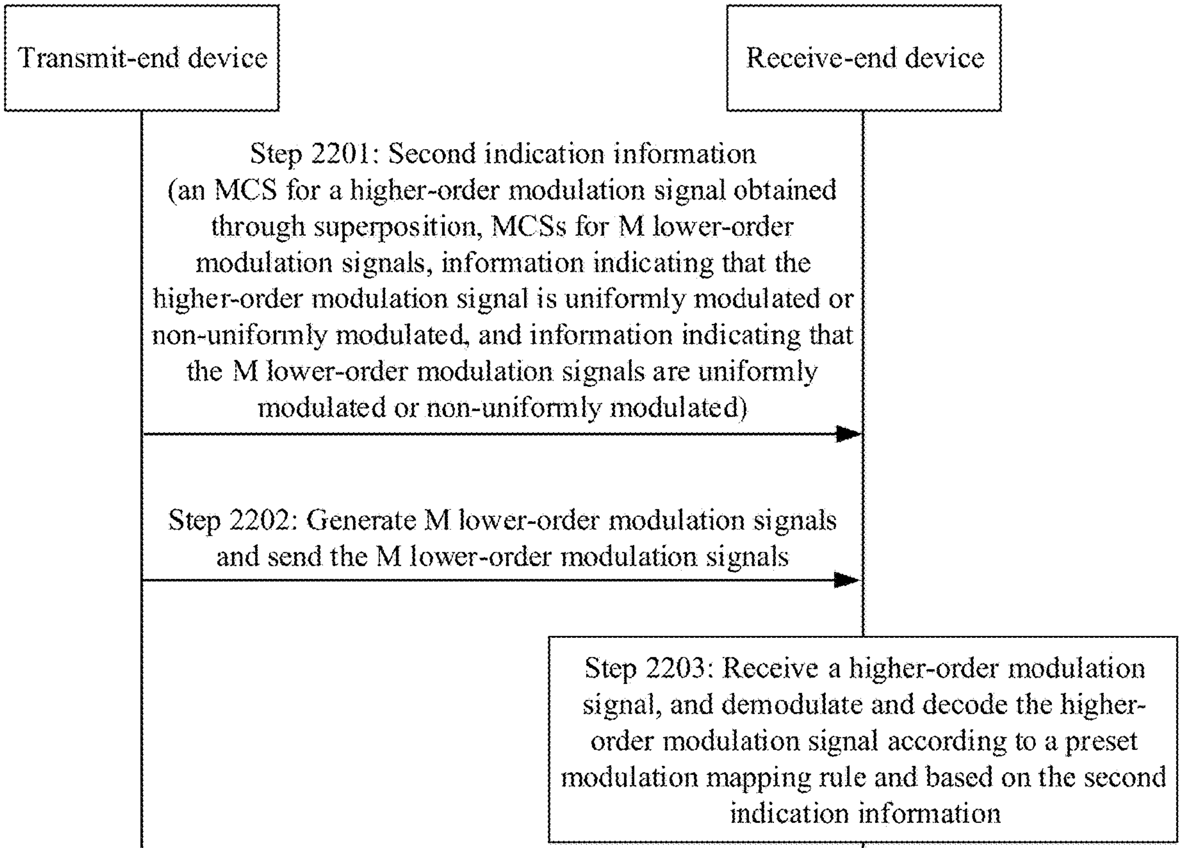

For example, the signaling indication solution in this case may be shown in FIG. 22, and includes the following steps.

Step 2201: A transmit end sends second indication information to a receive end, and correspondingly, the receive end may receive the second indication information from the transmit end.

The second indication information includes one or more of the following information: MCSs for M lower-order modulation signals sent by the transmit end, an MCS for a higher-order modulation signal obtained by superposing the M lower-order modulation signals at the receive end, information indicating that the higher-order modulation signal is non-uniformly modulated or uniformly modulated, and information indicating that the M lower-order modulation signals are non-uniformly modulated or uniformly modulated.

Optionally, the second indication information may be sent by using DCI signaling or UCI signaling.

Step 2202: The transmit end sends M lower-order modulation signals to the receive end according to a preset mapping rule.

Step 2203: The receive end receives a higher-order modulation signal, and demodulates and decodes the higher-order modulation signal according to the preset mapping rule and based on the second indication information.

(3) When a higher-order signal obtained through superposition at a receive end is uniformly modulated, a transmit end needs to indicate, to the receive end, at least an MCS parameter of a higher-order modulation signal obtained through superposition at the receive end. Optionally, that uniform modulation is used may alternatively be indicated.

(4) When a higher-order signal obtained through superposition at a receive end is non-uniformly modulated, a transmit end needs to indicate, to the receive end, an MCS parameter of a higher-order modulation signal obtained through superposition at the receive end, and indicate that non-uniform modulation is used.

It should be noted that, in actual application, the foregoing several possible implementations of the signaling indication solution may be combined with each other. For example, the manner (1) may be combined with the manner (3), and the manner (2) may be combined with the manner (3) or the manner (4). For example, when there is a power ratio constraint between a plurality of lower-order modulation signals at a transmit end, in addition to indicating parameters such as an MCS, a sign bit indication, a power ratio, and an amplitude ratio, optionally, the transmit end may further indicate that uniform modulation is used. For another example, when powers of a plurality of lower-order modulation signals at a transmit end match and a higher-order modulation signal obtained through superposition at a receive end is non-uniformly modulated, second indication information sent by the transmit end needs to indicate an MCS for a higher-order signal and indicate that non-uniform modulation is used.

A technical solution of this application in which two lower-order 4QAM signals are superposed to generate a 16QAM signal is used below as an example to describe a difference between the solution of this application and a conventional multiple-input single-output (MISO) solution.

TABLE 13

| Content for comparison | Conventional MISO solution | Solution of this application |
|---|---|---|
| Modulation scheme | Modulation into higher-order 16QAM | Modulation into two different 4QAM signals |
| Precoding | The signal is precoded and then mapped to two antennas in space domain for sending. | Impact of a channel is eliminated through coding. |
| Space-domain signals on two antennas at a transmit end | The space-domain signals on the two antennas are the same. | The space-domain signals on the two antennas are different. |
| DMRS | One port (Two ports need to be used when the space-domain signals on the two antennas are different.) | One port |
| Higher-order signal at a receive end | Uniform modulation | Uniform/Non-uniform modulation |

As shown in Table 13, in the conventional MISO solution, a transmit end directly obtains a higher-order QAM signal through modulation, and the higher-order QAM signal is mapped, through precoding, to two antennas in space domain for sending. However, in the solution of this application, a transmit end obtains two different lower-order signals through modulation, and impact of a channel H is eliminated through precoding, so that space-domain signals finally sent on two or more antennas are different. In addition, a superposed signal at a receive end may be a uniformly modulated higher-order signal or a non-uniformly modulated higher-order signal.

The following analyzes technical effect of a signal superposition solution provided in this application from aspects of a channel capacity, a diversity gain, a power gain, and the like. In the following analysis, an example in which a transmit end sends two signals is used for description.

1. Channel Capacity Analysis (1) Single-Antenna Reception:

A MISO model structure may be expressed as follows:

$y=HPWx+z$, where $y\in\mathbb{C}$, $H\in\mathbb{C}^{1\times 2}$, $$P=\begin{bmatrix} P_1 & 0 \\ 0 & P_2 \end{bmatrix}\in\mathbb{C}^{2\times 2},$$

$W\in\mathbb{C}^{2\times 2}$, $x\in\mathbb{C}^{2\times 1}$, and $z\in\mathbb{C}^{1}$ are a received signal, a channel matrix, a PA power amplifier matrix, a precoding matrix, a signal source matrix, and a noise signal respectively.

A channel capacity in this case may be expressed as follows:

$$C_{MISO} = \log_2\left(1 + \frac{E_x}{N_T N_0}[\,h_1 \quad h_2\,]R_{xx}\begin{bmatrix} h_1^* \\ h_2^* \end{bmatrix}\right)(bps/\text{Hz}),\ Tr(R_{xx}) = N_T = 2,$$

where a signal cross-correlation matrix is as follows:

$$R_{xx} = E\left\{\begin{bmatrix} x_1 \\ x_2 \end{bmatrix}[\,x_1^* \quad x_2^*\,]\right\}$$

A rank of $H=[h_1\ h_2]$ is 1. However, two independent streams need to be transmitted in this application. Therefore, a conventional method for implementing precoding through SVD decomposition cannot be used in this application. Because two signals are independent of each other, interference cancellation may be directly performed on the two signals by using a diagonal matrix in W. This may be implemented by using ZF or an MMSE. In this case, the precoding matrix is as follows:

$$W = \sqrt{\alpha}\begin{bmatrix} \frac{h_1^*}{|h_1|^2} & 0 \\ 0 & \frac{h_2^*}{|h_2|^2} \end{bmatrix} \text{ or } \sqrt{\alpha}\begin{bmatrix} (h_1^* h_1 + \sigma)^{-1} h_1^* & 0 \\ 0 & (h_2^* h_2 + \sigma)^{-1} h_2^* \end{bmatrix}$$

Signals $$\begin{bmatrix} x_1 \\ x_2 \end{bmatrix}$$

of two antennas are independent of each other and are symmetrical relative to an x axis and a y axis. Therefore, the cross-correlation matrix $R_{xx}$ is a diagonal matrix, and diagonal elements of the diagonal matrix are powers of the two signals.

In this case, because both W and P are diagonal matrices, a location of W and a location of P are interchangeable. This is because an expected received signal is as follows regardless of different power ratios:

$$y_{opt} = P_1 x_1 + P_2 x_2$$

ZF precoding is used as an example. In this case $$R_{xx} = \alpha\begin{bmatrix} \frac{1}{|h_1|^2} & 0 \\ 0 & \frac{1}{|h_2|^2} \end{bmatrix}, \text{ where } \alpha\left(\frac{1}{|h_1|^2} + \frac{1}{|h_2|^2}\right) = N_T.$$

Finally, an expression of a MISO channel capacity for a superposed signal may be obtained as follows:

$$C_{MISO} = \log_2\left(1 + \frac{E_x}{N_T N_0}[\,h_1 \quad h_2\,]\alpha\begin{bmatrix} \frac{1}{|h_1|^2} & 0 \\ 0 & \frac{1}{|h_2|^2} \end{bmatrix}\begin{bmatrix} h_1^* \\ h_2^* \end{bmatrix}\right)$$

-continued $$= \log_2\left(1 + \frac{E_x}{N_T N_0} \times \alpha \times (1 + 1)\right)$$

$$= \log_2\left(1 + \frac{E_x N_T}{N_0} \times \left(\frac{|h_1|^2 \times |h_2|^2}{|h_1|^2 + |h_2|^2}\right)\right)$$

Similarly, a channel capacity for MMSE precoding may be obtained:

$$C_{MISO} = \log_2\left(1 + \frac{E_x N_T}{N_0} \times \frac{|h_1|^4(|h_2|^2 + \sigma)^2 + |h_2|^4(|h_1|^2 + \sigma)^2}{|h_1|^2(|h_2|^2 + \sigma)^2 + |h_2|^2(|h_1|^2 + \sigma)^2}\right)$$

(2) Multi-Antenna Reception (2×2):

A channel rank in 2×2 MIMO is 1. In this case, a channel matrix may be expressed as follows:

$$H = \begin{bmatrix} h_1 & h_2 \\ \theta h_1 & \theta h_2 \end{bmatrix}$$

In this case, two received signals are correlated, and a processing procedure may be expressed as follows:

$$\begin{bmatrix} y_1 \\ y_2 \end{bmatrix} = \begin{bmatrix} h_1 & h_2 \\ \theta h_1 & \theta h_2 \end{bmatrix}\begin{bmatrix} p_1 & 0 \\ 0 & p_2 \end{bmatrix}\sqrt{\alpha}\begin{bmatrix} \frac{h_1^*}{|h_1|^2} & 0 \\ 0 & \frac{h_2^*}{|h_2|^2} \end{bmatrix}\begin{bmatrix} x_1 \\ x_2 \end{bmatrix} + \begin{bmatrix} z_1 \\ z_2 \end{bmatrix}$$

$$= \sqrt{\alpha}\begin{bmatrix} p_1 x_1 + p_2 x_2 \\ \theta p_1 x_1 + \theta p_2 x_2 \end{bmatrix}$$

Similarly, $$R_{xx} = \alpha W W^H = \alpha\begin{bmatrix} \frac{1}{|h_1|^2} & 0 \\ 0 & \frac{1}{|h_2|^2} \end{bmatrix}, \text{ and } \alpha\left(\frac{1}{|h_1|^2} + \frac{1}{|h_2|^2}\right) = N_T.$$

MIMO may be equivalent to superposition of two MISO signals. Therefore, a received signal may be expressed as follows:

$$y = (1 + \theta)[\,h_1 \quad h_2\,]\sqrt{\alpha}\begin{bmatrix} \frac{h_1^*}{|h_1|^2} & 0 \\ 0 & \frac{h_2^*}{|h_2|^2} \end{bmatrix}\begin{bmatrix} p_1 & 0 \\ 0 & p_2 \end{bmatrix}\begin{bmatrix} x_1 \\ x_2 \end{bmatrix} + z$$

In this case, a channel capacity may be obtained:

$$C_{MIMO} = \log_2\left(1 + \frac{E_x}{N_T N_0}(1 + \theta)(1 + \theta^*)[\,h_1 \quad h_2\,]\alpha\begin{bmatrix} \frac{1}{|h_1|^2} & 0 \\ 0 & \frac{1}{|h_2|^2} \end{bmatrix}\begin{bmatrix} h_1^* \\ h_2^* \end{bmatrix}\right)$$

$$= \log_2\left(1 + \frac{E_x}{N_T N_0}(1 + \theta)(1 + \theta^*)\alpha \times (1 + 1)\right)$$

$$= \log_2\left(1 + \frac{E_x N_T}{N_0}(1 + \theta)(1 + \theta^*) \times \left(\frac{|h_1|^2 \times |h_2|^2}{|h_1|^2 + |h_2|^2}\right)\right)$$

(3) Performance Comparison Among Multiple-Input Single-Output (MISO), Single-In Single-Out (SISO), and MIMO:

$$C_{MIMO} = \log_2\left(1 + \frac{E_x N_T}{N_0}(1+\theta)(1+\theta^*) \times \left(\frac{|h_1|^2 \times |h_2|^2}{|h_1|^2 + |h_2|^2}\right)\right)$$

$$C_{MISO} = \log_2\left(1 + \frac{E_x N_T}{N_0} \times \left(\frac{|h_1|^2 \times |h_2|^2}{|h_1|^2 + |h_2|^2}\right)\right)$$

$$C_{SISO} = \log_2\left(1 + \frac{E_x}{N_0}\right)$$

Therefore, values of $$1,\ 2 * \left(\frac{|h_1|^2 \times |h_2|^2}{|h_1|^2 + |h_2|^2}\right), \text{ and } (1+\theta)(1+\theta^*) * 2 * \left(\frac{|h_1|^2 \times |h_2|^2}{|h_1|^2 + |h_2|^2}\right)$$

may be compared with each other.

In an extreme case, if $$h_1 = h_2 \text{ and } \theta = 1,\ 2 * \left(\frac{|h_1|^2 \times |h_2|^2}{|h_1|^2 + |h_2|^2}\right) = 1, \text{ and}$$

$$(1+\theta)(1+\theta^*) * 2 * \left(\frac{|h_1|^2 \times |h_2|^2}{|h_1|^2 + |h_2|^2}\right) = 4.$$

Therefore, in this case, $C_{MIMO} > C_{MISO} = C_{SISO} =$

2. Diversity Gain and Power Gain Analysis

A receive-end signal in this application is as follows:

$$y = HWx + n = [h_1 \quad h_2]\begin{bmatrix} \frac{h_1^*}{(\sqrt{2}) * |h_1|} & 0 \\ 0 & \frac{h_2^*}{(\sqrt{2}) * |h_2|} \end{bmatrix}\begin{bmatrix} x_1 \\ x_2 \end{bmatrix} + n = \frac{\sqrt{2}}{2}x_1 + \frac{\sqrt{2}}{2}x_2 = \frac{\sqrt{2}}{2}(x_1 + x_2)$$

An output SNR is as follows:

$$SNR = \frac{1}{2}\|x_1 + x_2\|^2 = \frac{1}{2}(x_1 x_1^* + x_2 x_2^* + x_1 x_2^* + x_2 x_1^*) = \frac{1}{2}\left(|x_1|^2 + |x_2|^2 + x_1 x_2^* + x_2 x_1^*\right)$$

Two x signals are independent of each other. Assuming that $E(|x_1|^2) = E(|x_2|^2) = E(|x_0|^2)$, the following may be obtained through expected solving:

$$E(SNR) = E\left(\frac{1}{2}\left(|x_1|^2 + |x_2|^2 + x_1 x_2^* + x_2 x_1^*\right)\right) = \frac{1}{2} * 2E\left(|x_0|^2\right) = E(SNR_0)$$

$$E(x_1 x_2^* + x_2 x_1^*) = E(x_1 x_2^*) + E(x_2 x_1^*) = E(x_1)E(x_2^*) + E(x_2)E(x_1^*) = 0$$

Therefore, in the solution of this application, there is no diversity gain brought by beamforming, and effect is the same as that of SISO.

A variance is calculated as follows:

$$Z = \frac{SNR}{E(SNR)} = \frac{\frac{1}{2}\left(|x_1|^2 + |x_2|^2 + x_1 x_2^* + x_2 x_1^*\right)}{E(SNR_0)}$$

$$Z_0 = \frac{SNR_0}{E(SNR_0)},\ D(Z_0) = D\left(\frac{SNR_0}{E(SNR_0)}\right)$$

$$D(Z) = D\left(\frac{\frac{1}{2}\left(|x_1|^2 + |x_2|^2 + x_1 x_2^* + x_2 x_1^*\right)}{E(SNR_0)}\right)$$

If $$D(x_1 x_2^* + x_2 x_1^*) = 0 \text{ and } D(Z) = \left(\frac{\left(\frac{1}{2}\right)^2 + \left(\frac{1}{2}\right)^2}{1}\right) D(Z_0) = \frac{1}{2}D(Z_0),$$

performance is the same as that of conventional MISO. Therefore, a key lies in the following parameter:

$$D(x_1 x_2^* + x_2 x_1^*) = E\left((x_1 x_2^* + x_2 x_1^*)^2\right) - (E(x_1 x_2^* + x_2 x_1^*))^2 = E\left((x_1 x_2^* + x_2 x_1^*)^2\right) \neq 0$$

For example, 16QAM is split into two pieces of special 4QAM. A value of the parameter is as follows:

$$E\left((x_1 x_2^* + x_2 x_1^*)^2\right) = 1.28, \text{ and}$$

$$D(Z) = \left(\frac{\left(\frac{1}{2}\right)^2 + \left(\frac{1}{2}\right)^2 + \frac{1.28}{4}}{1^2}\right) D(Z_0) = \frac{3.28}{4}D(Z_0).$$

Therefore, a diversity gain in the solution in this application is higher than that of SISO.

A summary is as follows:

TABLE 14

| Solution | PAPR | Power gain | Diversity gain |
|---|---|---|---|
| 1T1R SISO | High | No (Amplitude: 1) | 1x |
| 2T1R MISO | High (16QAM: 1.8) | Yes (Amplitude: $\sqrt{2}$) | No (H with a rank of 1 and high correlation) |
| 2T1R with signal superposition | Low (4QAM: 1) | No (Amplitude: 1) | Yes (1.2x compared with SISO) |

Figure 23:
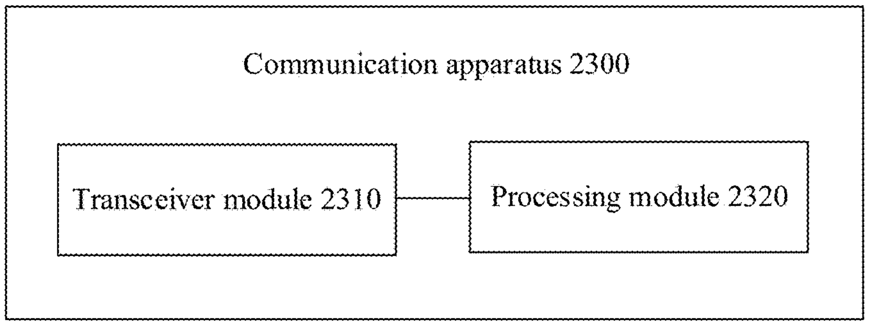
FIG. 23 and FIG. 24 are diagrams of structures of a communication apparatus according to an embodiment of this application.

Embodiments of this application further provide a communication apparatus. FIG. 23 is a diagram of a structure of a communication apparatus according to an embodiment of this application. The communication apparatus 2300 includes a transceiver module 2310 and a processing module 2320. The communication apparatus may be configured to implement a function of the transmit-end device or the receive-end device in any one of the foregoing method embodiments. The communication apparatus may be a network device or a terminal device, or may be an apparatus (for example, a chip included in a network device or a terminal device) capable of supporting the network device or the terminal device in implementing a corresponding function in the foregoing method embodiments.

For example, when the communication apparatus performs the operations or steps corresponding to the transmit-end device in the method embodiment shown in FIG. 4, the processing module 2320 is configured to modulate S bitstreams according to a mapping rule corresponding to a first modulation scheme for a higher-order modulation signal to be received by a receive-end device, to generate M lower-order modulation signals, where M is an integer greater than or equal to 2, and S is equal to 1 or M; and the transceiver module 2310 is configured to send the M lower-order modulation signals through a line of sight LOS channel, where the mapping rule is used to superpose the M lower-order modulation signals to obtain the higher-order modulation signal to be received by the receive-end device.

In a possible design, the S bitstreams are one independent bitstream, and S=1 in this case; or the S bitstreams are M sub-bitstreams obtained by performing bit decomposition on one independent bitstream, and S=M in this case; or the S bitstreams are M independent bitstreams, and S=M in this case.

In a possible design, before the sending module 2310 sends the M lower-order modulation signals, the processing module 2320 is further configured to precode a transmit signal matrix including the M lower-order modulation signals, where the precoding matrix meets the following relationship: $H*W=\Lambda$, where W is the precoding matrix, H is a rank-deficient channel matrix, and $\Lambda$ is a diagonal matrix.

In a possible design, the S bitstreams are M bitstreams, and the mapping rule indicates a bit-to-complex symbol modulation mapping relationship corresponding to each of the M bitstreams at the transmit end. M complex symbols obtained by mapping bits in the M bitstreams based on modulation mapping relationships respectively corresponding to the bits are superposed based on a preset amplitude ratio to obtain complex symbols in the higher-order modulation signal to be received by the receive-end device.

In a possible design, the first modulation scheme is N-order modulation, and N is an integer greater than or equal to 4. When M is 2, S is equal to 2, and the mapping rule includes: $2^2$ values of two bits in a first bitstream of the two bitstreams are respectively mapped to $2^2$ first complex symbols. $2^{N-2}$ values of N−2 bits in a second bitstream of the two bitstreams are respectively mapped to $2^{N-2}$ second complex symbols based on different values of the two bits in the first bitstream, and when values of the two bits in the first bitstream vary, same values of the N−2 bits in the second bitstream are mapped to different second complex symbols among the $2^{N-2}$ second complex symbols. First complex symbols to which the two bits in the first bitstream are mapped and second complex symbols to which the N−2 bits in the second bitstream are mapped are superposed based on a preset amplitude ratio to obtain third complex symbols in the higher-order modulation signal to be received by the receive-end device.

In a possible design, the processing module 2320 is specifically configured to: sequentially map, according to the mapping rule, every two bits in the first bitstream to a first complex symbol among the $2^2$ first complex symbols, to form a first lower-order modulation signal; and sequentially map every N−2 bits in the second bitstream to a second complex symbol among the $2^{N-2}$ second complex symbols, to form a second lower-order modulation signal.

In a possible design, the processing module 2320 is further configured to: determine a power ratio of the M lower-order modulation signals based on an amplitude ratio of the M lower-order modulation signals; and control, based on the power ratio of the M lower-order modulation signals, the M lower-order modulation signals to undergo power amplification in a power amplifier.

In a possible design, the transceiver module 2310 is further configured to send first indication information to the receive-end device, where the first indication information includes one or more of the following information: a modulation and coding scheme MCS for the higher-order modulation signal, an MCS for the M lower-order modulation signals, sign bit indication information, an amplitude ratio of the M lower-order modulation signals, and a power ratio of the M lower-order modulation signals, where the sign bit indication information indicates a lower-order modulation signal serving as a sign bit among the M lower-order modulation signals.

In a possible design, the mapping rule indicates a correspondence between bits in an original bitstream including the S bitstreams and a complex symbol in the higher-order modulation signal, and a correspondence between a complex symbol in the higher-order modulation signal and complex symbols in the M lower-order modulation signals. The original bitstream includes bits respectively corresponding to the M lower-order modulation signals, and S is equal to 1 or M. Complex symbols in the M lower-order modulation signals are obtained by splitting a complex symbol in the higher-order modulation signal based on an equi-amplitude ratio.

In a possible design, the first modulation scheme is N-order modulation, and N is an integer greater than or equal to 4. When M is 2, the mapping rule includes: $2^N$ values of N bits in the original bitstream are in a one-to-one correspondence with $2^N$ third complex symbols in the higher-order modulation signal, and every N bits in the original bitstream include N/2 bits corresponding to a first lower-order modulation signal and N/2 bits corresponding to a second lower-order modulation signal. In the first modulation scheme, a group of $2^{N/2}$ fourth complex symbols corresponds to the first lower-order modulation signal, a group of $2^{N/2}$ fifth complex symbols corresponds to the second lower-order modulation signal, and results obtained by superposing each of the $2^{N/2}$ fourth complex symbols and each of the $2^{N/2}$ fifth complex symbols based on an equi-amplitude ratio are in a one-to-one correspondence with the $2^N$ third complex symbols.

In a possible design, the processing module 2320 is specifically configured to: sequentially map, according to the mapping rule, every N bits in the original bitstream to one fourth complex symbol among the $2^{N/2}$ fourth complex symbols and one fifth complex symbol among the $2^{N/2}$ fifth complex symbols, to form the first lower-order modulation signal and the second lower-order modulation signal.

In a possible design, when the first modulation scheme is 16 quadrature amplitude modulation QAM and M is equal to 2, a modulation order N is 4, and the mapping rule includes: a correspondence between bits in the original bitstream and a complex symbol in the 16QAM, and a correspondence between a complex symbol in the 16QAM and a fourth complex symbol in the first lower-order modulation signal and a fifth complex symbol in the second lower-order modulation signal, where the original bitstream includes a bit corresponding to the first lower-order modulation signal and a bit corresponding to the second lower-order modulation signal, the first lower-order modulation signal corresponds to $2^{N/2}$ fourth complex symbols, the second lower-order modulation signal corresponds to $2^{N/2}$ fifth complex symbols, and results obtained by superposing each of the $2^{N/2}$ fourth complex symbols and each of the $2^{N/2}$ fifth complex symbols based on an equi-amplitude ratio are in a one-to-one correspondence with complex symbols in the 16QAM. Further, optionally, the $2^{N/2}$ fourth complex symbols are K{1+2j, 1−2j, −1+2j, −1−2j}, the $2^{N/2}$ fifth complex symbols are L{2+1j, 2−1j, −2+1j, −2−1j}, and K and L are scale factors.

In a possible design, when the first modulation scheme is non-uniform constellation NUC-16QAM and M is equal to 2, a modulation order N is 4, and the mapping rule includes: a correspondence between bits in the original bitstream and a complex symbol in the NUC-16QAM, and a correspondence between a complex symbol in the NUC-16QAM and a fourth complex symbol in the first lower-order modulation signal and a fifth complex symbol in the second lower-order modulation signal, where the original bitstream includes a bit corresponding to the first lower-order modulation signal and a bit corresponding to the second lower-order modulation signal, the first lower-order modulation signal corresponds to $2^{N/2}$ fourth complex symbols, the second lower-order modulation signal corresponds to $2^{N/2}$ fifth complex symbols, and results obtained by superposing each of the $2^{N/2}$ fourth complex symbols and each of the $2^{N/2}$ fifth complex symbols based on an equi-amplitude ratio are in a one-to-one correspondence with complex symbols in the NUC-16QAM. Further, optionally, the $2^{N/2}$ fourth complex symbols are K{$\sqrt{2}$j, $\sqrt{2}$, −$\sqrt{2}$j, −$\sqrt{2}$}, the $2^{N/2}$ fifth complex symbols are L{1+1j, 1−1j, −1+1j, −1−1j}, and K and L are scale factors.

In a possible design, when the first modulation scheme is 64QAM and M is equal to 2, a modulation order N is 6, and the mapping rule includes: a correspondence between bits in the original bitstream and a complex symbol in the 64QAM, and a correspondence between a complex symbol in the 64QAM and a fourth complex symbol in the first lower-order modulation signal and a fifth complex symbol in the second lower-order modulation signal, where the original bitstream includes a bit corresponding to the first lower-order modulation signal and a bit corresponding to the second lower-order modulation signal, the first lower-order modulation signal corresponds to $2^{N/2}$ fourth complex symbols, the second lower-order modulation signal corresponds to $2^{N/2}$ fifth complex symbols, and results obtained by superposing each of the $2^{N/2}$ fourth complex symbols and each of the $2^{N/2}$ fifth complex symbols based on an equi-amplitude ratio are in a one-to-one correspondence with complex symbols in the 64QAM. Further, optionally, the $2^{N/2}$ fourth complex symbols are P{1+6j, 1+2j, 1−2j, 1−6j, −1−6j, −1−2j, −1+2j, −1+6j}, and the $2^{N/2}$ fifth complex symbols are Q{6+1j, 2+1j, −2+1j, −6+1j, −6−1j, −2−1j, 2−1j, 6−1j}; or the $2^{N/2}$ fourth complex symbols are P{4+3j, 4+1j, 4−1j, 4−3j, −4−3j, −4−1j, −4+1j, −4+3j}, and the $2^{N/2}$ fifth complex symbols are Q{3+4j, 1+4j, −1+4j, −3+4j, −3−4j, −1−4j, 1−4j, 3−4j}. P and Q are scale factors.

In a possible design, when the first modulation scheme is NUC-64QAM and M is equal to 2, a modulation order N is 6, and the mapping rule includes: a correspondence between bits in the original bitstream and a complex symbol in the NUC-64QAM, and a correspondence between a complex symbol in the NUC-64QAM and a fourth complex symbol in the first lower-order modulation signal and a fifth complex symbol in the second lower-order modulation signal, where the original bitstream includes a bit corresponding to the first lower-order modulation signal and a bit corresponding to the second lower-order modulation signal, the first lower-order modulation signal corresponds to $2^{N/2}$ fourth complex symbols, the second lower-order modulation signal corresponds to $2^{N/2}$ fifth complex symbols, and results obtained by superposing each of the $2^{N/2}$ fourth complex symbols and each of the $2^{N/2}$ fifth complex symbols are in a one-to-one correspondence with complex symbols in the NUC-64QAM. Further, optionally, the $2^{N/2}$ fourth complex symbols are P{1, 1+1j, 1j, −1+1j, −1, −1−1j, −1j, 1−1j}, the $2^{N/2}$ fifth complex symbols are $$Q\left\{\sqrt{2}, \frac{\sqrt{2}}{2}(1+1j), \sqrt{2}j, \frac{\sqrt{2}}{2}(-1+1j), -\sqrt{2}, \frac{\sqrt{2}}{2}(-1-1j), -\sqrt{2}j, \frac{\sqrt{2}}{2}(1-1j)\right\},$$

and P and Q are scale factors.

In a possible design, the transceiver module 2310 is further configured to alternately change, based on a specified periodicity, an antenna for sending the M lower-order modulation signals.

In a possible design, the processing module 2320 is further configured to send second indication information to the receive-end device, where the second indication information includes one or more of the following information: a modulation and coding scheme MCS for the higher-order modulation signal, an MCS for the M lower-order modulation signals, information indicating that the higher-order modulation signal is non-uniformly modulated or uniformly modulated, and information indicating that the M lower-order modulation signals are non-uniformly modulated or uniformly modulated.

When the communication apparatus performs the operations or steps corresponding to the receive-end device in the method embodiment shown in FIG. 4, the transceiver module 2310 is configured to receive a higher-order modulation signal from a transmit-end device, where the higher-order modulation signal is obtained by superposing M lower-order modulation signals, and M is an integer greater than or equal to 2; and the processing module 2320 is configured to perform channel estimation by using a demodulation reference signal DMRS port, and perform post-equalization on the higher-order modulation signal based on a channel matrix obtained through estimation.

The processing module 2320 in the communication apparatus may be implemented by using at least one processor or a circuit component related to a processor, and the transceiver module 2310 may be implemented by using at least one transceiver, a circuit component related to a transceiver, or a communication interface. Operations and/or functions of the modules in the communication apparatus are separately used to implement corresponding processes of the methods shown in FIG. 4 to FIG. 22. For brevity, details are not described herein again. Optionally, the communication apparatus may further include a storage module. The storage module may be configured to store data and/or instructions. The transceiver module 2310 and/or the processing module 2320 may read the data and/or the instructions in the storage module, to enable the communication apparatus to implement a corresponding method. For example, the storage module may be implemented by using at least one memory.

The storage module, the processing module, and the transceiver module may exist separately, or all or some of the modules may be integrated. For example, the storage module is integrated with the processing module, or the processing module is integrated with the transceiver module.

Figure 24:
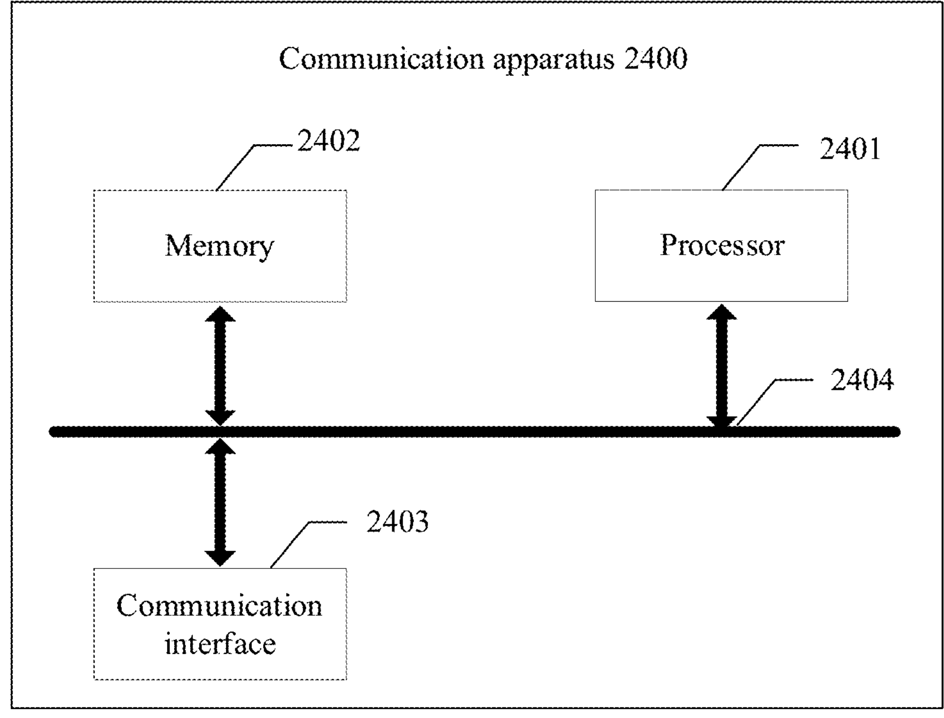

FIG. 24 is a diagram of another structure of a communication apparatus according to an embodiment of this application. The communication apparatus may be configured to implement a function corresponding to the transmit-end device or the receive-end device in the foregoing method embodiments. The communication apparatus may be a network device or a terminal device, or may be an apparatus (for example, a chip included in a network device or a terminal device) capable of supporting the network device or the terminal device in implementing a corresponding function in the foregoing method embodiments.

The communication apparatus 2400 may include a processor 2401 and a memory 2402. The memory 2402 is configured to store program instructions and/or data, and the processor 2401 is configured to execute the program instructions stored in the memory 2402, to implement the methods in the foregoing method embodiments. The memory 2402 may be coupled to the processor 2401. The coupling is an indirect coupling or a communication connection between apparatuses, units, or modules in an electrical form, a mechanical form, or another form, and is used for information exchange between the apparatuses, the units, or the modules.

Optionally, the communication apparatus 2400 may further include a communication interface 2403. The communication interface 2403 is configured to communicate with another device through a transmission medium, for example, transmit a received signal from another communication apparatus to the processor 2401, or transmit a signal from the processor 2401 to another communication apparatus. The communication interface 2403 may be a transceiver, or may be an interface circuit, for example, a transceiver circuit or a transceiver chip.

In an embodiment, the communication interface 2403 may be specifically configured to perform the actions of the transceiver module 2310, and the processor 2401 may be specifically configured to perform the actions of the processing module 2320. Details are not described herein again in this application.

A specific connection medium between the processor 2401, the memory 2402, and the communication interface 2403 is not limited in this embodiment of this application. In this embodiment of this application, in FIG. 24, the processor 2401, the memory 2402, and the communication interface 2403 are connected through a bus 2404. The bus is represented by a bold line in FIG. 24. A connection manner between other components is described merely as an example and does not constitute a limitation. The bus may be categorized as an address bus, a data bus, a control bus, or the like. For ease of representation, only one bold line is used to represent the system bus in FIG. 24, but this does not mean that there is only one bus or only one type of bus.

An embodiment of this application further provides a chip system, including a processor. The processor is coupled to a memory. The memory is configured to store a program or instructions. When the program or the instructions are executed by the processor, the chip system is enabled to implement the method corresponding to the transmit-end device or the receive-end device in any one of the foregoing method embodiments.

Optionally, the chip system may include one or more processors. The processor may be implemented by using hardware or software. When the processor is implemented by using hardware, the processor may be a logic circuit, an integrated circuit, or the like. When the processor is implemented by using software, the processor may be a general-purpose processor, and is implemented by reading software code stored in the memory.

Optionally, the chip system may also include one or more memories. The memory may be integrated with the processor, or may be disposed separately from the processor. This is not limited in this application. For example, the memory may be a non-transitory processor, for example, a read-only memory (ROM). The memory and the processor may be integrated into one chip, or may be separately disposed on different chips. A type of the memory and a manner of disposing the memory and the processor are not specifically limited in this application.

For example, the chip system may be a field programmable gate array (FPGA), an application-specific integrated circuit (ASIC), a system-on-a-chip (SoC), a central processing unit (CPU), a network processor (NP), a digital signal processor (DSP), a microcontroller unit (MCU), a programmable logic device (PLD), or another integrated chip.

It should be understood that the steps in the foregoing method embodiments may be performed by an integrated logic circuit of hardware in a processor or through instructions in a form of software. The steps of the methods disclosed with reference to embodiments of this application may be directly performed by a hardware processor, or may be performed by a combination of hardware in a processor and a software module.

An embodiment of this application further provides a computer-readable storage medium. The computer storage medium stores a computer program or instructions. When the computer program or the instructions are executed, the method in any one of the foregoing method embodiments is performed.

An embodiment of this application further provides a computer program product. When a communication apparatus reads and executes the computer program product, the communication apparatus is enabled to perform the method in any one of the foregoing method embodiments.

An embodiment of this application further provides a communication system. The communication system includes a transmit-end device and a receive-end device.

It should be understood that the processor mentioned in embodiments of this application may be a CPU, or may be another general-purpose processor, a DSP, an ASIC, an FPGA or another programmable logic device, a discrete gate or a transistor logic device, a discrete hardware component, or the like. The general-purpose processor may be a microprocessor, or the processor may be any conventional processor or the like.

It should be further understood that the memory mentioned in embodiments of this application may be a volatile memory or a non-volatile memory, or may include both a volatile memory and a non-volatile memory. The non-volatile memory may be a ROM, a programmable read-only memory (programmable ROM, PROM), an erasable programmable read-only memory (erasable PROM, EPROM), an electrically erasable programmable read-only memory (electrically EPROM, EEPROM), or a flash memory. The volatile memory may be a random access memory (RAM) and serves as an external cache. By way of example but not limitative description, RAMs in many forms may be used, for example, a static random access memory (static RAM, SRAM), a dynamic random access memory (dynamic RAM, DRAM), a synchronous dynamic random access memory (synchronous DRAM, SDRAM), a double data rate synchronous dynamic random access memory (double data rate SDRAM, DDR SDRAM), an enhanced synchronous dynamic random access memory (enhanced SDRAM, ESDRAM), a synchlink dynamic random access memory (synchlink DRAM, SLDRAM), and a direct rambus random access memory (direct rambus RAM, DR RAM).

It should be noted that, when the processor is a general-purpose processor, a DSP, an ASIC, an FPGA or another programmable logic device, a discrete gate or a transistor logic device, or a discrete hardware component, the memory (storage module) is integrated in the processor.

It should be noted that the memory described in this specification is intended to include but is not limited to these memories and any memory of another appropriate type.

It should be understood that various numbers in embodiments of this application are merely used for distinguishing for ease of description, and sequence numbers of the foregoing processes or steps do not mean execution sequences. The execution sequences of the processes or steps should be determined based on functions and internal logic of the processes or steps, and should not be construed as any limitation on implementation processes of embodiments of the present invention.

A person of ordinary skill in the art may be aware that, in combination with examples described in embodiments disclosed in this specification, units and algorithm steps can be implemented by electronic hardware or a combination of computer software and electronic hardware. Whether the functions are performed by hardware or software depends on particular applications and design constraints of technical solutions. A person skilled in the art may use different methods to implement the described functions for each particular application, but it should not be considered that the implementation goes beyond the scope of this application.

A person skilled in the art can clearly understand that, for ease and brevity of description, for a detailed operating process of the foregoing system, apparatus, and unit, reference may be made to a corresponding process in the foregoing method embodiments, and details are not described herein again.

In several embodiments provided in this application, it should be understood that the disclosed system, apparatus, and method may be implemented in other manners. For example, the described apparatus embodiments are merely examples. For example, division into the units is merely logical function division and may be other division in actual implementation. For example, a plurality of units or components may be combined or integrated into another system, or some features may be ignored or not performed. In addition, the shown or discussed mutual couplings or direct couplings or communication connections may be implemented through some interfaces. The indirect couplings or communication connections between the apparatuses or units may be implemented in electrical, mechanical, or other forms.

The units described as separate parts may or may not be physically separate, and parts shown as units may or may not be physical units, that is, may be located in one place, or may be distributed on a plurality of network units. Some or all of the units may be selected according to actual requirements to achieve objectives of solutions of embodiments.

In addition, functional units in embodiments of this application may be integrated into one processing unit, each of the units may exist alone physically, or two or more units may be integrated into one unit.

When the functions are implemented in a form of a software functional unit and sold or used as an independent product, the functions may be stored in a computer-readable storage medium. Based on such an understanding, technical solutions of this application essentially, or a part contributing to the conventional technology, or some of technical solutions may be implemented in a form of a software product. The computer software product is stored in a storage medium, and includes several instructions for instructing a computer device (which may be a personal computer, a server, a network device, or the like) to perform all or some of the steps of the methods described in embodiments of this application. The foregoing storage medium includes any medium that can store program code, such as a USB flash drive, a removable hard disk, a ROM, a RAM, a magnetic disk, or an optical disc.

In embodiments of this application, unless otherwise stated or there is a logic conflict, terms and/or descriptions in different embodiments are consistent and may be mutually referenced, and technical features in different embodiments may be combined based on an internal logical relationship thereof, to form a new embodiment.

What is claimed is:

1. A communication method in a high-frequency scenario, wherein the method is applied to a transmit-end device, and the method comprises:

modulating, by the transmit-end device, S bitstreams according to a mapping rule corresponding to a first modulation scheme for a higher-order modulation signal to be received by a receive-end device which is a terminal device, to generate M lower-order modulation signals, wherein M is an integer greater than or equal to 2, and S is equal to 1 or M; and sending, by the transmit-end device, the higher-order modulation signal formed by the M lower-order modulation signals, which are generated by the transmit-end device, through a line of sight (LOS) channel, wherein the M lower-order modulation signals are superposed based on the mapping rule to obtain the higher-order modulation signal to be received by the receive-end device.

2. The method according to claim 1, wherein the S bitstreams are one independent bitstream, and S=1; or the S bitstreams are M sub-bitstreams obtained by performing bit decomposition on one independent bitstream, and S=M; or the S bitstreams are M independent bitstreams, and S=M.

3. The method according to claim 1, wherein the S bitstreams are M bitstreams; and the mapping rule indicates a bit-to-complex symbol modulation mapping relationship corresponding to each of the M bitstreams at a transmit end.

4. The method according to claim 1, wherein the first modulation scheme is N-order modulation, and N is an integer greater than or equal to 4; and based on M=2 and S=2, the mapping rule comprises:

$2^2$ values of two bits in a first bitstream of the 2 bitstreams are respectively mapped to $2^2$ first complex symbols; and $2^{N-2}$ values of N−2 bits in a second bitstream of the 2 bitstreams are respectively mapped to $2^{N-2}$ second complex symbols based on different values of the two bits in the first bitstream, and when values of the two bits in the first bitstream vary, same values of the N−2 bits in the second bitstream are mapped to different second complex symbols among the $2^{N-2}$ second complex symbols.

5. The method according to claim 1, further comprising:

sending first indication information to the receive-end device, wherein the first indication information comprises one or more of the following information:

a modulation and coding scheme (MCS) for the higher-order modulation signal, an MCS for the M lower-order modulation signals, sign bit indication information, an amplitude ratio of the M lower-order modulation signals, and a power ratio of the M lower-order modulation signals, wherein the sign bit indication information indicates a lower-order modulation signal serving as a sign bit among the M lower-order modulation signals.

6. The method according to claim 1, wherein the mapping rule indicates a correspondence between bits in an original bitstream comprising the S bitstreams and a complex symbol in the higher-order modulation signal, and a correspondence between a complex symbol in the higher-order modulation signal and complex symbols in the M lower-order modulation signals.

7. The method according to claim 1, wherein the first modulation scheme is N-order modulation, and N is an integer greater than or equal to 4; and based on M being equal to 2, the mapping rule comprises:

$2^N$ values of N bits in an original bitstream are in a one-to-one correspondence with $2^N$ third complex symbols in the higher-order modulation signal, and every N bits in the original bitstream comprise $$\frac{N}{2}$$

bits corresponding to a first lower-order modulation signal and $$\frac{N}{2}$$

bits corresponding to a second lower-order modulation signal; and in the first modulation scheme, a group of $$2^{\frac{N}{2}}$$

fourth complex symbols corresponds to the first lower-order modulation signal, a group of $$2^{\frac{N}{2}}$$

fifth complex symbols corresponds to the second lower-order modulation signal, and results obtained by superposing each of the $$2^{\frac{N}{2}}$$

fourth complex symbols and each of the $$2^{\frac{N}{2}}$$

fifth complex symbols based on an equi-amplitude ratio are in a one-to-one correspondence with the $2^N$ third complex symbols.

8. The method according to claim 1, wherein based on the first modulation scheme being 16 quadrature amplitude modulation (QAM), M being equal to 2, and a modulation order N being equal to 4, and the mapping rule comprises:

a correspondence between bits in an original bitstream and a complex symbol in the 16QAM, and a correspondence between a complex symbol in the 16QAM and a fourth complex symbol in a first lower-order modulation signal and a fifth complex symbol in a second lower-order modulation signal, wherein the original bitstream comprises a bit corresponding to the first lower-order modulation signal and a bit corresponding to the second lower-order modulation signal; and the first lower-order modulation signal corresponds to $$2^{\frac{N}{2}}$$

fourth complex symbols, the second lower-order modulation signal corresponds to $$2^{\frac{N}{2}}$$

fifth complex symbols, and results obtained by superposing each of the $$2^{\frac{N}{2}}$$

fourth complex symbols and each of the $$2^{\frac{N}{2}}$$

fifth complex symbols based on an equi-amplitude ratio are in a one-to-one correspondence with complex symbols in the 16QAM.

9. The method according to claim 8, wherein the $$2^{\frac{N}{2}}$$

fourth complex symbols are K{1+2j, 1−2j, −1+2j, −1−2j}, the $$2^{\frac{N}{2}}$$

fifth complex symbols are L{2+1j, 2−1j, −2+1j, −2−1j}, and K and L are scale factors.

10. The method according to claim 1, wherein based on the first modulation scheme being non-uniform constellation (NUC)-16 quadrature amplitude modulation (QAM), M being equal to 2, a modulation order N being equal to 4, and the mapping rule comprises:

a correspondence between bits in the original bitstream and a complex symbol in the NUC-16QAM, and a correspondence between a complex symbol in the NUC-16QAM and a fourth complex symbol in a first lower-order modulation signal and a fifth complex symbol in a second lower-order modulation signal, wherein the original bitstream comprises a bit corresponding to the first lower-order modulation signal and a bit corresponding to the second lower-order modulation signal; and the first lower-order modulation signal corresponds to $$2^{\frac{N}{2}}$$

fourth complex symbols, the second lower-order modulation signal corresponds to $$2^{\frac{N}{2}}$$

fifth complex symbols, and results obtained by superposing each of the $$2^{\frac{N}{2}}$$

fourth complex symbols and each of the $$2^{\frac{N}{2}}$$

fifth complex symbols based on an equi-amplitude ratio are in a one-to-one correspondence with complex symbols in the NUC-16QAM.

11. The method according to claim 10, wherein the $$2^{\frac{N}{2}}$$

fourth complex symbols are K{$\sqrt{2}$j, $\sqrt{2}$, $-\sqrt{2}$j, $-\sqrt{2}$}, the $$2^{\frac{N}{2}}$$

fifth complex symbols are L{1+1j, 1−1j, −1+1j, −1−1j}, and K and L are scale factors.

12. The method according to claim 1, wherein based on the first modulation scheme being 64 quadrature amplitude modulation (QAM), M being equal to 2, and a modulation order N being equal to 6, and the mapping rule comprises:

a correspondence between bits in the original bitstream and a complex symbol in the 64QAM, and a correspondence between a complex symbol in the 64QAM and a fourth complex symbol in a first lower-order modulation signal and a fifth complex symbol in a second lower-order modulation signal, wherein the original bitstream comprises a bit corresponding to the first lower-order modulation signal and a bit corresponding to the second lower-order modulation signal; and the first lower-order modulation signal corresponds to $$2^{\frac{N}{2}}$$

fourth complex symbols, the second lower-order modulation signal corresponds to $$2^{\frac{N}{2}}$$

fifth complex symbols, and results obtained by superposing each of the $$2^{\frac{N}{2}}$$

fourth complex symbols and each of the $$2^{\frac{N}{2}}$$

fifth complex symbols based on an equi-amplitude ratio are in a one-to-one correspondence with complex symbols in the 64QAM.

13. The method according to claim 12, wherein the $$2^{\frac{N}{2}}$$

fourth complex symbols are P{1+6j, 1+2j, 1−2j, 1-6j, −1-6j, −1−2j, −1+2j, −1+6j}, the $$2^{\frac{N}{2}}$$

fifth complex symbols are Q{6+1j, 2+1j, −2+1j, −6+1j, −6−1j, −2−1j, 2−1j, 6−1j}, and P and Q are scale factors; or the $$2^{\frac{N}{2}}$$

fourth complex symbols are P{4+3j, 4+1j, 4−1j, 4−3j, −4−3j, −4−1j, −4+1j, −4+3j}, the $$2^{\frac{N}{2}}$$

fifth complex symbols are Q{3+4j, 1+4j, −1+4j, −3+4j, −3−4j, −1−4j, 1−4j, 3−4j}.

14. The method according to claim 1, wherein based on the first modulation scheme being non-uniform constellation (NUC)-64 quadrature amplitude modulation (QAM), M being equal to 2, a modulation order N being equal to 6, and the mapping rule comprises:

a correspondence between bits in the original bitstream and a complex symbol in the NUC-64QAM, and a correspondence between a complex symbol in the NUC-64QAM and a fourth complex symbol in a first lower-order modulation signal and a fifth complex symbol in a second lower-order modulation signal, wherein the original bitstream comprises a bit corresponding to the first lower-order modulation signal and a bit corresponding to the second lower-order modulation signal; and the first lower-order modulation signal corresponds to $$2^{\frac{N}{2}}$$

fourth complex symbols, the second lower-order modulation signal corresponds to $$2^{\frac{N}{2}}$$

fifth complex symbols, and results obtained by superposing each of the $$2^{\frac{N}{2}}$$

fourth complex symbols and each of the $$2^{\frac{N}{2}}$$

fifth complex symbols are in a one-to-one correspondence with complex symbols in the NUC-64QAM.

15. The method according to claim 14, wherein the $$2^{\frac{N}{2}}$$

fourth complex symbols are P{1, 1+1j, 1j, −1+1j, −1, −1−1j, −1j, 1−1j}, the $$2^{\frac{N}{2}}$$

fifth complex symbols are $$Q\left\{\sqrt{2}, \frac{\sqrt{2}}{2}(1+1j), \sqrt{2}j, \frac{\sqrt{2}}{2}(-1+1j), -\sqrt{2}, \frac{\sqrt{2}}{2}(-1-1j), -\sqrt{2}j, \frac{\sqrt{2}}{2}(1-1j)\right\},$$

and P and Q are scale factors.

16. The method according to claim 1, further comprising: sending second indication information to the receive-end device, wherein the second indication information comprises one or more of the following information:

a modulation and coding scheme (MCS) for the higher-order modulation signal, an MCS for the M lower-order modulation signals, information indicating that the higher-order modulation signal is non-uniformly modulated or uniformly modulated, and information indicating that the M lower-order modulation signals are non-uniformly modulated or uniformly modulated.

17. A communication method in a high-frequency scenario, wherein the method is applied to a receive-end device which is a terminal device, and the method comprises:

receiving, by the receive-end device, a higher-order modulation signal from a transmit-end device through a line of sight (LOS) channel, wherein the higher-order modulation signal is obtained by superposing, based on a mapping rule, M lower-order modulation signals generated by the transmit-end device by modulating S bitstreams according to the mapping rule, and M is an integer greater than or equal to 2, and S is equal to 1 or M; and performing, by the receive-end device, channel estimation by utilizing a demodulation reference signal (DMRS) port, and performing, by the receive-end device, post-equalization on the higher-order modulation signal based on a channel matrix obtained through estimation.

18. The method according to claim 17, wherein after the performing the post-equalization on the higher-order modulation signal, the method further comprises:

demodulating the higher-order modulation signal to obtain a corresponding bitstream.

19. The method according to claim 18, wherein based on the M lower-order modulation signals being M independent signals, the method further comprises:

splitting the corresponding bitstream into M bitstreams.

20. The method according to claim 17, further comprising:

receiving first indication information from the transmit-end device, wherein the first indication information comprises one or more of the following information:

a modulation and coding scheme (MCS) for the higher-order modulation signal, an MCS for the M lower-order modulation signals, sign bit indication information, an amplitude ratio of the M lower-order modulation signals, and a power ratio of the M lower-order modulation signals, wherein the sign bit indication information indicates a lower-order modulation signal serving as a sign bit among the M lower-order modulation signals.

* * * * *